(12) United States Patent  
Jaffer et al.

(10) Patent No.: US 12,518,875 B2
(45) Date of Patent: Jan. 6, 2026

(54) NEAR-INFRARED AUTOFLUORESCENCE IMAGING SYSTEMS AND METHODS

(71) Applicant: The General Hospital Corporation, Boston, MA (US)

(72) Inventors: Farouc Amin Jaffer, Boston, MA (US); Guillermo Tearney, Boston, MA (US); Joseph Gardecki, Boston, MA (US); Mazen Albaghdadi, Boston, MA (US); Ryutaro Ikegami, Boston, MA (US); Mohamad Kassab, Boston, MA (US)

(73) Assignee: The General Hospital Corporation, Boston, MA (US)

( * ) Notice: Subject to any disclaimer, the term of this patent is extended or adjusted under 35 U.S.C. 154(b) by 416 days.

(21) Appl. No.: 18/001,923

(22) PCT Filed: Jun. 21, 2021

(86) PCT No.: PCT/US2021/038303
§ 371 (c)(1),
(2) Date: Dec. 15, 2022

(87) PCT Pub. No.: WO2021/258069
PCT Pub. Date: Dec. 23, 2021

(65) Prior Publication Data
US 2023/0238135 A1 Jul. 27, 2023

Related U.S. Application Data

(60) Provisional application No. 63/113,124, filed on Nov. 12, 2020, provisional application No. 63/041,728, filed on Jun. 19, 2020.

(51) Int. Cl.
*G06K 9/00* (2022.01)
*A61B 5/00* (2006.01)
(Continued)

(52) U.S. Cl.
CPC ............ *G16H 50/20* (2018.01); *A61B 5/0082* (2013.01); *G16H 30/40* (2018.01); *G06T 2207/30101* (2013.01)

(58) Field of Classification Search
CPC ........ G16H 50/20; G16H 30/40; G16H 30/20; A61B 5/0082; G06T 2207/30101; Y02A 90/10
See application file for complete search history.

(56) References Cited

U.S. PATENT DOCUMENTS 6,615,063 B1 9/2003 Ntziachristos et al.
9,332,942 B2 5/2016 Jaffer et al.
(Continued)

FOREIGN PATENT DOCUMENTS

CN 107920747 A * 4/2018 ........... A61B 5/0066
EP 3072449 A1 9/2016
(Continued)

OTHER PUBLICATIONS

Htun, N. et al., Near-Infrared Autofluorescence Induced by Intraplaque Hemorrhage and Heme Degradation as Marker for High-Risk Atherosclerotic Plaques, Nature Communications, 2017, 8:75, pp. 1-16.
(Continued)

*Primary Examiner* — Xin Jia
(74) *Attorney, Agent, or Firm* — QUARLES & BRADY LLP

(57) ABSTRACT

A computer-implemented method for diagnosing a medical condition of a patient is provided. The method can include causing, using one or more processors, an excitation source to emit an excitation light towards a region of interest of an artery, receiving, using the one or more processors and a detector, imaging data of the region of interest of the artery, generating, using the one or more processors and the imag-
(Continued)

ing data, an image of the region of interest, determining, using the one or more processors, a risk region of an atheromatous plaque, based on the imaging data, and determining, using the one or more processors, that the patient has a severe case of an atheromatous plaque, based on the determined risk region of the atheromatous plaque.

24 Claims, 42 Drawing Sheets

(51) Int. Cl.
  *G16H 30/40* (2018.01)
  *G16H 50/20* (2018.01)

(56) References Cited

U.S. PATENT DOCUMENTS

| | | |
|---|---|---|
| 10,912,462 B2 | 2/2021 | Wang et al. |
| 10,952,616 B2 | 3/2021 | Watanabe |
| 2003/0055307 A1 | 3/2003 | Elmaleh et al. |
| 2010/0092389 A1 | 4/2010 | Jaffer |
| 2016/0267360 A1* | 9/2016 | Madden .............. A61B 5/02007 |
| 2018/0055953 A1 | 3/2018 | Jaffer et al. |
| 2021/0113098 A1* | 4/2021 | Yamada ................. A61B 5/748 |

FOREIGN PATENT DOCUMENTS

| | | | |
|---|---|---|---|
| JP | 7481264 B2 * | 5/2024 | ........... A61B 5/0275 |
| WO | 2019107583 A1 | 6/2019 | |
| WO | 2020019040 A1 | 1/2020 | |

OTHER PUBLICATIONS

Kunio et al., Histopathological Correlation of Near Infrared Autofluorescence in Human Cadaver Coronary Arteries, Atherosclerosis, 2022, 344:31-39.

Wang, H. et al., Ex Vivo Catheter-Based Imaging of Coronary Atherosclerosis Using Multimodality OCT and NIRAF Excited at 633 nm, Biomedical Optics Express, 2015, 6(4):1363-1375.

4 PCT International Search Report and Written Opinion, PCT/US2021/038303, Dec. 21, 2021, 14 pages.

* cited by examiner

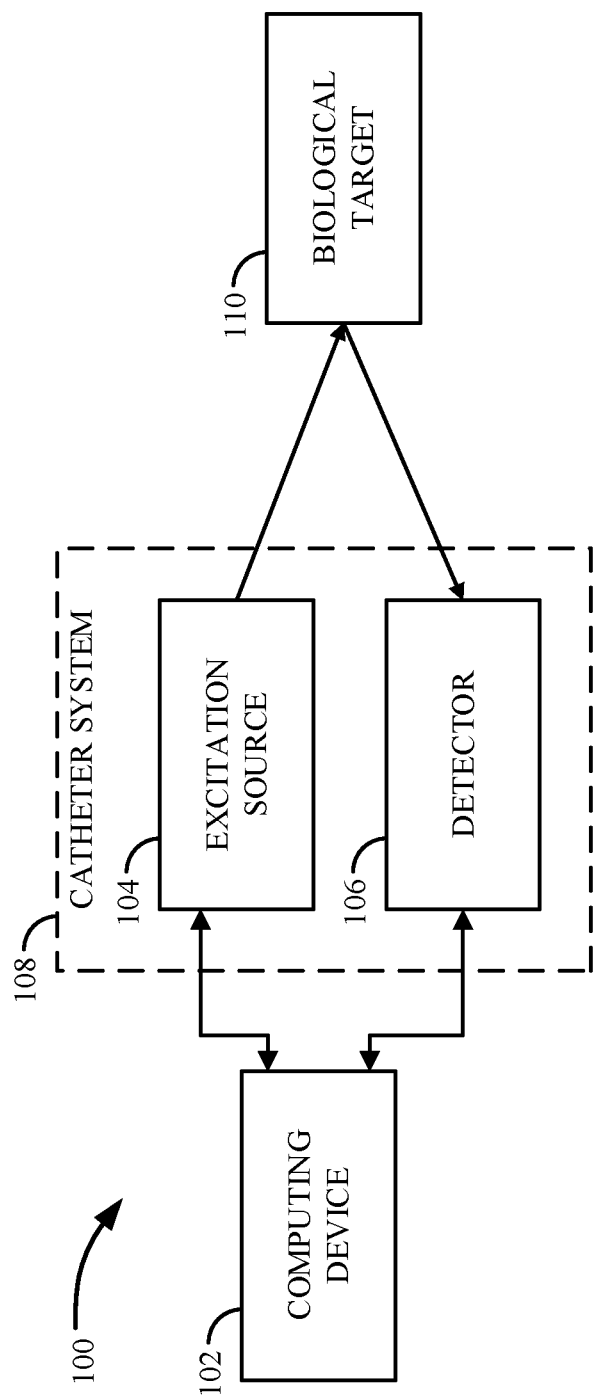
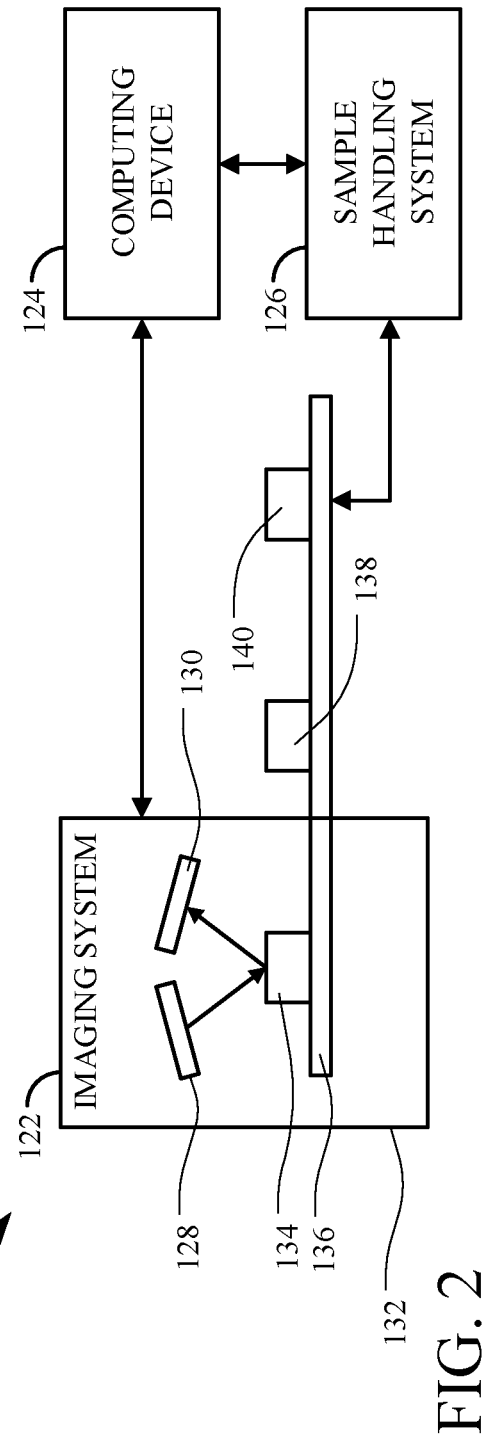

NEAR-INFRARED AUTOFLUORESCENCE IMAGING SYSTEMS AND METHODS

CROSS-REFERENCE TO RELATED APPLICATIONS

This application represents the U.S. national stage entry of International Patent Application No. PCT/US2021/038303 filed Jun. 21, 2021, which is related to and claims priority to U.S. Patent Application No. 63/041,728 filed Jun. 19, 2020 and entitled, "Near-infrared Autofluorescence (NI-RAF) of Atherosclerosis is Generated by Oxidized Lipid," and U.S. Patent Application No. 63/113,124 filed Nov. 12, 2020 and entitled, "Near-infrared Imaging Systems and Methods," the contents of each of which are hereby incorporated by reference in their entirety.

STATEMENT REGARDING FEDERALLY SPONSORED RESEARCH

This invention was made with government support under R01-HL-137913, and R01-HL-150538, both awarded by the National Institutes of Health. The government has certain rights in the invention.

BACKGROUND

Atherosclerosis driven cardiovascular disease is a leading cause of death and disability worldwide, which can cause complications including myocardial infarction, ischemic stroke, and peripheral artery disease. Atherosclerosis is typically characterized by inflammation and the chronic accumulation of fibro fatty plaque in the arterial wall. While the growth of atherosclerotic plaque can be variable including remaining clinically silent for a majority (or all) of an individual's lifetime, in some cases, growth of atherosclerotic plaque can cause gradual narrowing of the arterial lumen, which can cause tissue ischemia. In more severe cases, the deposited atherosclerotic plaque can also be disrupted and a thrombus can form around the deposited plaque causing ischemia and infarction (e.g., myocardial infarction, stroke, and the like).

While stents and other interventional techniques can be deployed to regain proper blood flow through a patient's artery, these techniques are deployed after the downstream tissue has been damaged by lack of proper blood flow. Current imaging approaches do not fully characterize high-risk plaques that can cause events. Thus, it would be desirable to provide near-infrared fluorescence imaging systems and methods that can help diagnose atherosclerotic plaques prior to ischemic events.

SUMMARY OF THE DISCLOSURE

Some non-limiting examples of the disclosure provide a computer-implemented method for diagnosing a medical condition of a patient. The method can include causing, using one or more processors, an excitation source to emit an excitation light towards a region of interest of an artery, receiving, using the one or more processors and a detector, imaging data of the region of interest of the artery, generating, using the one or more processors and the imaging data, an image of the region of interest, determining, using the one or more processors, a risk region of an atheromatous plaque, based on the imaging data, and determining, using the one or more processors, that the patient has a severe case of an atheromatous plaque, based on the determined risk region of the atheromatous plaque.

In some non-limiting examples, the method can include determining, using one or more processors, a maximum intensity value of the imaging data, and determining, using the one or more processors, a threshold, based on the maximum intensity value. A pixel with the maximum intensity value can be defined within the risk region of the atheromatous plaque.

In some non-limiting examples, a risk region of an atheromatous plaque can have a higher amount of insoluble lipids than a region of the atheromatous plaque that does not include the risk region. The risk region of the atheromatous plaque can have a higher amount of insoluble iron than the region of the atheromatous plaque that does not include the risk region.

In some non-limiting examples, the method can include filtering, using one or more processors, an image to generate an image of a risk region of an atheromatous plaque.

In some non-limiting examples, the method can include determining, using one or more processors, a size of a risk region of a atheromatous plaque, based on an image of the risk region of the atheromatous plaque, determining, using the one or more processors, that the size of the risk region is greater than a size threshold, and determining, using the one or more processors, that a patient has a severe case of an atheromatous plaque, based on the size of the risk region being greater than the size threshold.

In some non-limiting examples, filtering, using one or more processors, the image to generate an image of the risk region of the atheromatous plaque can include thresholding, using the one or more processors, the image of the region of interest according to a pixel intensity threshold to generate the image of the risk region of the atheromatous plaque.

In some non-limiting examples, a pixel intensity threshold can reject pixels having an intensity that exceeds the pixel intensity threshold. The pixel intensity threshold can be at least one of a first range defined between a peak signal intensity value in the imaging data and a first pixel value that is 0.25 times the peak intensity value, a second range defined between the peak signal intensity value and a second pixel value that is 0.5 times the peak signal intensity value, or a third range defined between the peak signal intensity value and a first pixel value that is 0.75 times the peak signal intensity value.

In some non-limiting examples, the signal intensity peak value is a global peak signal intensity value.

In some non-limiting examples, an image is a first image. The method can include filtering, using one or more processors, the first image to generate a second image of the atheromatous plaque that excludes a risk region, and subtracting, using the one or more processors, the second image from the first image to generate a subtracted image that is an image of the risk region of the plaque.

In some non-limiting examples, a portion of a risk region of the atheromatous plaque can include a ceroid of the atheromatous plaque.

In some non-limiting examples, filtering, using the one or more processors, a first image to generate a second image of an atheromatous plaque that excludes a risk region can include thresholding the first image according to a threshold to generate the second image.

In some non-limiting examples, no imaging agent is administered to the patient prior to exciting a region of interest with an excitation source, and prior to receiving imaging data from a detector.

In some non-limiting examples, the artery is a carotid artery.

In some non-limiting examples, the method can include determining, using one or more processors, a shape of an atheromatous plaque, determining, using the one or more processors, that the shape of the atheromatous plaque exceeds a shape threshold, and notifying, using the one or more processors, a user based on the shape of the risk region of the atheromatous plaque exceeding the shape threshold.

Some non-limiting examples of the disclosure provide a computer-implemented method for diagnosing or treating atherosclerosis of a patient. The method can include causing, using one or more processors, an excitation source to emit excitation light towards a first region of interest of an artery, receiving, using the one or more processors and a detector, first imaging data of the first region of interest of the artery, generating, using the one or more processors, a baseline image of the first region of interest that includes atheromatous plaque of the artery from the first imaging data, causing, using the one or more processors, the excitation source to emit excitation light towards at least a portion of the first region of interest of the artery, receiving, using the one or more processors and the detector, second imaging data of at least a portion of the first region of interest of the artery, generating, using the one or more processors, a diagnosing image that includes the atheromatous plaque of the artery from the second imaging data, and comparing, using the one or more processors, the baseline image to the diagnosing image to determine an increase, a decrease, or a maintaining of signal intensities between corresponding regions of the baseline image and the diagnosing image. No imaging agent can be administered to the patient to acquire the first imaging data, and to acquire the second imaging data.

In some non-limiting examples, the method can include after receiving first imaging data, administering an anti-oxidant to a patient.

In some non-limiting examples, administering an anti-oxidant can occur after receiving first imaging data and prior to emitting excitation light towards at least a portion of a first region of interest. The anti-oxidant can be configured to decrease the signal intensities of an atheromatous plaque by decreasing a level of oxidative stress within the atheromatous plaque.

In some non-limiting examples, an anti-oxidant can be at least one of α-tocopherol, or N-acetylcysteine.

In some non-limiting examples, the method can include determining, using one or more processors, a stabilizing of an atheromatous plaque, based on a decrease in signal intensities between corresponding regions of a baseline image and a diagnosing image.

In some non-limiting examples, the method can include subtracting, using one or more processors, a diagnosing image from a baseline image.

In some non-limiting examples, the method can include determining, using one or more processors, a progressing of atherosclerosis, based on an increase in signal intensities between corresponding regions of a baseline image and a diagnosing image.

In some non-limiting examples, the method can include determining, using one or more processors, that a risk region of the atheromatous plaque is above a size threshold.

Some non-limiting examples of the disclosure provide a computer-implemented method for screening atheromatous plaque stabilizing or anti-inflammatory compounds. The method can include acquiring, using one or more processors, a first image of a region of interest of a sample using a excitation source and detector, after acquiring the first image, administering a proposed atheromatous plaque stabilizing or anti-inflammatory compound into contact with the sample, acquiring, using the one or more processors, a second image of at least a portion of the region of interest of the sample using the excitation source and detector, comparing, using one or more processors, the first image to the second image, determining, using the one or more processors, a decrease in a signal intensity between a corresponding region of the first image and the second image, based on comparing the first image and the second image, and determining, using the one or more processors, that the proposed atheromatous plaque stabilizing or anti-inflammatory compound is an atheromatous plaque stabilizing or anti-inflammatory compound, based on the decrease in signal intensity.

In some non-limiting examples, the sample is a biological sample.

In some non-limiting examples, the method can include determining, using one or more processors, a magnitude of a decrease in a signal intensity, and determining, using the one or more processors, an effectiveness of a proposed atheromatous plaque stabilizing or anti-inflammatory compound, based on the magnitude of the decrease in the signal intensity.

Some non-limiting examples of the disclosure provide an imaging system for imaging a blood vessel of a patient. The imaging system can include an excitation source configured to emit excitation light towards the blood vessel of the patient, a detector configured to sense light emitted from the blood vessel of the patient, and a computing device in communication the excitation source and the detector. The computing device can be configured to cause the excitation source to emit excitation light towards at least a portion of a region of interest of the blood vessel, receive, using the detector, imaging data of the region of interest of the blood vessel, and determine that the patient has a severe case of an atheromatous plaque, based on the imaging data.

In some non-limiting examples, a computing device can be further configured to generate, using imaging data, an image of a region of interest.

In some non-limiting examples, a computing device can be further configured to threshold an image according to a pixel threshold to generate an image of a risk region of the atheromatous plaque, determine at least one of a size or a shape of the risk region of the atheromatous plaque, determine that at least one of the size of the atheromatous plaque exceeds a size threshold, or the shape of the atheromatous plaque exceeds a shape threshold, and determine that the patient has the severe case of an atheromatous plaque, based on the determination that at least one of the size, or the shape of the atheromatous plaque exceeds the corresponding threshold.

In some non-limiting examples, a computing device can be further configured to generate, an image of a non-risk region of a plaque, determine an oxidative stress value, based on the non-risk region of the plaque; and determine that the patient has the severe case of the atheromatous plaque, based on the oxidative stress value.

In some non-limiting examples, a computing device can be further configured to determine that an oxidative stress value exceeds an oxidative stress threshold, and determine that a patient has a severe case of an atheromatous plaque, based on a determination that the oxidative stress value exceeds the oxidative stress threshold.

Some non-limiting examples of the disclosure provide a method for diagnosing a medical condition of a patient. The patient can have a blood vessel. The method can include emitting, using an excitation source, excitation light towards at least a portion of a region of interest of the blood vessel of the patient, receiving, using a detector, imaging data of the region of interest, determining that the patient has a severe case of an atheromatous plaque, based on the imaging data, and determining a remedial treatment plan involving monitoring or treating oxidized lipid-driven oxidative stress is required for the patient, based on the determination that the patient has the severe case of the atheromatous plaque.

In some non-limiting examples, the method can include determining a risk region of an atheromatous plaque, based on imaging data, and determining that a patient has a severe case of the atheromatous plaque based on a presence of a risk region of the atheromatous plaque.

In some non-limiting examples, the method can include determining a size or shape of a risk region of an atheromatous plaque, based on imaging data, determining that at least one of the size of the risk region exceeds a size threshold, or the shape of the risk region exceeds a shape threshold, and determining that a patient has a severe case of the atheromatous plaque based on the determination that the size or the shape of the risk region exceeds the corresponding threshold.

In some non-limiting examples, a remedial treatment plan can be at least one of a surgical intervention for a patient, a pharmaceutical intervention for the patient, or an imaging intervention that includes acquiring additional imaging data from a different imaging modality.

In some non-limiting examples, a remedial treatment plan can be a surgical intervention. The surgical intervention can be at least one of deploying a stent at an atheromatous plaque, or removing the atheromatous plaque by resecting the atheromatous plaque from a blood vessel.

In some non-limiting examples, an excitation light has a wavelength between 600 nm and 800 nm. Imaging data can have been acquired from light having a wavelength of between 680 nm to 880 nm.

Some non-limiting examples of the disclosure provide a computer-implemented method for diagnosing atherosclerosis indicative of a presence of ceroid in a patient's arteries. The method can include causing, using one or more processors, an excitation source to emit an excitation light having a wavelength between 550 nm and 900 nm towards a region of interest of an artery, and receiving, using the one or more processors and a detector, imaging data of the region of interest of the artery. The imaging data can have been acquired from light having a wavelength between 600 and 980 nm. The method can include determining, using one or more processors, a risk value of atherosclerosis, by analyzing imaging data. The risk value atherosclerosis can be indicative of an amount or concentration of ceroid in a patient's arteries.

In some non-limiting examples, the method can include suggesting, using one or more processors, a medical therapy based on a risk value of atherosclerosis. The atherosclerosis can be indicative of a concentration of ceroid in a patient's arteries.

In some non-limiting examples, a medical therapy can be a therapy designed to monitor or treat oxidized lipid-driven oxidative stress.

In some non-limiting examples, excitation light can have a wavelength between substantially 600 nm and substantially 1000 nm.

In some non-limiting examples, excitation light can have a wavelength of substantially 633 nm.

The foregoing and other aspects and advantages of the disclosure will appear from the following description. In the description, reference is made to the accompanying drawings which form a part hereof, and in which there is shown by way of illustration a preferred configuration of the disclosure. Such configuration does not necessarily represent the full scope of the disclosure, however, and reference is made therefore to the claims and herein for interpreting the scope of the disclosure.

BRIEF DESCRIPTIONS OF THE DRAWINGS

FIG. 1 shows a schematic illustration of an imaging system.

FIG. 2 shows a schematic illustration of a compound screening system.

Figure 24A:
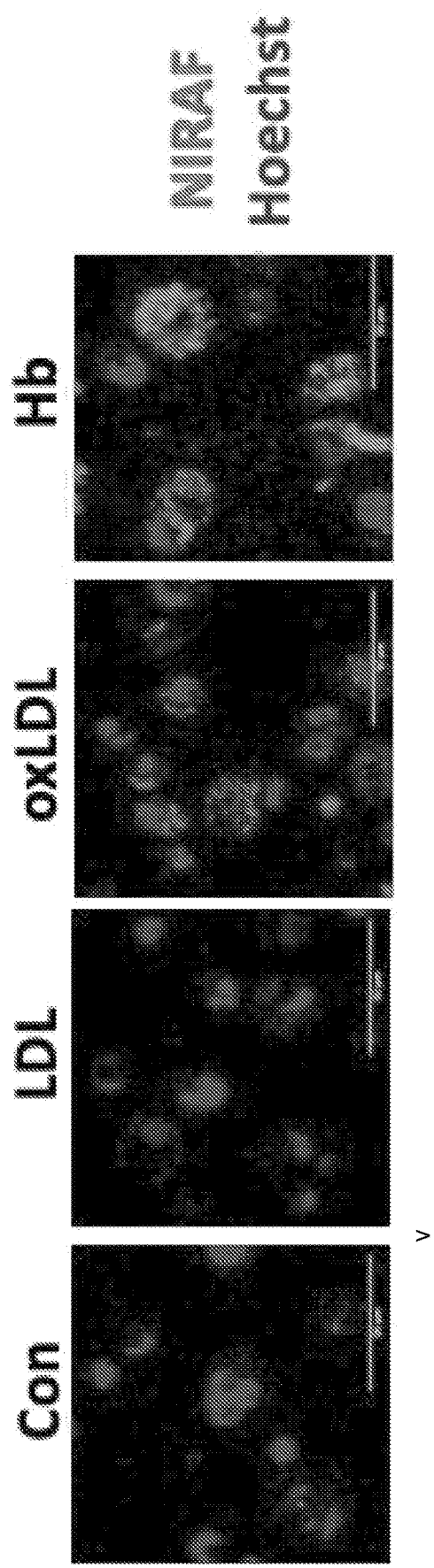

FIG. 24A shows high magnification images of NIRAF with nucleus staining in THP-1 macrophages incubated with medium alone (control), native LDL 50 ug/ml, oxLDL 50 ug/ml for 5 days or human hemoglobin 0.5 mg/ml for 24 hr.

Figure 24B:
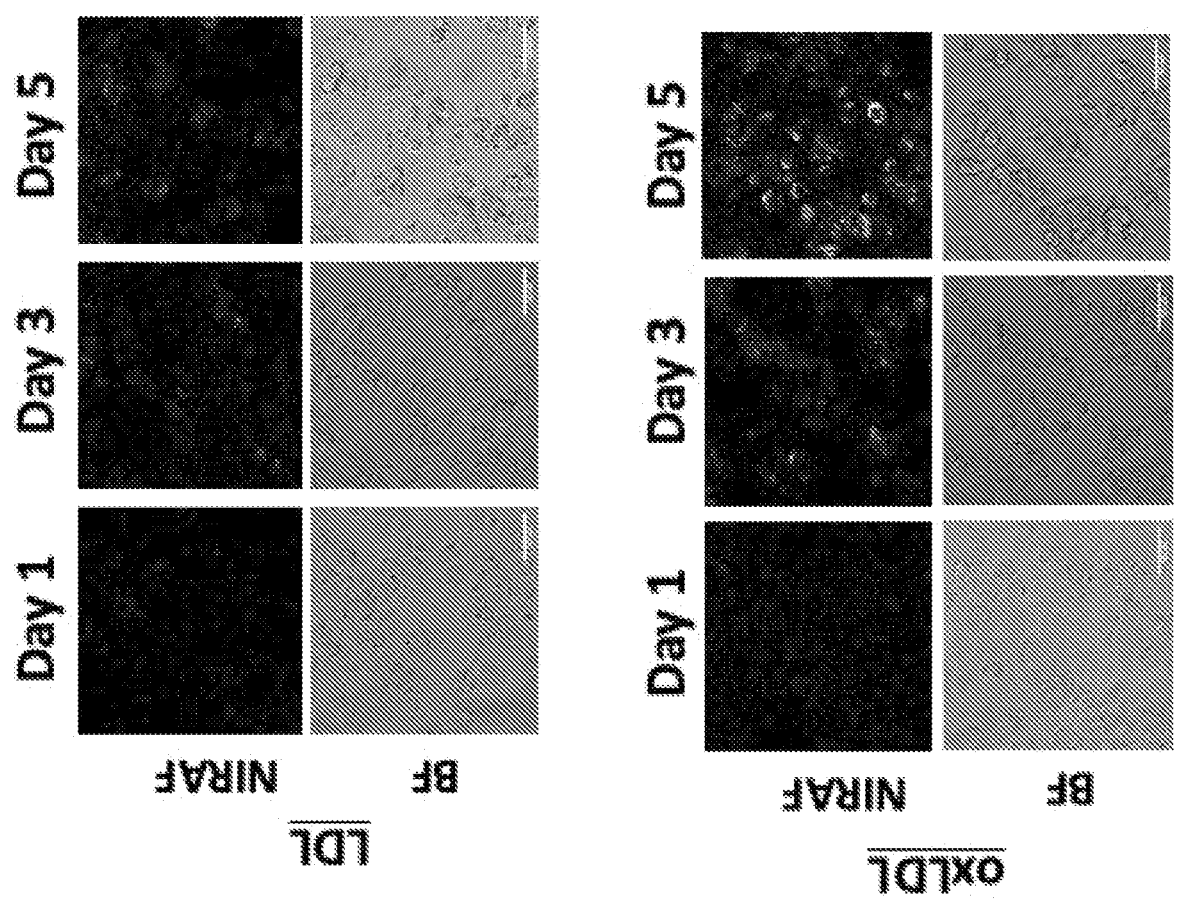

FIG. 24B shows representative time course of NIRAF signal evolution at day 1, 3, and 5 in LDL- and oxLDL-treated MDMs.

Figure 24C:
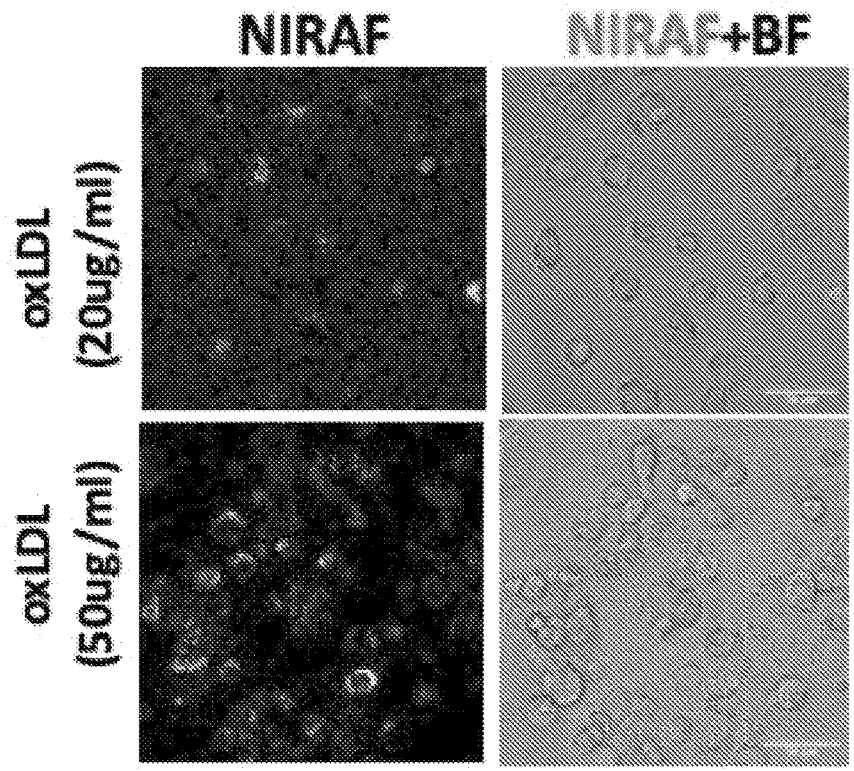

FIG. 24C shows NIRAF signal at day 5 was compared between MDMs incubated with oxLDL 20 ug/ml vs. oxLDL 50 ug/ml.

Figure 23A:
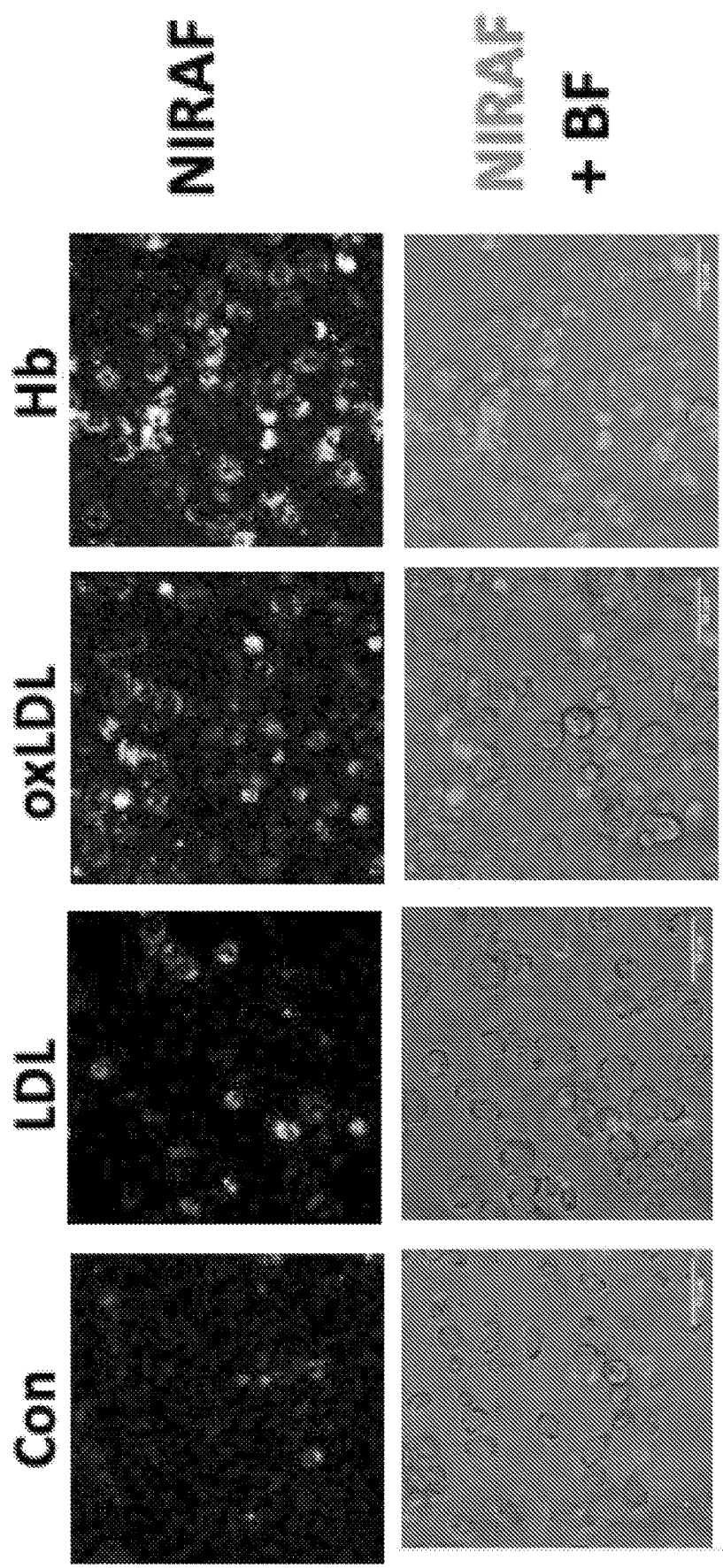
FIG. 23A shows NIRAF images and NIRAF images overlaid on bright field ("BF") images.
Figure 24D:
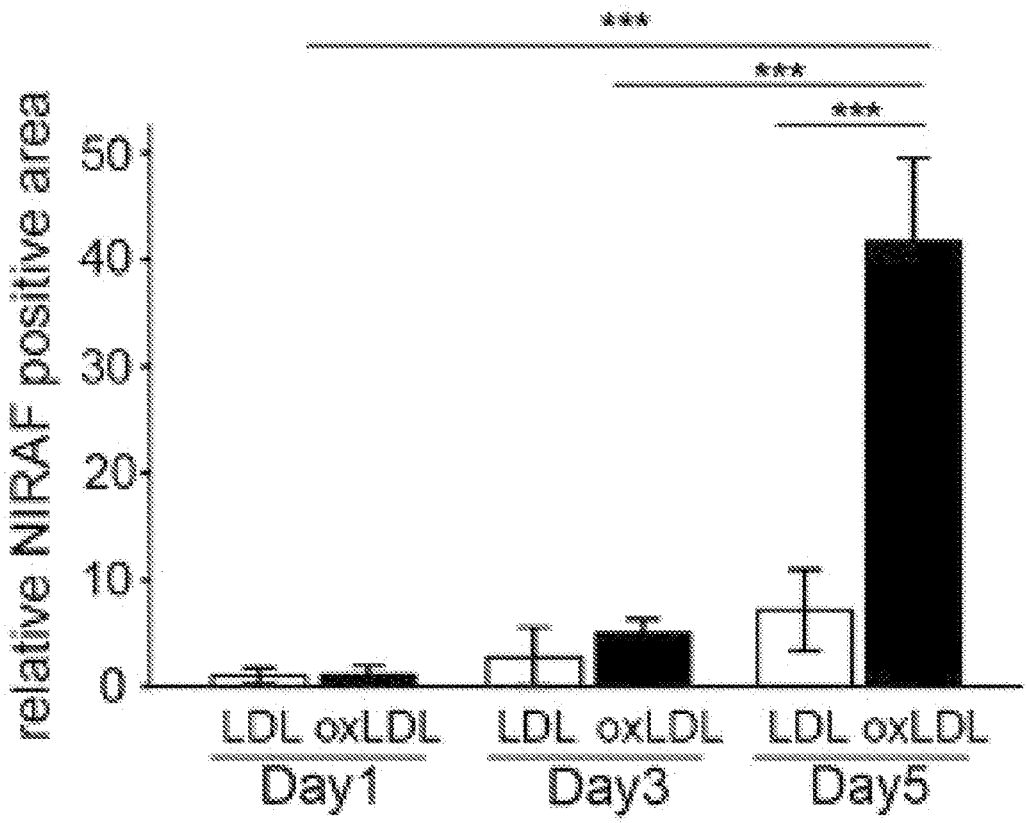

FIG. 24D shows a graph of the quantitative data for FIG. 23C presented as mean±SE of 3 independent experiments.

Figure 25:
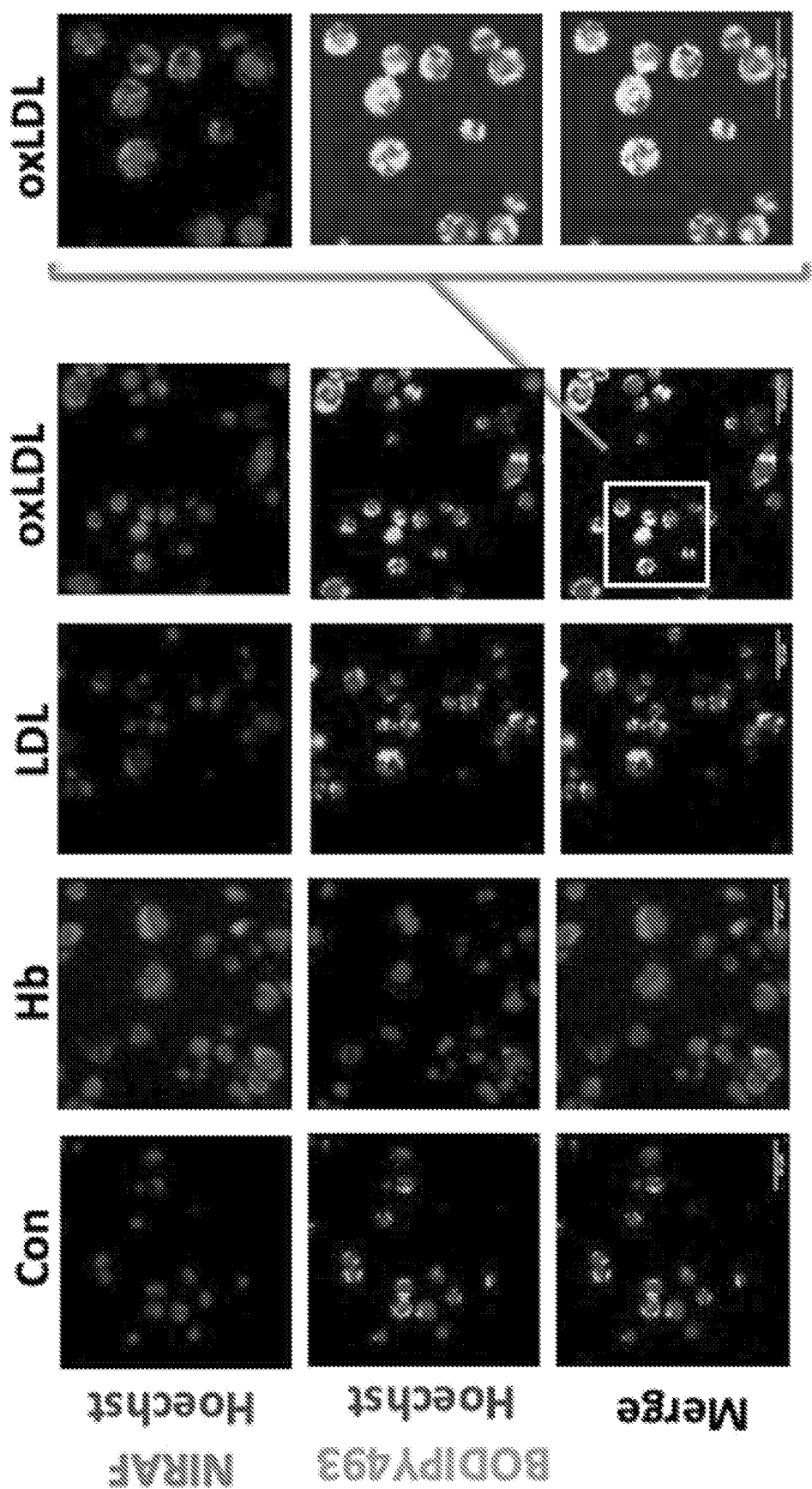

FIG. 25 shows NIRAF, Hoechst, BODIPY493 images, and their combinations.

Figure 26:
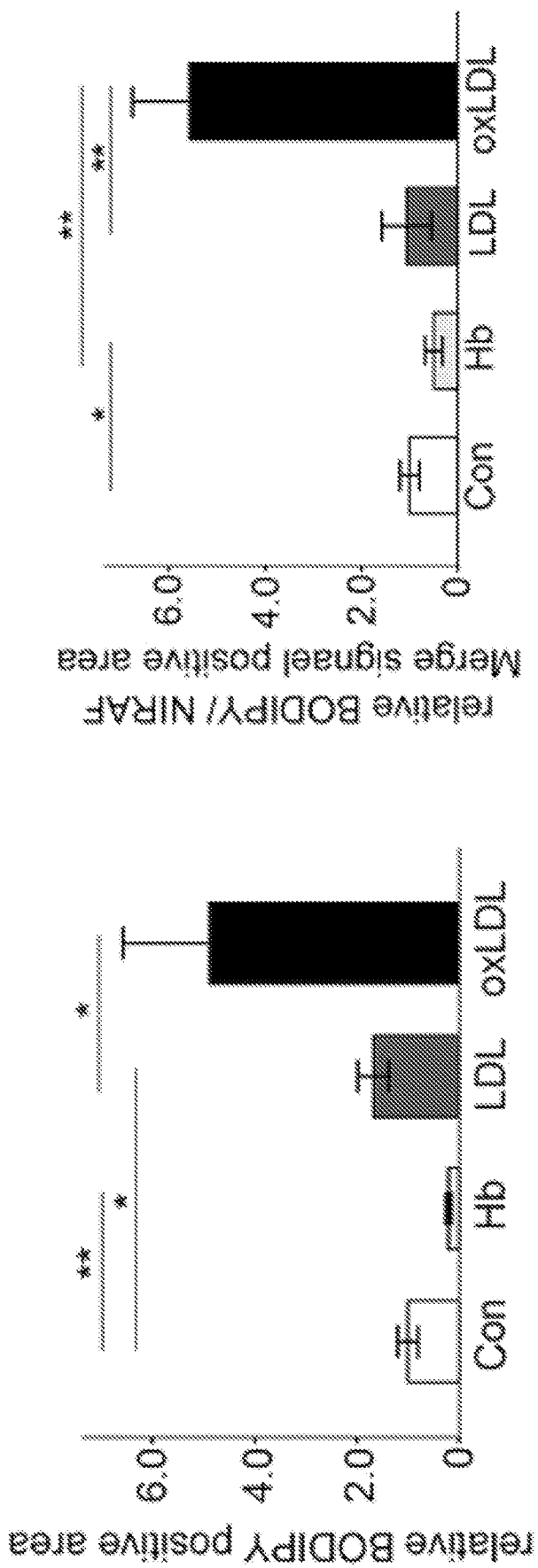

FIG. 26 shows two graphs that quantify BODIPY-positive area and the co-localization area of BODIPY with NIRAF adjusted by cell number.

Figure 27:
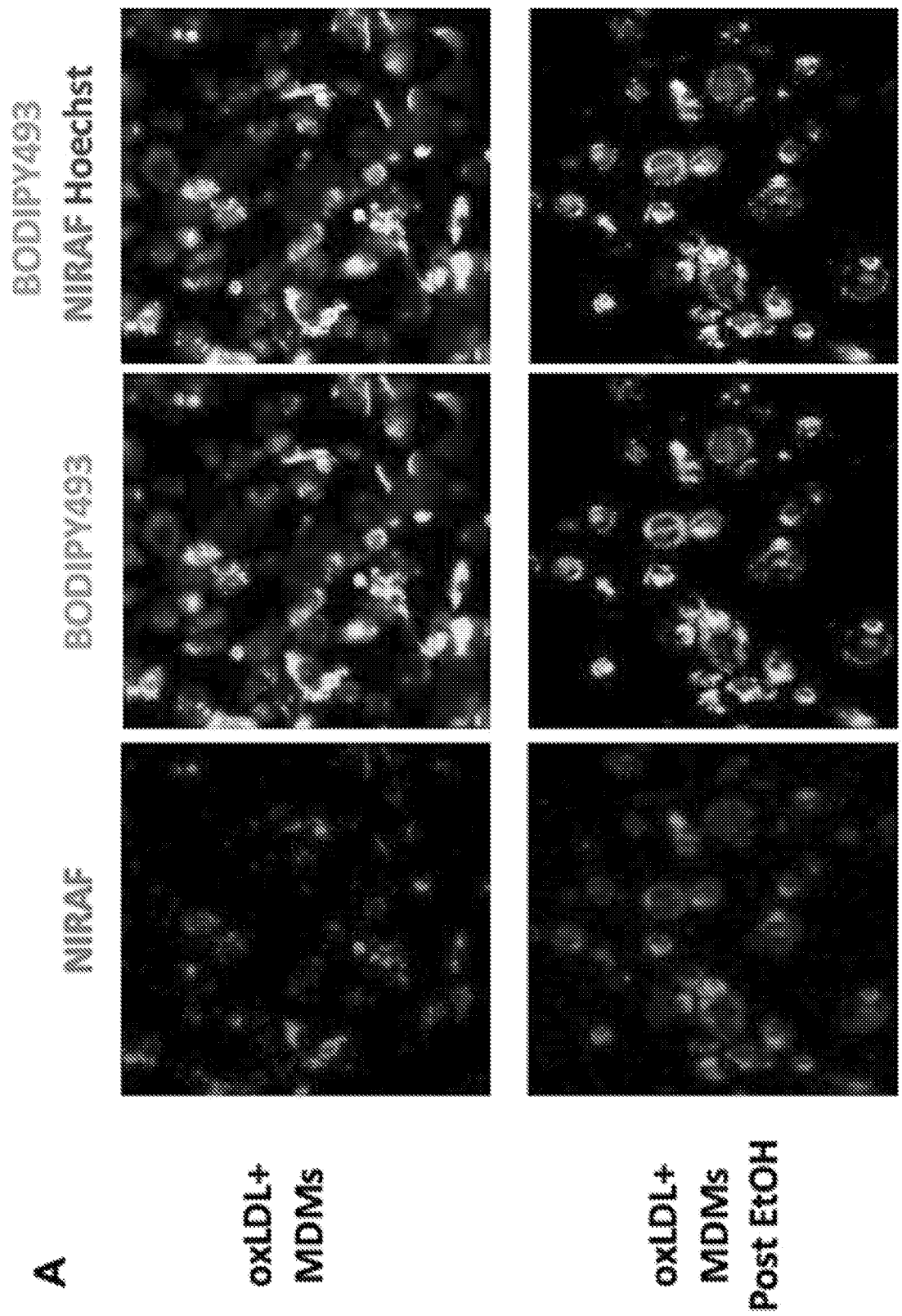

FIG. 27 NIRAF, BODIPY493, and Hoechst images, and their combinations.

Figure 28A:
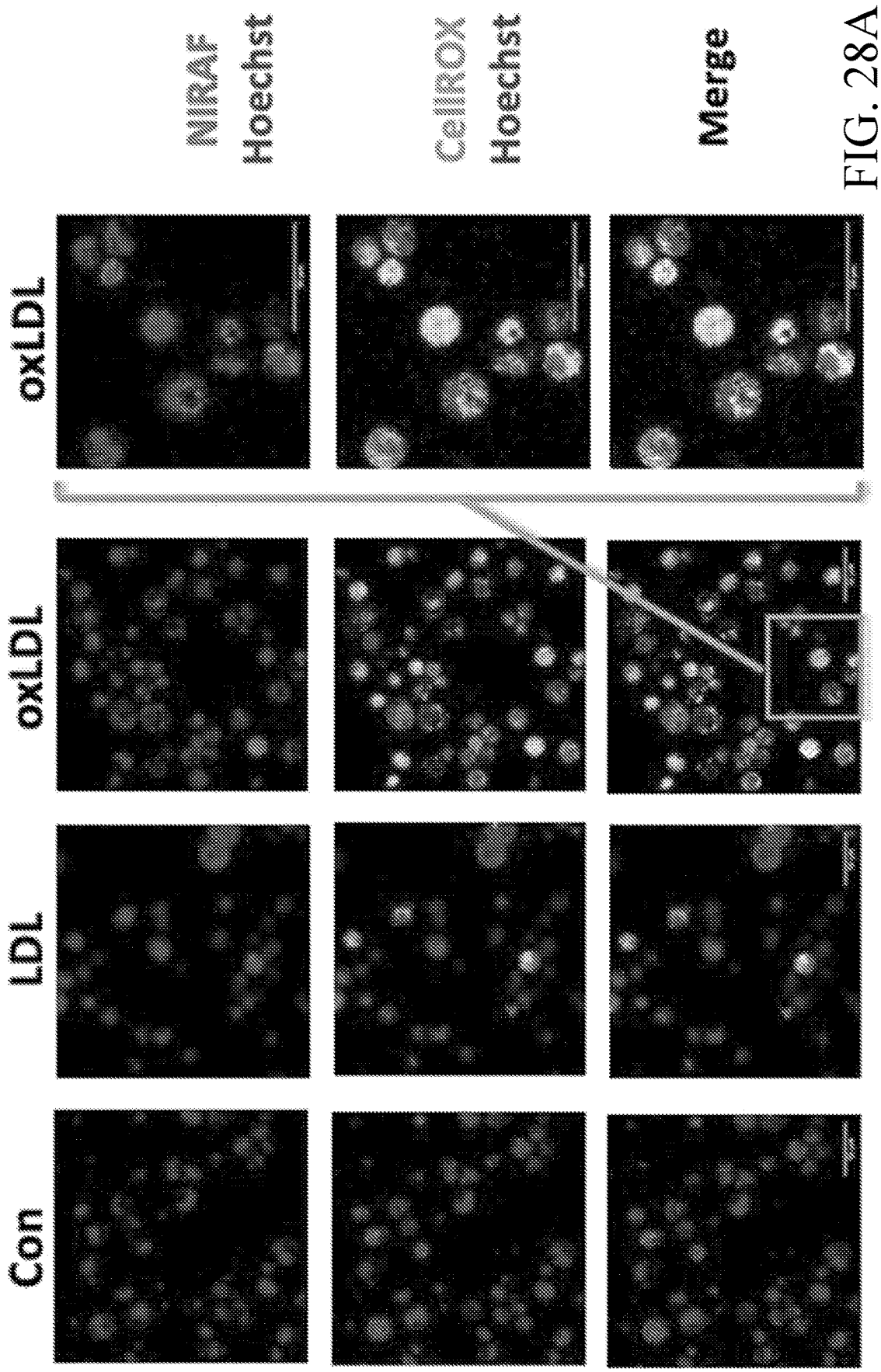

FIG. 28A shows confocal microscopy images used to assess the relationship between NIRAF and ROS.

Figure 28B:
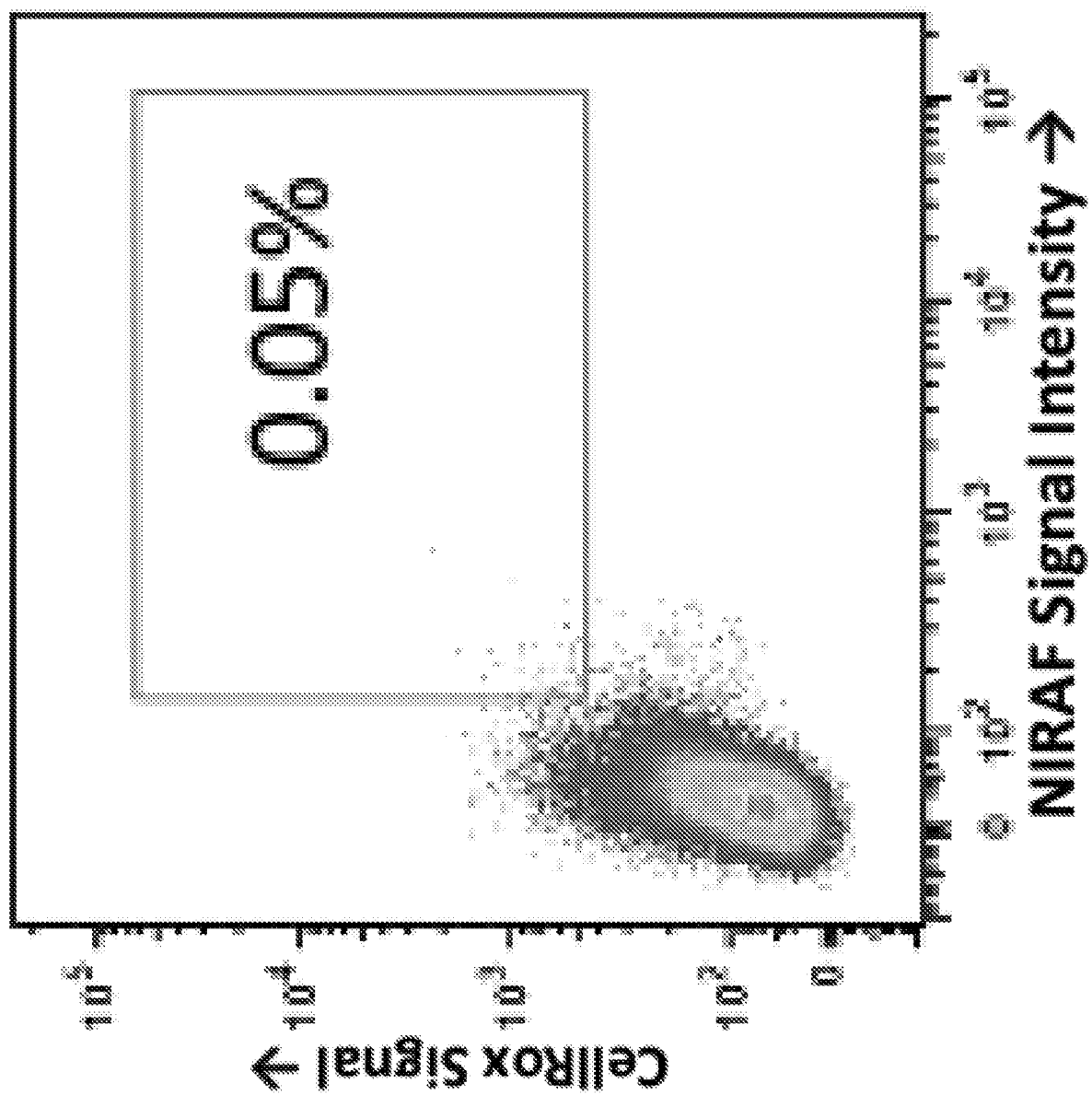

FIG. 28B shows a flow cytometric graph for the control.

Figure 28C:
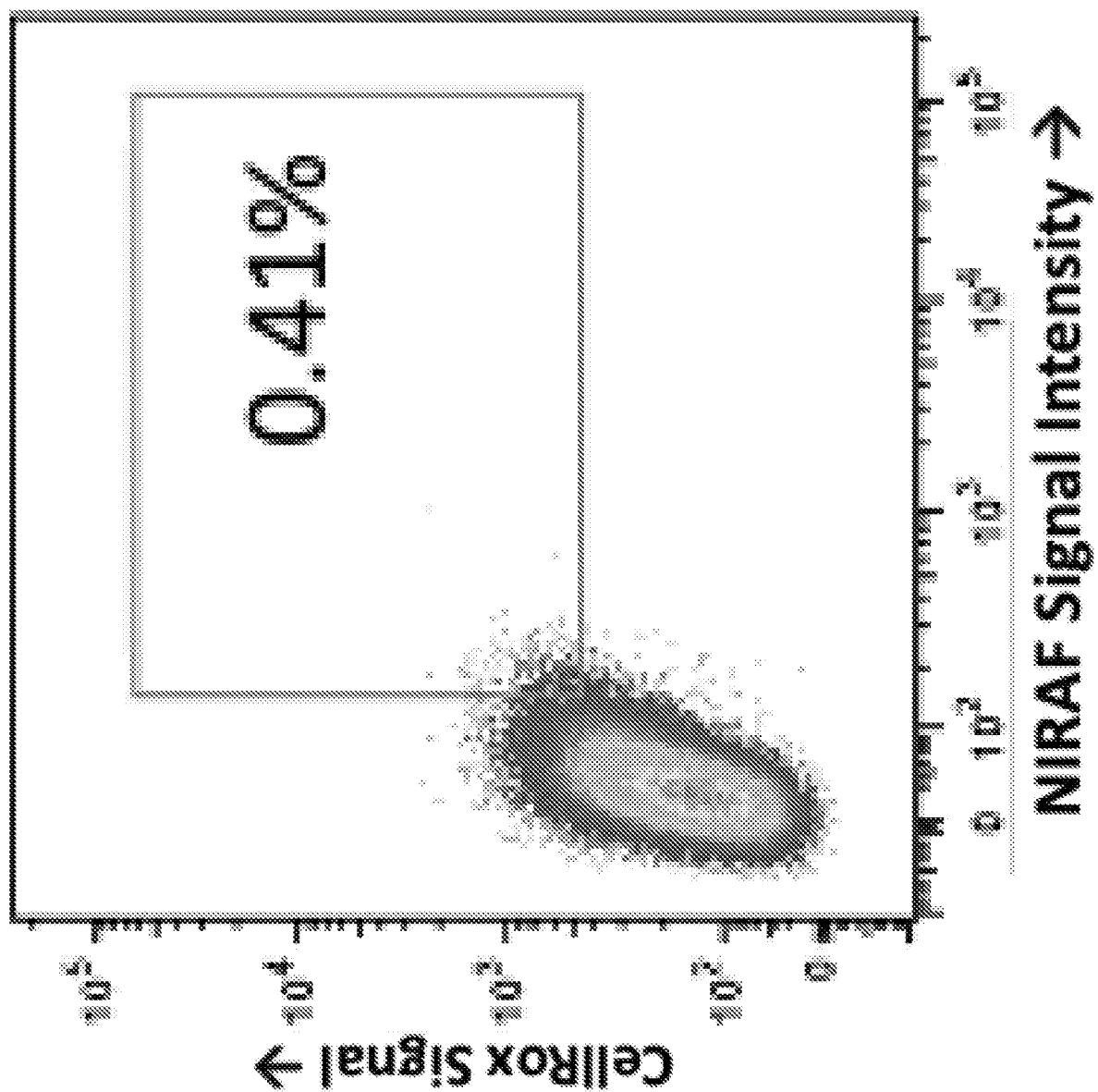

FIG. 28C shows a flow cytometric graph for the LDL.

Figure 28D:
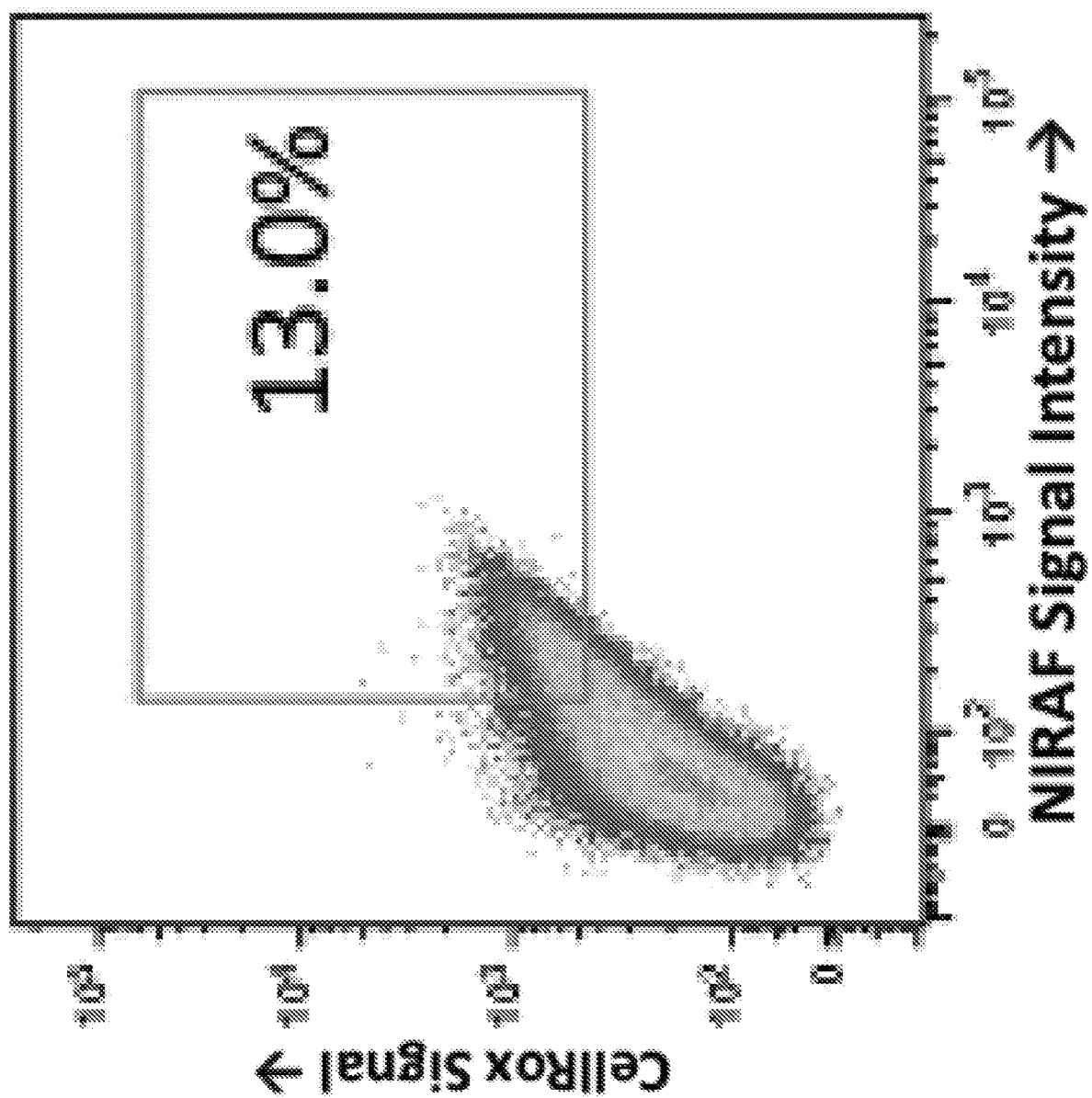

FIG. 28D shows a flow cytometric graph for the oxLDL.

Figure 29A:
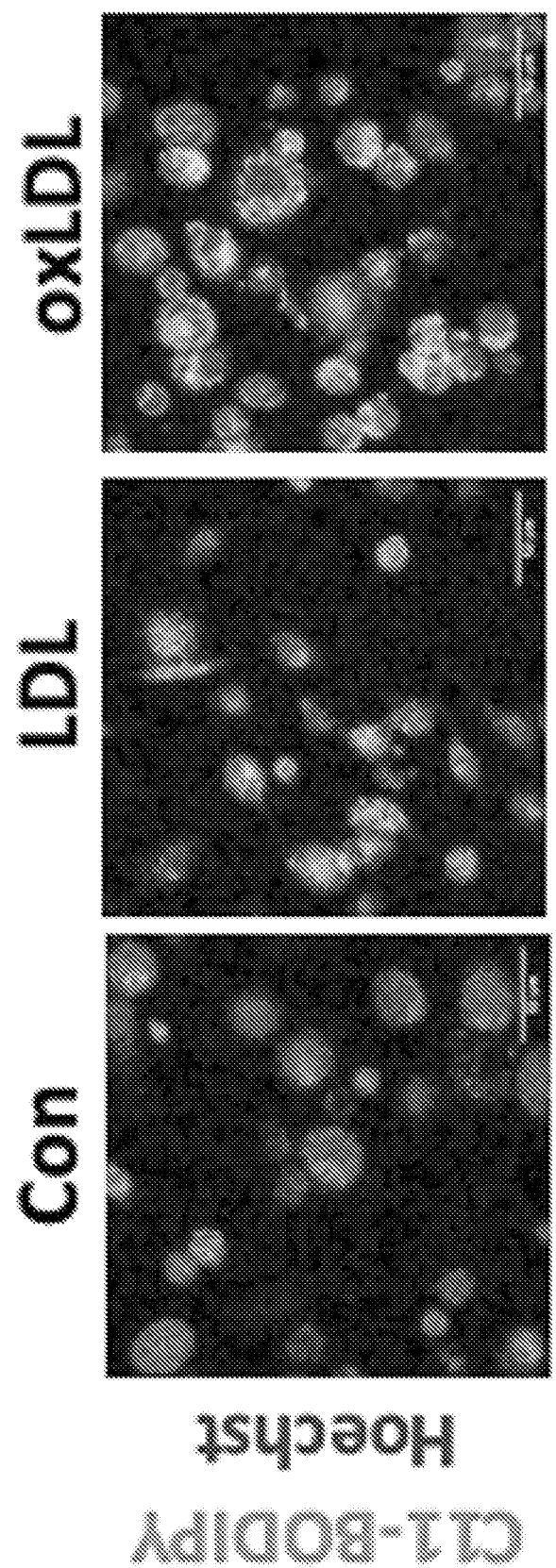

FIG. 29A shows representative images of C11-BODIPY staining demonstrating increased lipid peroxidative stress following incubation of MDMs with oxLDL.

Figure 29B:
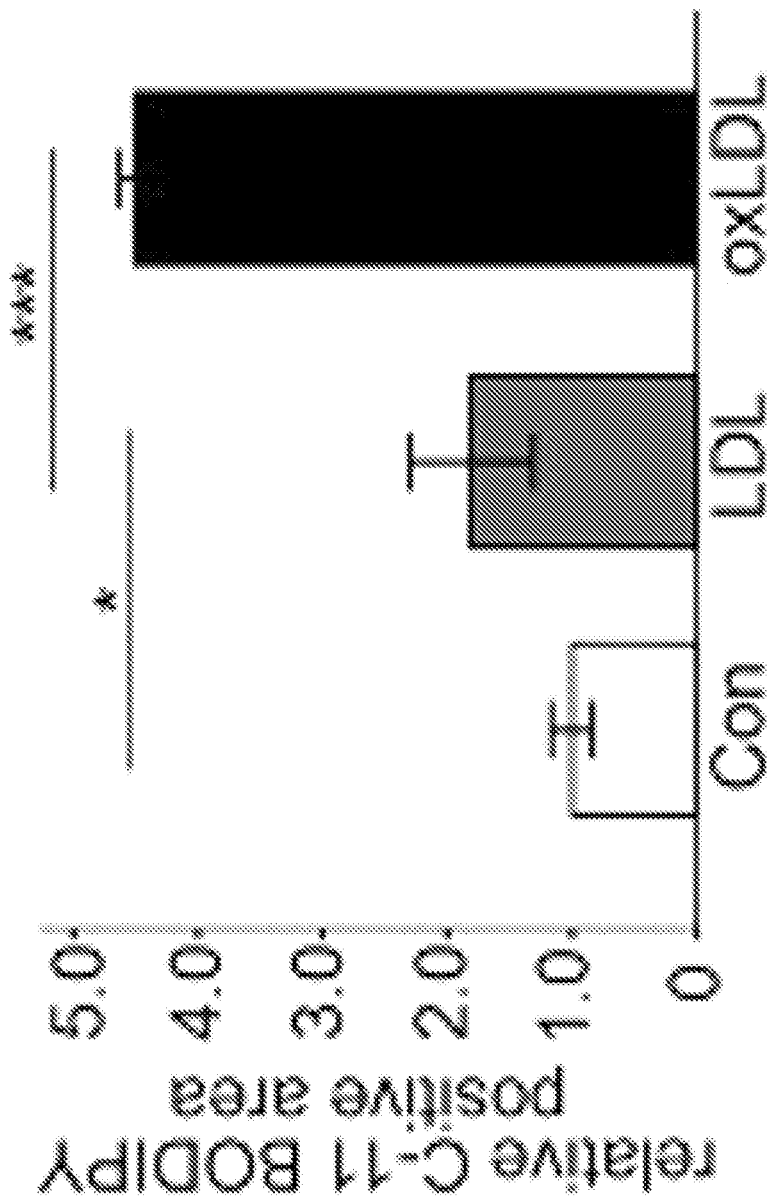

FIG. 29B shows a graph that illustrates the quantitation of the C11-BODIPY lipid peroxidation signal obtained from confocal microscopy demonstrating a significant increase in lipid peroxidation following incubation with oxLDL, compared to LDL or Con.

Figure 30A:
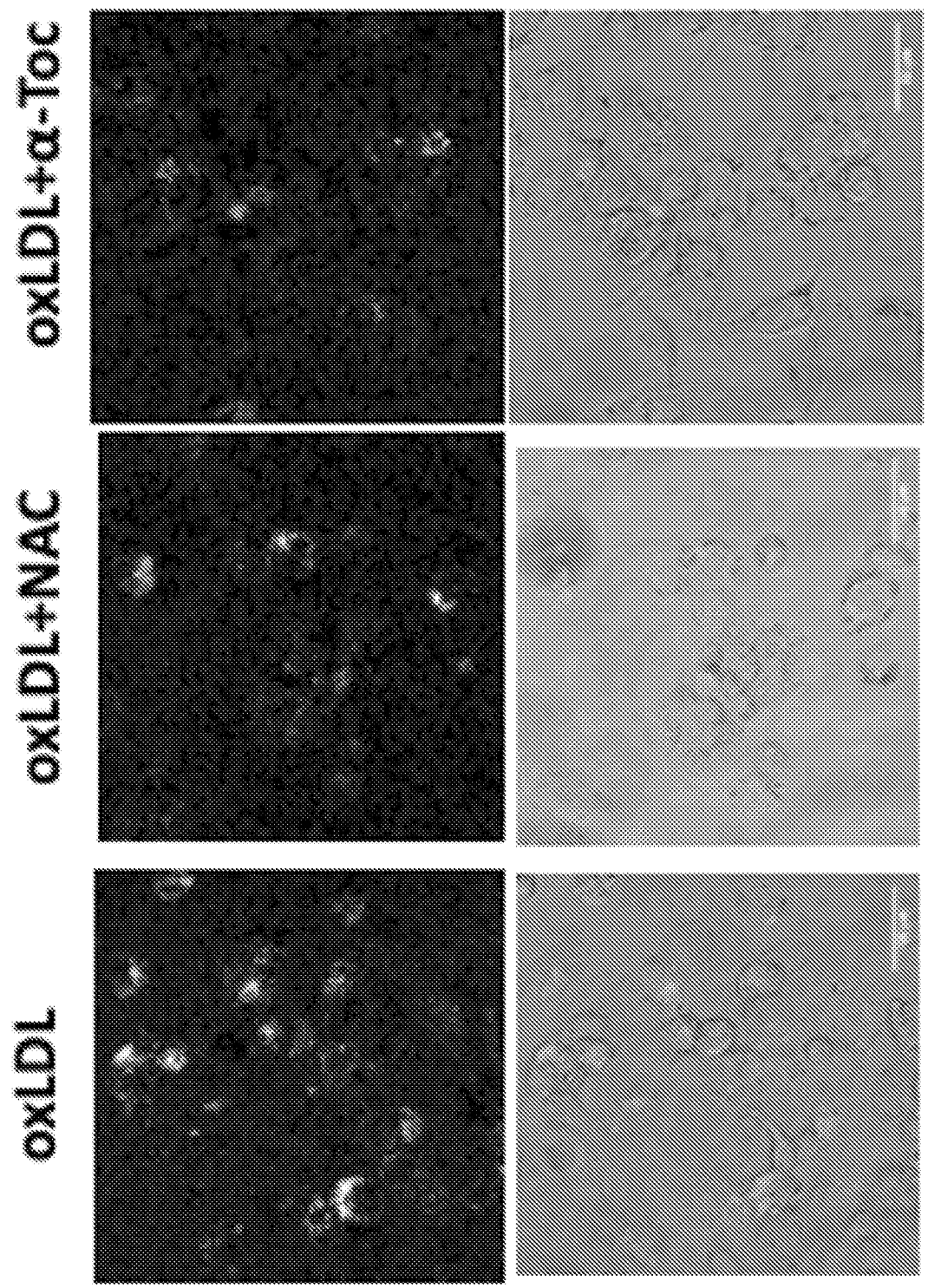

FIG. 30A shows NIRAF and BF images of THP-1 MDMs co-incubated with oxLDL and NAC 5 mM, or α-Toc 1 mM, for 5 days demonstrate a reduced NIRAF signal (magenta) compared to cells incubated with oxLDL alone.

Figure 30B:
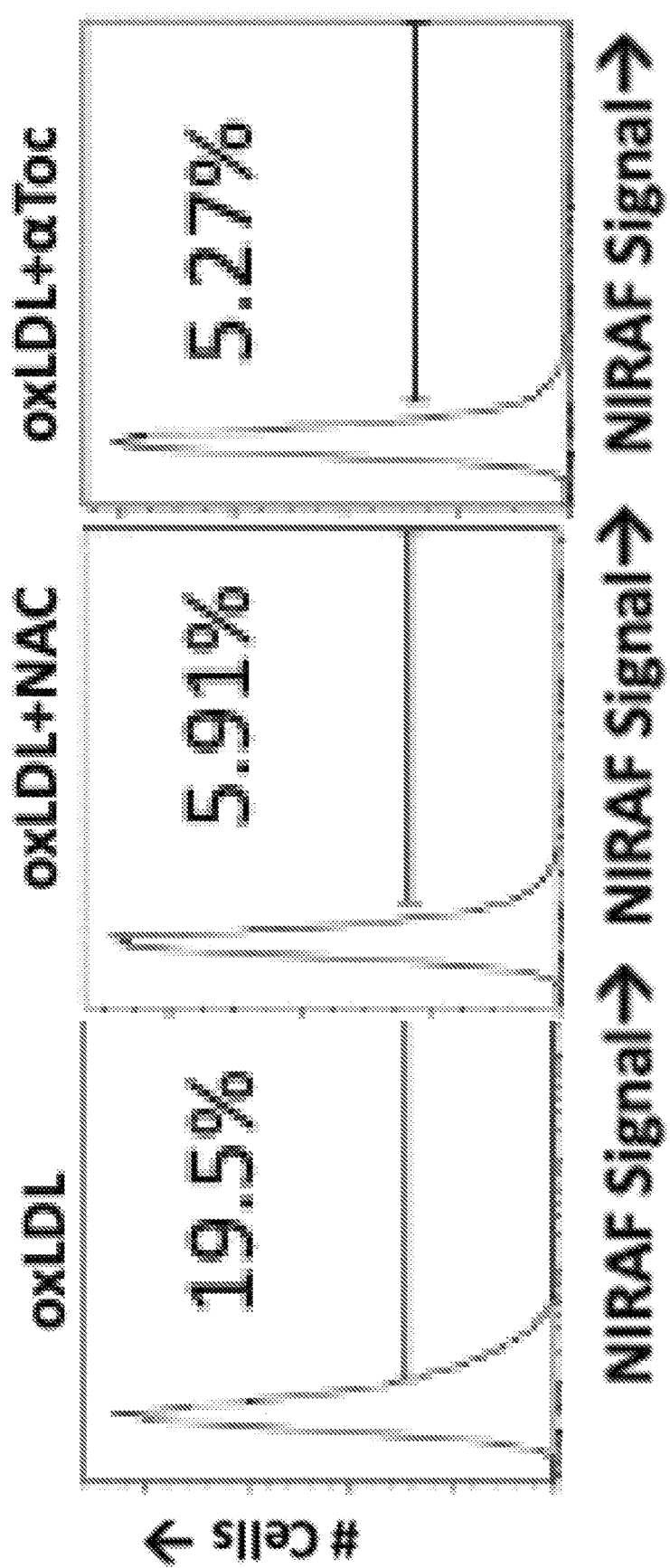

FIG. 30B shows flow cytometric analysis graphs that demonstrate a reduction in the percentage of NIRAF+ cells following incubation with either anti-oxidant compound N-acetylcystine ("NAC") or α-tocopherol ("α-Toc"). The x-axis for each of these graphs is the NIRAF signal (in increments of powers of 10 up to around $10^5$), while the y-axis is the number of cells (in increments of thousands, up to around four thousand).

Figure 31:
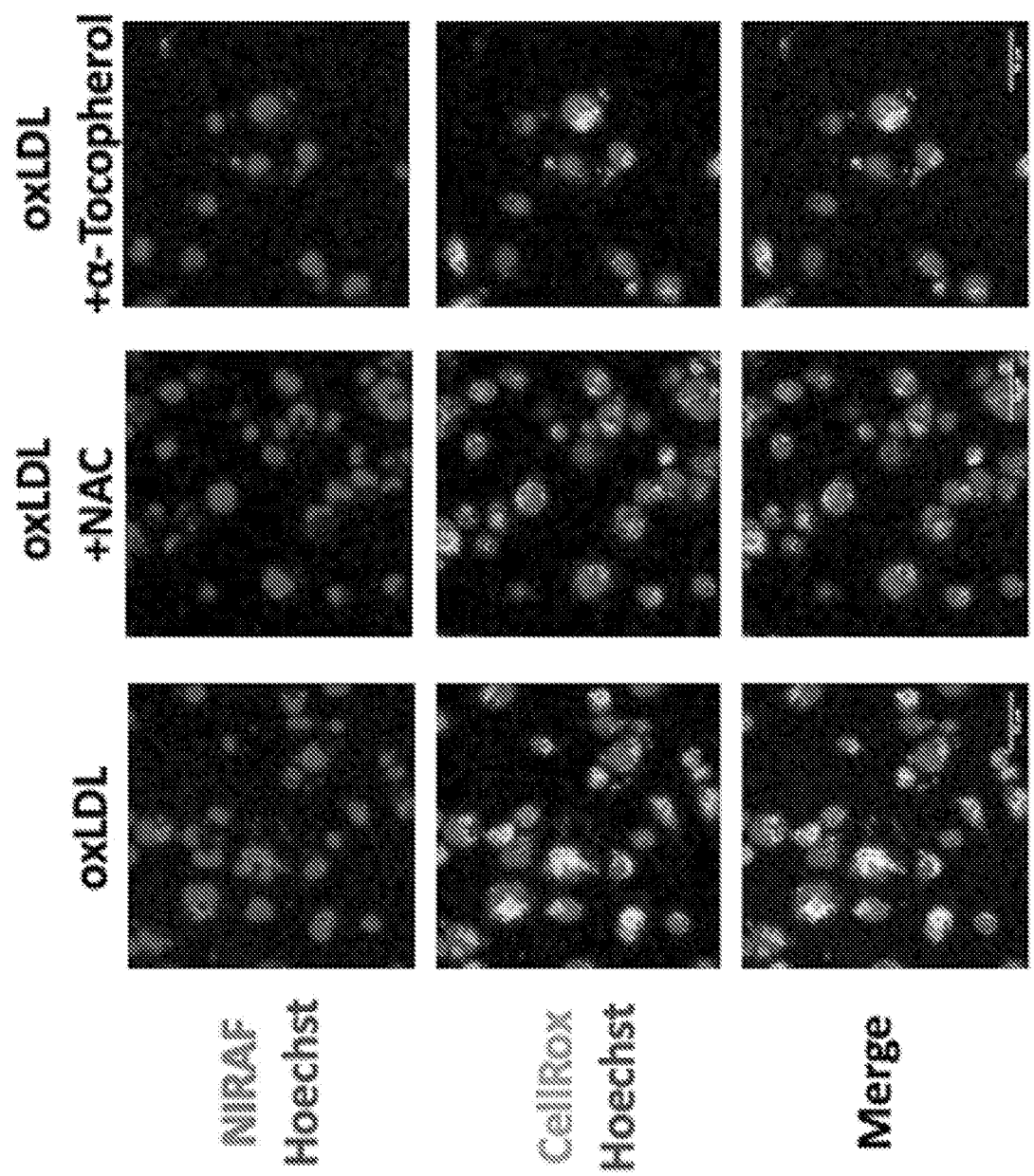

FIG. 31 shows various confocal microscopy images.

Figure 32A:
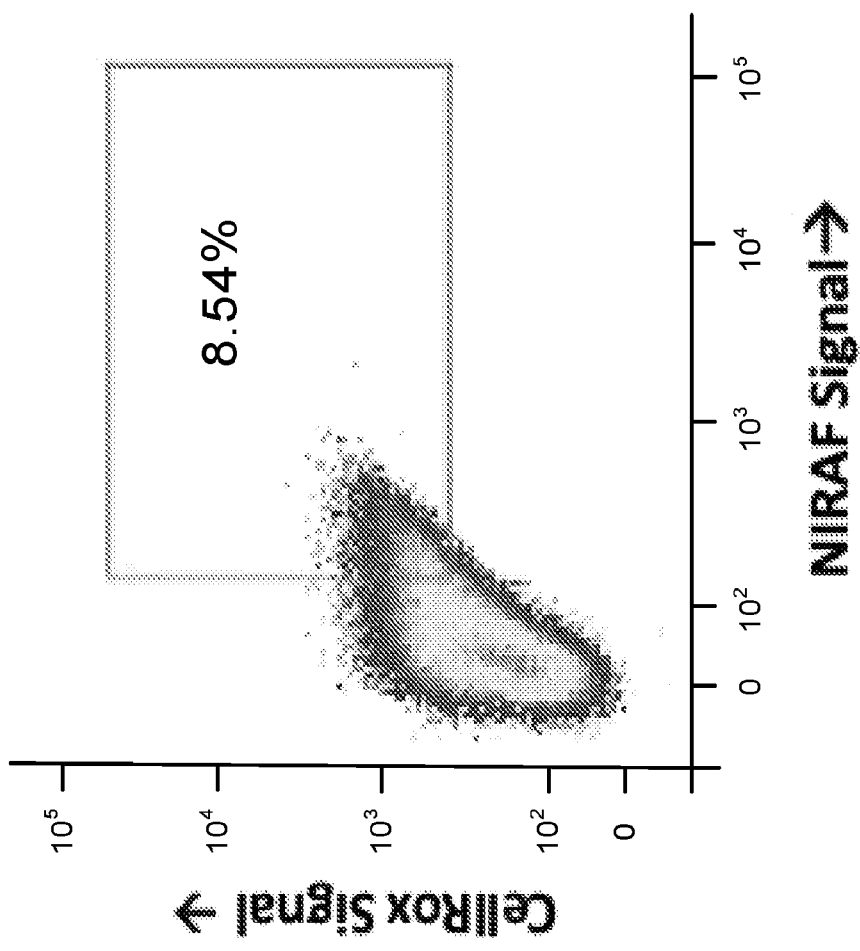
Figure 32B:
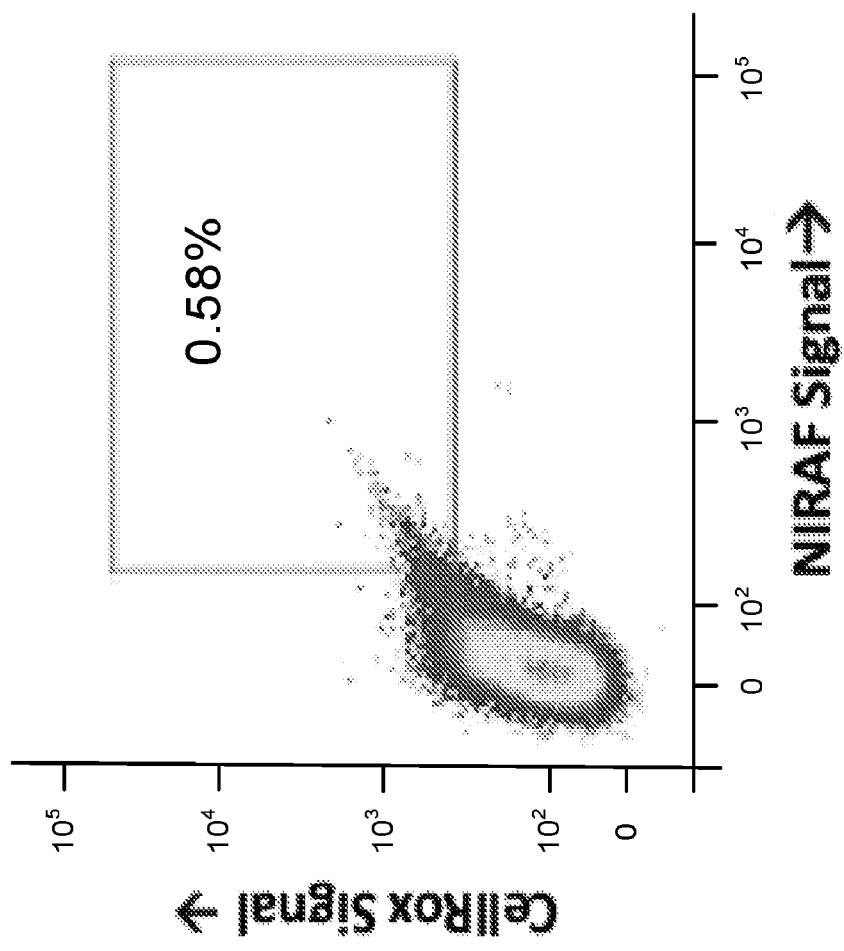
Figure 32C:
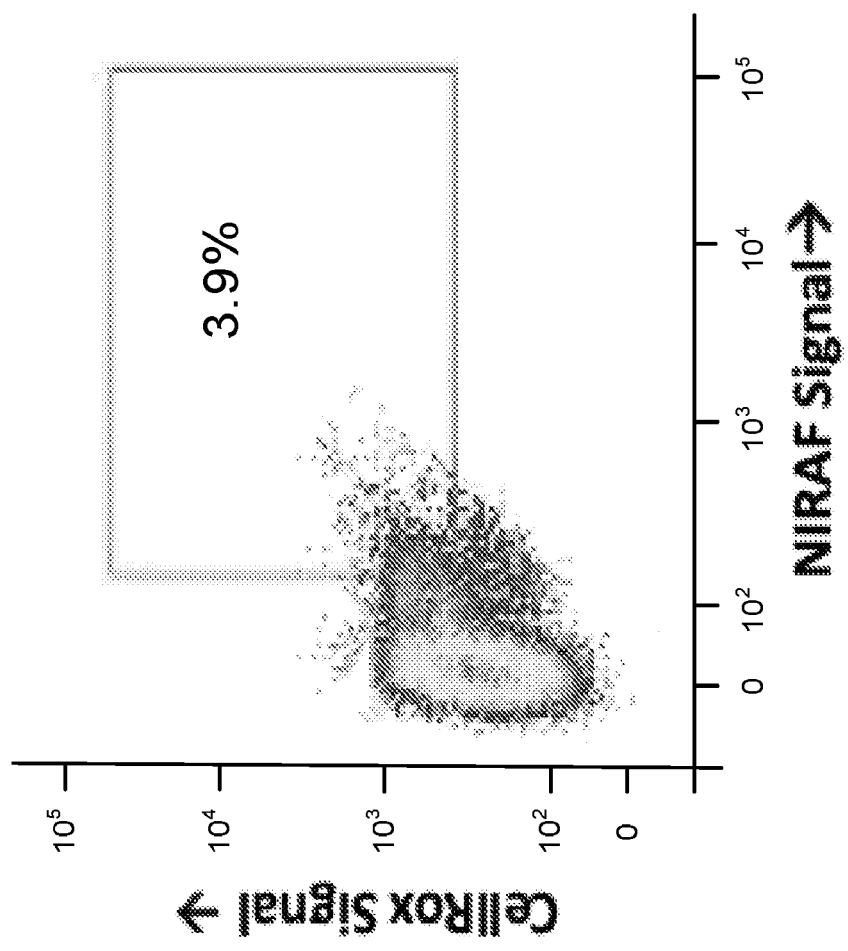

FIGS. 32A, 32B, 32C show flow cytometry graphs that demonstrate reduced numbers of CellROX-positive and NIRAF-positive cells that correspond to the categories of images of FIG. 31. In particular, FIG. 32A corresponds with oxLDL, FIG. 32B corresponds with oxLDL+NAC, and FIG. 32C corresponds with oxLDL+alpha-Tocopherol.

DETAILED DESCRIPTION

As described above, atherosclerotic plaque can cause ischemic events including acute myocardial infarction, sudden cardiac death, and angina. To better understand atherosclerotic plaque's relationship to myocardial infarction events, intracoronary imaging studies have revealed that in certain patients' with acute myocardial infarction, the "culprit" atherosclerotic lesion typically displays a ruptured overlying thin cap, a large plaque burden, and a necrotic, lipid-rich core. While these studies are helpful in uncovering the relationship between myocardial infarction and atherosclerotic plaque composition, these studies are not particularly helpful in predicting or preventing ischemic events related to atherosclerotic plaque. In fact, generally the ability of intravascular and noninvasive imaging to predict plaque-specific complications remains low.

Recently, near-infrared auto fluorescence ("NIRAF") has been used to analyze human carotid and aortic atherosclerosis specimens, specifically relating NIRAF to intraplaque hemorrhage ("IPH"). NIRAF has also been used along with optical coherence tomography ("OCT"), to analyze fibroatheromas in coronary artery disease ("CAD") patients in vivo. While these studies have also been helpful, they still lack the predictive power necessary to identify (and thus address) high-risk atherosclerotic plaques.

Some non-limiting examples of the disclosure address these drawbacks (and others) by providing near-infrared auto fluorescence imaging systems and methods that can identify high-risk regions (or in other words risk regions) of atherosclerotic plaques, monitor for changes in the stability (and oxidative stress) of atherosclerotic plaques (e.g., the ceroid of the atherosclerotic plaque), and the like. For example, some non-limiting examples of the disclosure show the relationship between high NIRAF signal intensities corresponding to a dense region of insoluble lipids and iron that can be indicative of a high-risk region of the atherosclerotic plaque. As another example, some non-limiting examples of the disclosure show the relationship between the NIRAF signals and the ceroid of the atherosclerotic plaque—an insoluble complex of lipids and proteins that are generated under conditions of oxidative stress. As yet another example, some non-limiting examples of the disclosure show a relationship between NIRAF signals and oxidative stress including the presence of iron—particularly that increases in the NIRAF signals (e.g., amplitude) are indicative of increases in oxidative stress (and vice versa).

FIG. 1 shows a schematic illustration of an imaging system 100. The imaging system 100 can include a computing device 102, a excitation source 104, and a detector 106. The computing device 102 can include typical computing components, such as, a processor device, memory, communication systems, a display, inputs (e.g., a mouse, a keyboard, a touch screen, sensors, and the like), power sources, and the like. In some cases, the computing device 102 can take on a variety of specific forms including a desktop, a laptop, a mobile device (e.g., a tablet, or a smartphone)., and the like. For example, in some cases, the computing device can be positioned external to a housing that includes the source 104 and the detector 106 positioned therein. In other cases, the computing device 102 can be positioned within the same housing as the excitation source 104, and detector 106, or both.

In some non-limiting examples, the computing device 102 can include a processor device, memory, communication systems, and the like, so as to communicate with another computing device (e.g., a desktop computer). In other cases, the computing device 102 can simply be implemented as a processor. Regardless of the implementation of the computing device 102, the computing device 102 can be in communication with the excitation source 104, and the detector 106. In this way, the computing device 102 can cause each of these components (or others) to implement a particular task (e.g., by sending instructions to the respective component), and can receive data from each of these components. For example, the computing device 102 can cause the excitation source 104 to emit visible light (i.e., electromagnetic radiation having a wavelength in a range between substantially 380 nm to substantially 600 nm) including red light, or near-infrared light (i.e., electromagnetic radiation having a wavelength in a range between substantially 600 nm and substantially 2500 nm). In some non-limiting examples, the excitation source 104 can emit light within the region between 500 nm and 1100 nm, or more particularly between 550 and 900 nm, or more particularly between 600 nm and 800 nm. In some specific cases, the computing device 102 can cause the excitation source 104 to emit red light having a wavelength of between 600 and 700 nm, or more specifically between 630 nm and 635 nm, or substantially (i.e., deviating by less than 20%, deviating by less than 10%, or deviating by less than 5%) 630 nm, or red light having a wavelength of between 720 and 780 nm, or substantially 750 nm. In some non-limiting examples, the excitation source 104 emits light within a wavelength range to excite ceroid where the excitation is in the red and/or near-infrared region. As another example, the computing device 102 can cause the detector 106 to acquire imaging data. The detector 106 can be configured to detect light within a specific range that is a lower energy than the range of the excitation range. For example, the excitation source 104 can be configured to emit light (e.g., red light, infrared light) that has a first wavelength, and the detector 106 is configured to detect light having a second wavelength that is greater (or substantially) than the first wavelength. In some non-limiting examples, the range of detection for the excitation of light between 550 nm and 900 nm corresponds to a detection wavelength range between 600 nm and 980 nm, and for the excitation of light between 600 nm and 800 nm the detection wavelength range is between 650 nm and 880 nm. In some non-limiting examples, the range of detection for a 630 nm excitation of light is 680 nm to 720 nm, or substantially 700 nm. The range of detection for 740 nm excitation of light is 770 nm to 810 nm, or substantially 790 nm (e.g., there may be a 40, 20, 10 or narrower range of detection). The specific range of detection may depend, for example, on the specific filters used and may be different from the above stated ranges.

In some non-limiting examples, the excitation source 104 can emit light having a wavelength between substantially 600 nm and substantially 1000 nm, or a wavelength between 600 nm and 1000 nm. In some cases, the light emitted from the excitation source 104 can have a wavelength of substantially 633 nm, or can have a wavelength of 633 nm.

In some non-limiting examples, the computing device 102 can communicate with other computing devices. For example, the computing device 102 can communicate with another computing device (not shown), which can be a computer, a laptop, smartphone, a server, and the like, which can include the another computing device causing the computing device 102 to implement a particular task, including causing the source 104 to emit light, and causing the detector 106 to acquire imaging data. As another example, the another computing device can receive data from the computing device 102 including raw data from the source 104 (e.g., duration of light emitted, properties of the light emitted including the wavelength(s), the intensity (or intensities), and the like), and raw data from the detector 106 (e.g., the position of a catheter system emitting the light within the blood vessel, the orientation of the catheter within the blood vessel, the imaging data acquired, and the like). In some cases, the another computing device can receive processed data from the computing device 102 including images (e.g., that have been reconstructed by the computing device 102), analyzed imaging data (e.g., that has been filtered), analyzed images (e.g., that have been thresholded), and the like. In some cases, other computing devices (including the another computing device) can be in communication (e.g., over a communication network, including WiFi) with the computing device 102 to share the computational load (e.g., by implementing portions of the processes described below). In this way, the computing device 102 can implement some or all portions of the processes described below (e.g., retrieved from memory), as appropriate.

The excitation source 104, and the detector 106 can be typically structured. For example, the excitation source 104 can be implemented to provide the necessary excitation wavelength of light needed (e.g., substantially 630 nm light, substantially 740 nm light, and the like), and the detector 106 can be implemented to sense the necessary emission wavelength of light (e.g., 700 nm light for the excitation wavelength of light of 630 nm, 790 nm light for the excitation wavelength of light of 740 nm). In some non-limiting examples, the excitation source 104, can be a laser, a light emitting diode ("LED"), a tungsten-halogen lamp, a mercury or xenon arc lamp and the like. In some cases, the detector 106 can include multiple light sources (e.g., LEDs), each configured to emit light having a different wavelength, or substantially different wavelengths. For example, the excitation source 104 can include a first light source that is configured to emit light having a first wavelength (e.g., 630 nm), and a second light source that is configured to emit light having a second wavelength. The second light source can be configured to emit a second wavelength of light that will, for example, correspond to the excitation wavelength of an exogenous probe such as the probes described, for example in 2010/0092389 or US2018/055953. In addition, multiple different excitation wavelengths of light can provide for greater specificity.

In some non-limiting examples, the detector 106 can be a two-dimensional ("2D") array of sensors (e.g., sensor elements), including a charge coupled device ("CCD"), an active-pixel sensor (e.g., a CMOS sensor), and the like. In some configurations, the detector 106 can include one or more optical filters that can mitigate (or block) transmission of one or more wavelengths of light from being received by the detector 106, which can include a wavelength of the excitation light from the excitation source 104. As shown in FIG. 1, the excitation source 104 and the detector 106 can be integrated with a catheter system 108 using single or multimode optical fibers. For example, a catheter system such as the system described, for example, in U.S. Pat. Nos. 9,332, 942, 10,912,462, or U.S. Pat. No. 10,952,616, each of which are incorporated by reference for this teaching. However, in alternative configurations, the excitation source 104 and the detector 106 can be integrated within a system that is external to a patient (e.g., to acquire imaging data of cell cultures, tissue slides, and the like). For example, in this case, the excitation source 104 and the detector 106 can form part of an imaging station, including the Kodak ImageStation 4000 (see, e.g., Carestream Health, Rochester, New York).

In some non-limiting examples, the detector 106 can be configured to acquire three-dimensional ("3D") imaging data of a region of interest of the biological target 110 (e.g., an artery of a patient). In this case, for example, the computing device 102 can receive the 3D imaging data, and can generate a 3D volume of the region of interest. In some cases, the imaging system 100 can be configured in a similar manner to the fluorescent-mediated tomography imaging system as described in U.S. Pat. No. 6,615,063 ("Ntziachristos"), which is incorporated by reference for this teaching. For example, Ntziachristos describes acquiring a 3D image, and thus the imaging system 100, including the excitation source 104 and the detector 106, can be configured to acquire one or more images that include a 3D image, or 3D imaging data of the biological target 110.

As shown in FIG. 1, the excitation source 104 emits and directs light having an excitation wavelength to a biological target 110. The biological target 110 absorbs the excitation light, and emits an emission wavelength of light (at a lower energy, or higher wavelength than the excitation wavelength), which is detected by the detector 106. In some configurations, such as when the excitation source 104 and the detector 106 are implemented in combination with the catheter system 108, the biological target 110 can be a blood vessel of a patient, and in particular, an artery of a patient. In other configurations, such as when the excitation source 104 and the detector 106 are implemented as an imaging station, the biological target 110 can be a tissue slide(s), a cell culture(s) (e.g., multiple dishes), or other ex-vivo biological system.

FIG. 2 shows a schematic illustration of a compound screening system 120. The compound screening system 120 can include an imaging system 122, a computing device 124, and a sample handling system 126. The imaging system 122 can be implemented in a similar manner as the imaging system 100. For example, the imaging system 122 can include an excitation source 128, and a detector 130, and a housing 132 that contains and supports the source 128 and the detector 130. In some cases, the source 128 can be implemented in a similar manner as the excitation source 104, while the detector 130 can be implemented in a similar manner as the detector 106. Although the detector 130 is illustrated in FIG. 2 as being positioned to the same side of a sample 134 as the source 128, in alternative configurations, the source 128 can be positioned to a first side of the sample 134 and the detector 130 can be positioned to a second side of the sample 134 opposite the first side. In this case, for example, a sample holder 136 that supports the sample 134 can be transparent to wavelength(s) of light that can be detected by the detector 130. Thus, the sample holder 136 does not block light from otherwise being received by the detector 130.

Similarly to the imaging system 122, the computing device 124 can be implemented in a similar manner as the computing device 102. For example, the computing device 124 can be a computer, a smartphone, a laptop, or can simply be a processor. The computing device 124 can be in communication with the imaging system 122, and the sample handling system 126, and thus can transmit instructions to (and receive data from) each of these components. For example, the computing device 124 can cause the source 128 to emit light towards the sample 134 (or other sample), and can cause the detector 130 to acquire imaging data of the sample 134.

The sample handling system 126 can be configured to move the sample holder 136 to different positions relative to the imaging system 122. For example, the sample handling system 126 can include an actuator(s) (not shown), each of which can be in communication with the computing device 124, to retract and extend thereby moving the sample holder 136 to different positions relative to the imaging system 122. For example, the sample handling system 126 can include a first actuator that can extend and retract along a first line, and a second actuator that can extend and retract along a second line that is substantially perpendicular to the first line. In this way, such as when the sample holder 136 includes a 2D array of samples, the computing device 124 can selectively retract and extend the first and second actuators to move the sample holder 136 so that each sample of the sample holder 136 is aligned with the imaging system 122 to acquire imaging data of the respective sample one at a time. In some cases, such as when this sample holder 136 includes a 1D array of samples, the sample handling system 126 can include a single actuator that can be selectively extended and retracted by the computing device 124 to bring each sample into alignment with the imaging system 122 to acquire imaging data of each sample one sample at a time.

In other cases, the sample handling system 126 can include a robot arm, in communication with the computing device 124, which can move each sample into alignment with the imaging system 122 to acquire imaging data, one sample at a time. In this case, for example, each sample 134, 138, 140, can have a respective sample holder so that each sample holder is separated from each other, and each is grasped and subsequently moved by the robot arm into (and out of) alignment with the imaging system 122. Alternatively, the robot arm can grasp and subsequently move the sample holder 136, to move the sample holder 136 to different positions, so that each sample can be brought into alignment with the imaging system 122 one at a time. In some non-limiting examples, the sample handling system 126 can include a dispensing system (not shown). The dispensing system can include actuators, valves, and the like, to dispense a compound (or a plurality of compounds, such as a cocktail of compounds) into each sample 134, 138, 140. In this way, the computing device 124 can cause the dispensing system to dispense a consistent amount of each compound(s) for contact with each sample 134, 138, 140 (e.g., into the well that supports the respective sample).

In some non-limiting examples, the sample holder 136 can be implemented in different ways. For example, the sample holder 136 can be a multiwell plate, including a microplate, a microwell plate, and the like. In this way, each sample 134, 138, 140 (and others) can be loaded within a respective well within each plate. In other cases, the sample holder 136 can be a holder that supports a plurality of petri dishes. In this case, for example, each sample 134, 138, 140 (and others) can be loaded into a respective petri dish, and supported by the holder. In some non-limiting examples, each sample 134, 138, 140 (and others) can include a cell culture (e.g., the same type and same amount of cell culture). In addition, regardless of whether the dispensing system of the sample handling system 126 dispenses the compound(s) to each sample 134, 138, 140 (and others), each sample 134, 138, 140 can include a different compound suspected of being an anti-inflammatory compound or an atheromatous plaque stabilizing compound, or different amounts of the same compound (e.g., that has already been determined to be anti-inflammatory or an atheromatous plaque stabilizing compound). For example, each sample 134, 138, 140 can be loaded with a different compound, but each different compound can have the same amount across the different compounds (e.g., to control for the amount of the compounds). As another example, each sample 134, 138, 140 can be loaded with the same compound (that has been previously determined to have anti-inflammatory or atheromatous plaque stabilizing properties), but with each sample 134, 138, 140 being loaded with different amounts of the same compound (e.g., so that each sample is serially diluted). In this way, the amounts (e.g., concentrations) of a compound determined to be anti-inflammatory or atheromatous plaque stabilizing can be optimized based on its anti-inflammatory or atheromatous plaque stabilizing properties.

In some non-limiting examples, the sample handling system 126 can move the sample holder 136 (which includes the different samples 134, 138, 140) so that only one sample 134, 138, 140 is brought into alignment with the source 128 and the detector 130 at a time. In other words, the sample handling system 126 can move the sample holder 136 (e.g., to a position) so that at one point in time imaging data of the sample 134 can be acquired by the imaging system 122 (e.g., by the instruction of the computing device 124), while imaging data of the samples 138, 140 cannot be acquired at the one point in time. Then, such as after the imaging system 122 has acquired imaging data of the sample 134, the sample handling system 126 can move the sample holder 136 (e.g., to a different position) so that at another point in time imaging data of the sample 138 can be acquired by the imaging system 122, while imaging data of the samples 134, 140 cannot be acquired, and so forth. In this way, multiple different samples each with different potential stabilizing or anti-inflammatory compounds (and with different amounts) can be screened, in a high throughput manner (e.g., with little to no external supervision, due to the sample handling system 126). In some non-limiting examples, the housing 132 of the imaging system 122 can define walls that can block light from being emitted from the source 128 and to a sample that is not in alignment with the imaging system 122, and that can block light emitted from a sample not in alignment with the imaging system 122 from being received by the detector 130.

Figure 3:
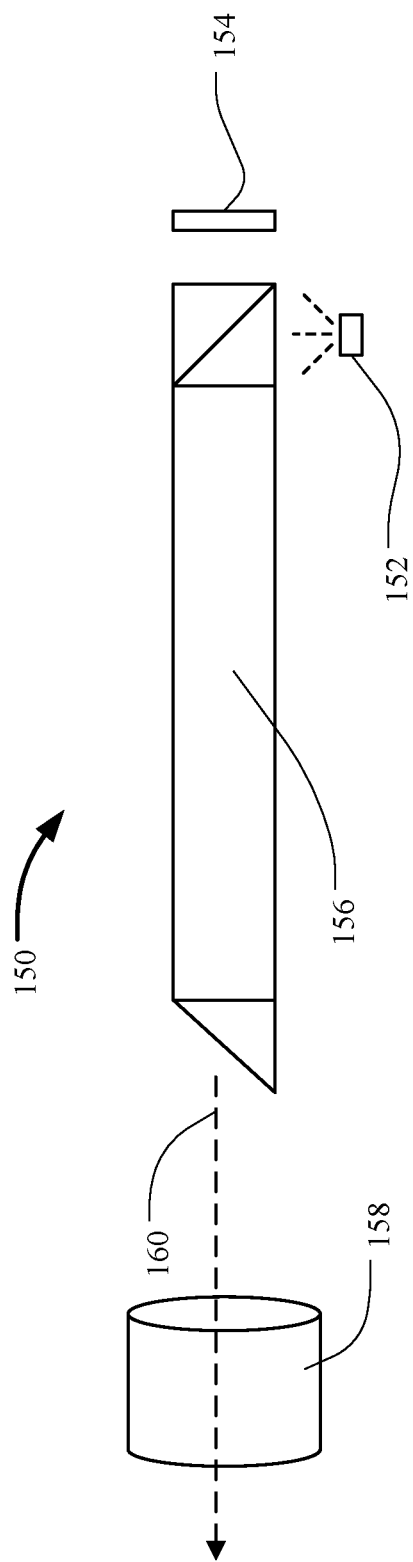
FIG. 3 shows an example of an imaging system.

FIG. 3 shows an example of an imaging system 150, which can be a specific implementation of the imaging system 100. The imaging system 150 can be implemented as a catheter system, which can be positioned within an artery (or other blood vessel) of a patient. The imaging system 150 can include an excitation source 152, a detector 154, and an optical fiber 156 that directs light from the excitation source 152 onto a blood vessel such as an artery 158. Fluorescent light is collected and guided by the optical fiber 156 to be sent to the detector 154. In some cases, the portion of the catheter emitting the excitation light and the portion of the catheter where fluorescent light (emission light) is collected and sent to the detector 156 can face the same direction, or opposing directions.

As shown in FIG. 3, the imaging system 150 can be rotated in either rotational direction about an axial axis 160 of the artery 158, which extends along a length of the artery 158, and which can be centrally located within the artery 158. In some cases, the axis 160 can follow the curvature of the artery 158, and thus the axis 160 can also curve. In some non-limiting examples, the imaging system 150 can be advanced along the axis 160 (or an axis that is parallel, or substantially parallel to the axis 160) so that the imaging system 150 can acquire imaging data of additional longitudinal sections of the artery 158 such as during pullback along a guidewire (not shown). Regardless, the imaging system 150 can acquire imaging data, including a plurality of fields of view (FOVs) of the artery 158. For example, the detector 154 can acquire a first set of imaging data, corresponding to multiple FOVs, by acquiring imaging data while the catheter is rotating. When the catheter is pulled back along a guidewire, the imaging data provides a 360° view of the interior of the arterial walls.

Figure 4:
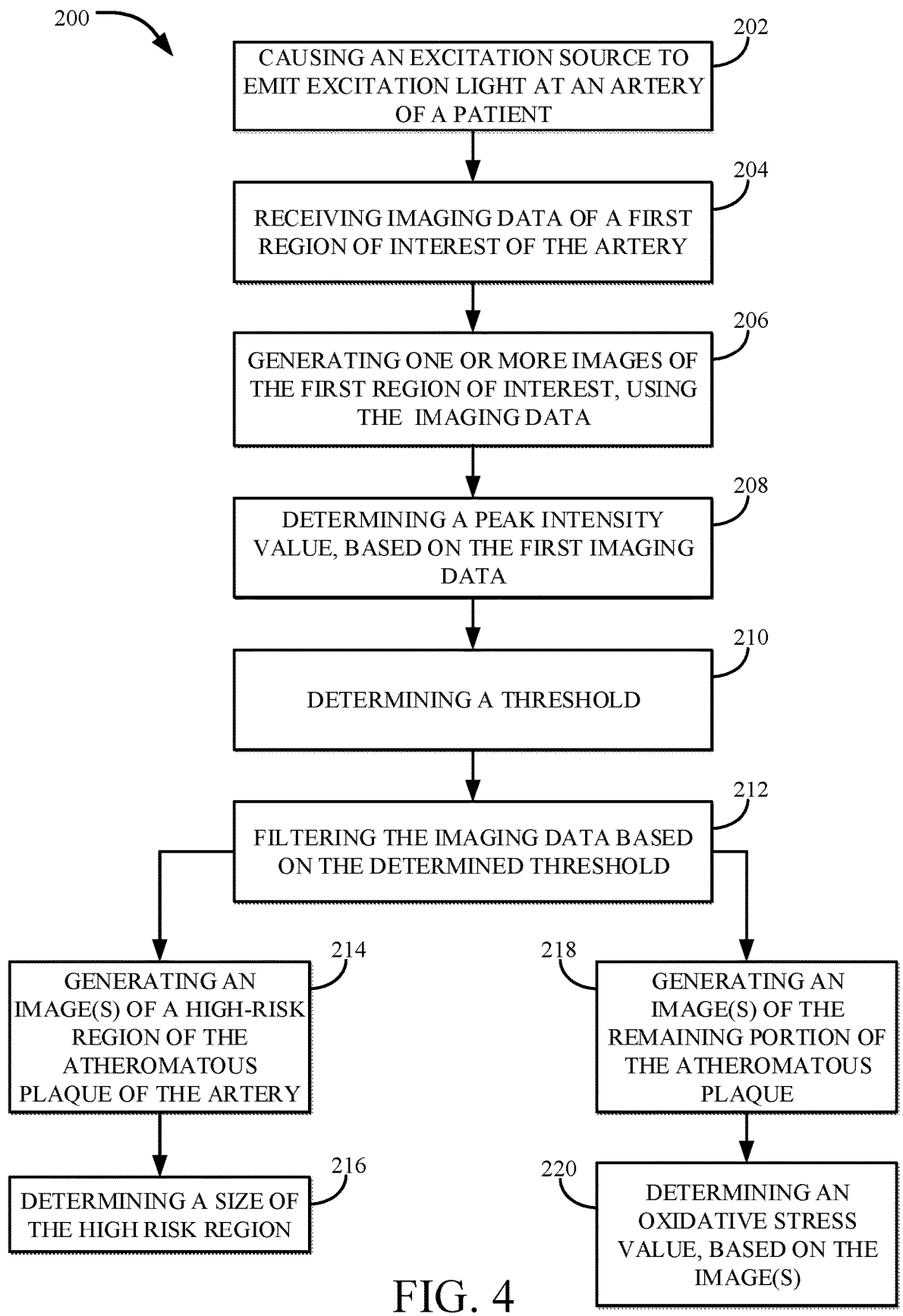
FIG. 4 shows a portion of a flowchart of a process for diagnosing a medical condition of a patient (e.g., an atherosclerotic disease).

FIG. 4 shows a flowchart of a process 200 for diagnosing a medical condition of a patient (e.g., an atherosclerotic disease), all or parts of which can be implemented on one or more computing devices (e.g., the processor device of the computing device 102). At 202, the process 200 can include a computing device causing an excitation source (e.g., the excitation source 104) to emit excitation light at a blood vessel (e.g., an artery) of interest. In some cases, such as when the excitation source 104 is implemented as part of a catheter system (e.g., the catheter system 108), the catheter system 108 is deployed within the patient, and advanced through the vascular system (e.g., the arterial system of the patient) until the optical fiber (e.g., the optical fiber 156) reaches the intended region of interest of the artery.

In some non-limiting examples, the process 200 can be implemented without the use of an imaging agent. Imaging agent, as described below, can refer to imaging contrast agents that absorb or alter external electromagnetism or ultrasound, radiopharmaceuticals that emit radiation detected by an imaging system, and the like. In some cases, imaging agent can refer to a diagnostic imaging agent that enhances contrast of an image inside the body. Thus, in some cases, an imaging agent is not administered to the patient before or during excitation of a region of interest with excitation light, an imaging agent is not administered to the patient before or during receiving imaging data from a detector, or both.

At 204, the process 200 can include a computing device receiving imaging data (e.g., from a detector) of a first region of interest of the artery. In some cases, the imaging data can include a single image having a single corresponding FOV of a portion of the blood vessel, or multiple images each having a corresponding FOV that includes a respective portion of the blood vessel. For example, while the detector is fixed, fluorescent light that is received by the detector can be used to generate the some (or all) of the imaging data (e.g., that corresponds to one FOV). Regardless of the configuration, imaging data that includes multiple corresponding FOVs can collectively span the entire atherosclerotic plaque region even if the atherosclerotic plaque region is larger than the 2D surface of the detector. In some non-limiting examples, receiving the imaging data at the block 204 can include a computing device receiving 3D imaging data of the first region of interest of the artery.

At 206, the process 200 can include a computing device generating one or more images of the first region of interest using the imaging data. In some cases, the one or more images can be a single image that corresponds to a single FOV, or multiple images with multiple FOVs some of which partially overlapping, not overlapping at all, or entirely overlapping. For example, a computing device can reconstruct multiple images from different FOVs and can combine them together (e.g., by image stitching) to form a composite image. In some non-limiting examples, including when the imaging data is 3D imaging data, the block 206 of the process 200 can include generating a 3D volume of the first region of interest, using the 3D imaging data.

At 208, the process 200 can include a computing device determining a peak intensity value based on the imaging data. In some cases, a computing device can determine the peak intensity value from the generated image (or in other words the reconstructed image), which can include a computing device determining the maximum pixel value within the image. In other cases, a computing device can determine the peak intensity using the imaging data itself (e.g., the raw imaging data), which can include a computing device determining the highest signal intensity value. In still other cases, the peak intensity value can be a voxel value (e.g., a maximum voxel value within the 3D imaging data).

In some non-limiting examples, at the block 208, the process 200 can include a computing device determining an intensity value, based on the imaging data. In some cases, this can include a computing device determining a distribution of the intensity values of the imaging data, and determining whether or not the distribution of the intensity values is multimodal. If the computing device determines that this distribution is multimodal, then the computing device can identify each peak and the corresponding intensity for each peak. Then, a computing device can determine the intensity value based on the intensity value of each peak. For example, the intensity value can be a value that is positioned between two peaks, including the peak having the highest intensity value and the peak having the next highest intensity value. In some non-limiting examples, a similar process can be used to determine a pixel value. For example, a computing device can determine a pixel value distribution over the pixel positions. In other words, the pixel value distribution can span over two dimensions (e.g., corresponding to the position of the pixels). Then, a computing device can determine whether or not the pixel value distribution is multimodal, and if so, can determine each peak and the corresponding pixel value for each peak. Then, the pixel value can be determined based on the pixel intensity values of each peak, including a pixel intensity value that is positioned between two peaks including the peak having the highest pixel intensity value. While this discussion has been described with reference to pixels, in some cases, voxels can be substituted for the pixels, and thus a voxel intensity value can be determined using the processes described with reference to pixels.

At 210, the process 200 can include a computing device determining a threshold (e.g., a signal intensity threshold, a pixel threshold, a voxel threshold, and the like). For example, a computing device can determine a threshold based on the determined intensity value (e.g., the peak intensity value determined at the block 208), the determined pixel intensity value (e.g., the maximum pixel intensity value). In some cases, the threshold can correspond to an intensity value (e.g., an intensity value, a pixel intensity value, and the like) that is situated between two intensity value peaks, with one peak being the peak having the highest intensity value. In this way, and as described below, some non-limiting examples of the disclosure have shown that intensity values that are near the maximum intensity value correspond to a high-risk region (or in other words a risk region) of the atherosclerotic plaque of the artery of the patient. And thus by setting the threshold to so that other intensity values other than the highest range are excluded can refine the images to only include high-risk regions of the atherosclerotic plaque, which is or can include a lesion. Accordingly by identifying, and extracting the high-risk region, the high-risk region itself can be more easily evaluated. In some cases, the high-risk region can be indicative of an amount (e.g., a concentration) of the ceroid within the atherosclerotic plaque. In other words, the high-risk region can correlative with the amount of the ceroid within the atherosclerotic plaque, so that increased size in the high-risk region are indicative of larger ceroid amounts (and vice versa). In some non-limiting examples, the high-risk region of the atherosclerotic plaque can correspond to a stenotic portion of the atherosclerotic plaque. Correspondingly, the remaining portion of the atherosclerotic plaque (e.g., not including the high-risk region) can correspond to a nonstenotic portion of the atherosclerotic plaque.

In some non-limiting examples, the threshold can be a value (e.g., an intensity value), or a range (e.g., of intensity values). For example, the range can be defined by a range that is between substantially or exactly the maximum intensity value (e.g., a maximum pixel value, a maximum voxel value) and a second intensity value (e.g., a second pixel value different from the maximum pixel value, a second voxel value different from the voxel value). The second intensity value can be a percentage (e.g., 5%, 10%, 20%, 25%, 50%, 75%, 90%, and the like) of the maximum intensity value. In other cases, the threshold can be an intensity value that is situated between two intensity peaks (e.g., a multimodal distribution), with one intensity peak being the peak having the highest intensity. For example, the threshold can be an intensity value that is situated in a trough (e.g., of the intensity distribution) between two intensity peaks with one intensity peak being the peak having the highest intensity. As another example, the threshold can be an intensity value that is the intensity value of a second highest peak in the distribution. In this way, all the intensity values that are below the second highest peak in the distribution can be removed by a computing device.

In some non-limiting examples, the block 210 can include a computing device determining a threshold based on a change in intensity values of a distribution being greater than a threshold value (e.g., magnitude of a slope). In other words, the threshold can be the intensity value of the distribution at the location within the distribution in which the magnitude of the slope of the change in intensity values is greater than a threshold value. In this way, the threshold can be set so that pixels, intensity values, voxels, and the like, greater than (or equal to) the threshold can be kept (e.g., that correspond to high-risk regions), while pixels, voxels, or intensity values less than the threshold can be removed (or in other words rejected).

In some non-limiting examples, the threshold at the block 210 can be a predetermined threshold. For example, this predetermined threshold can be an intensity value that is indicative of a high-risk region of the plaque. In other words, the threshold can have been previously determined, based on the determination that intensity values greater than or equal to the threshold are indicative (or in other words are characteristic of) a high-risk region of the plaque. In this case, for example, the block 210 can be omitted as appropriate.

Figure 6:
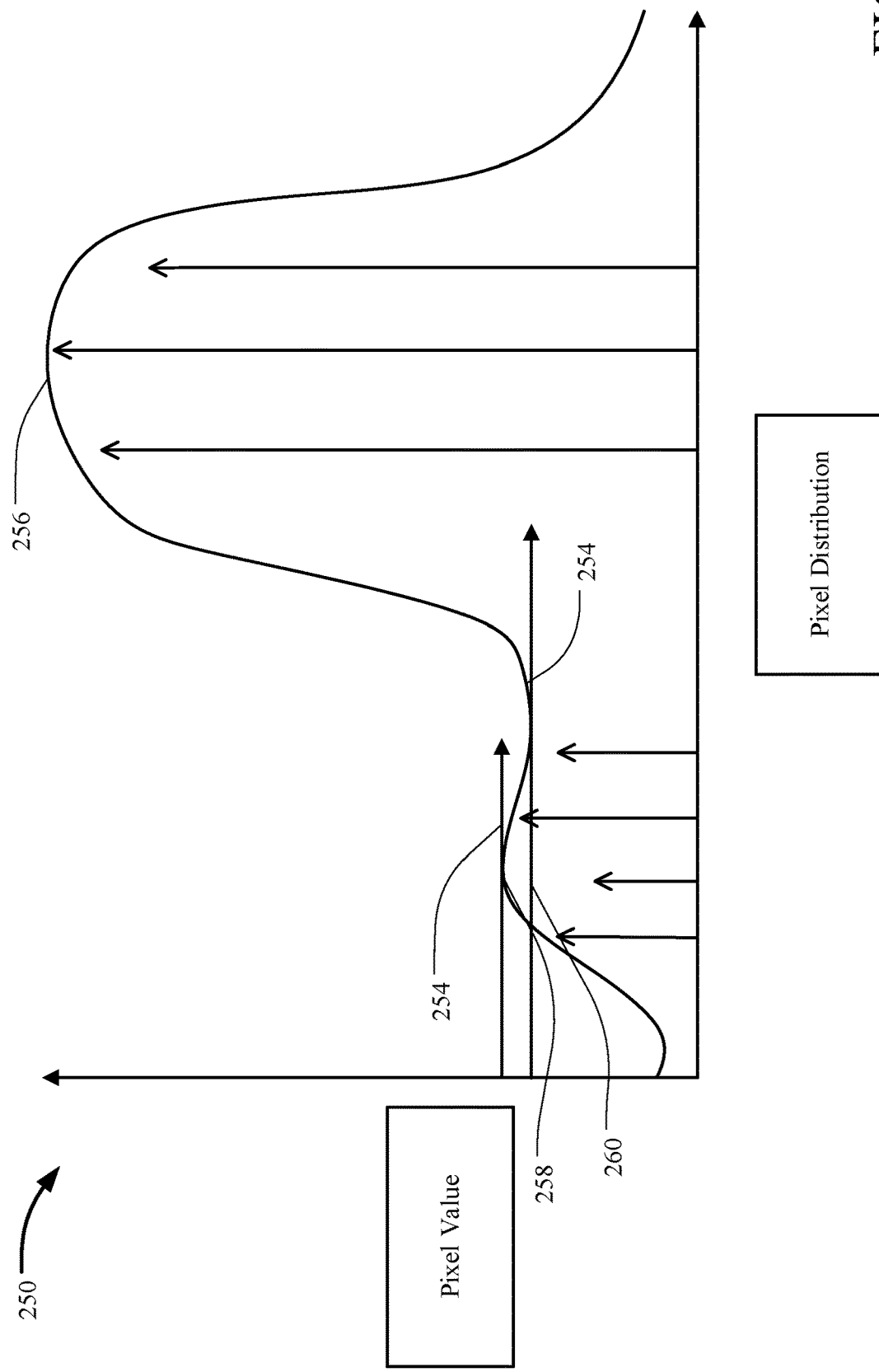
FIG. 6 shows a graph of pixel values for each pixel of a pixel distribution of imaging data.

FIG. 6 shows a graph 250 of the pixel values (corresponding to the intensity values) for each pixel of a pixel distribution of imaging data (e.g., of a reconstructed image). The pixel distribution has a first pixel group that defines a peak and includes the maximum pixel value. The pixel distribution also includes a second pixel group that defines a peak, but which does not include the maximum pixel value. As shown in FIG. 6, an intensity threshold value 252 can be defined as an intensity value within a trough 254 between the peak 256 of the first pixel group and the peak 258 of the second pixel group. In some cases, the intensity threshold value 252 can be the intensity value of the lowest intensity value of the trough 254. In other cases, an intensity threshold value 260 can be an intensity value within the peak 258, which can be the greatest intensity value of the peak 258.

In some non-limiting examples, including when peaks of an intensity distribution are relatively close or overlap considerably, a computing device can present a graph (such as the graph 250) on a display for a user to evaluate. In this way, a user can adjust an intensity threshold by adjusting the intensity value, or intensity range (in other words an intensity window) that defines the threshold. Thus, a computing device can receive a user input that defines (or is indicative of) the threshold.

Referring back to FIG. 4, at 212, the process 200 can include a computing device filtering the imaging data. In some cases, this can include a computing device filtering the intensity values (e.g., the raw intensity values), filtering pixel values (e.g., spatially), filtering voxel values, and the like. In other cases, this can include a computing device filtering one or more images (e.g., the one or more images generated, or otherwise received, at the block 206). In some non-limiting examples, the block 212 can include a computing device thresholding an image. For example, the block 212 can include a computing device thresholding the imaging data, based on the determined threshold at the block 210. This can include a computing device removing (or replacing) intensity value(s) (e.g., raw data points from the imaging data, pixels, and the like) that exceed the threshold determined at the block 210. For example, such as when the threshold is a threshold intensity value, a computing device can remove all the pixels having intensity values that are lower than the threshold value. As another example, a computing device can replace each pixel that has an intensity value that is lower than the threshold value with an intensity value (e.g., an intensity value of 0). Regardless of the configuration, filtering the imaging data (or image(s)) according to the determined threshold, can remove portions of the imaging data (or image(s)) that are not high-risk regions, leaving only the high-risk regions (and vice versa). In this way, the imaging data (or image(s)) can be separated into groups that have common properties, which can allow for better analysis of these respective regions. While this discussion has been framed around pixels, in other configurations, these processes can be implemented for filtering voxels of the 3D volume (e.g., generated at the block 206).

At 214, the process 200 can include a computing device generating an image(s) of a high-risk region of the atheromatous plaque of the artery, based on the imaging data, an in particular, based on the filtered imaging data. For example, if the one or more images of the region of interest has not already been generated (e.g., the block 206 has been omitted), a computing device can filter (e.g., threshold) the imaging data to generate filtered imaging data that only has intensity values that are greater than the intensity threshold. Then, a computing device can, using this filtered imaging data, generate an image of the high-risk region of the atheromatous plaque. In other cases, such as if the one or more images of the region of interest of the artery have already been generated at the block 206 (or in some cases received at the block 206), and thresholded by a computing device (e.g., at the block 212), then the resulting image(s) is the image of the high-risk region of the plaque of the artery. In some non-limiting examples, the block 214 can include a computing device generating a 3D volume of a high-risk region of the atheromatous plaque. For example, a computing device can generate this 3D volume by utilizing the one or more images of the high-risk region, or can generate this 3D volume as a result of filtering the voxels at the block 212.

At 216, process 200 can include a computing device determining a size of the high-risk region of the atheromatous plaque, based on the image(s) of the high-risk region of interest of the atheromatous plaque. In some cases, this area can be calculated and can be scaled appropriately based on a measurement that relates one or more dimensions to this area (or the image(s)) to a real-world size (e.g., the ratio between a row or column of pixels to millimeters). In some cases, this can include a computing device determining the size of each pixel of the detector, and determining the number of contiguous pixels (or just total pixels) to determine an area of the high risk region. In some cases, including when multiple images of the high-risk region of the atheromatous plaque have been generated (e.g., at the block 214), a computing device can combine the multiple images together (e.g., by image stitching) to generate a composite image of the high-risk region of the atheromatous plaque. Then, a computing device can determine the size of the high-risk region of the atheromatous plaque from the composite image. In some cases, a computing device can determine a size of the high-risk region from the 3D volume of the high-risk region (and from, in some cases, a real-world scaling value that relates the voxels to a real-world reference value).

At 218, the process 200 can include a computing device generating an image(s) of the remaining portion of the atheromatous plaque (e.g., the region of the atheromatous plaque that does not include the high-risk region). For example, in some cases, a computing device can subtract the image of the high-risk region of the atheromatous plaque (e.g., acquired at the block 214) from the image of the region of interest of the artery (e.g., acquired at the block 206) to generate the image of the remaining regions of the atheromatous plaque. In other cases, the threshold (e.g., acquired at the block 210) can be applied to the imaging data, the image(s), and the like, to remove the imaging data (pixels) that corresponds to the high-risk region of the atheromatous plaque to generate an image(s) of the remaining portions of the atheromatous plaque. In some non-limiting examples, this can include a computing device generating a 3D volume of the remaining portion of the atheromatous plaque. For example, this can include a computing device subtracting the 3D volume of the high-risk region from the 3D volume of the atheromatous plaque to generate the 3D volume of the remaining portion of the atheromatous plaque.

At 220, the process 200 can include a computing device determining an oxidative stress value (e.g., an amount of oxidative stress, or in other words quantifying the degree of oxidative stress), based on the image(s) (or imaging data that forms the image(s)) of the atheromatous plaque that does not include the high-risk region. As described below, some non-limiting examples of the disclosure show that the signal intensities are related to the oxidative stress of the atheromatous plaque (e.g., regions of the atheromatous plaque not including the high-risk region). So, a computing device can determine an oxidative stress value that relates to the degree of oxidative stress by summing all the intensity values (e.g., pixel values), averaging all the pixel values, and the like, within the image(s) (or imaging data used to form the image(s)) acquired at the block 218 of process 200. In some non-limiting examples, a computing device can display or compare this oxidative stress value to an oxidative stress threshold, and based on the oxidative stress value being above the threshold, can present on a display an alert, or otherwise notify a user and can be used to generate a remedial treatment plan. In some cases, including when multiple images of the remaining region of the atheromatous plaque have been generated (e.g., non-high-risk regions of the atheromatous plaque), a computing device can combine the multiple images together (e.g., by image stitching) to generate a composite image of the remaining region of the atheromatous plaque. Then, a computing device can determine the oxidative stress value of the remaining region of the atheromatous plaque, based on the composite image. In some non-limiting examples, the block 220 can include a computing device determining an oxidative stress value based on the 3D volume of the remaining portion of the atheromatous plaque. For example, this can include a computing device summing (or averaging) all the voxels within the 3D volume of the remaining portion of the atheromatous plaque.

Figure 7:
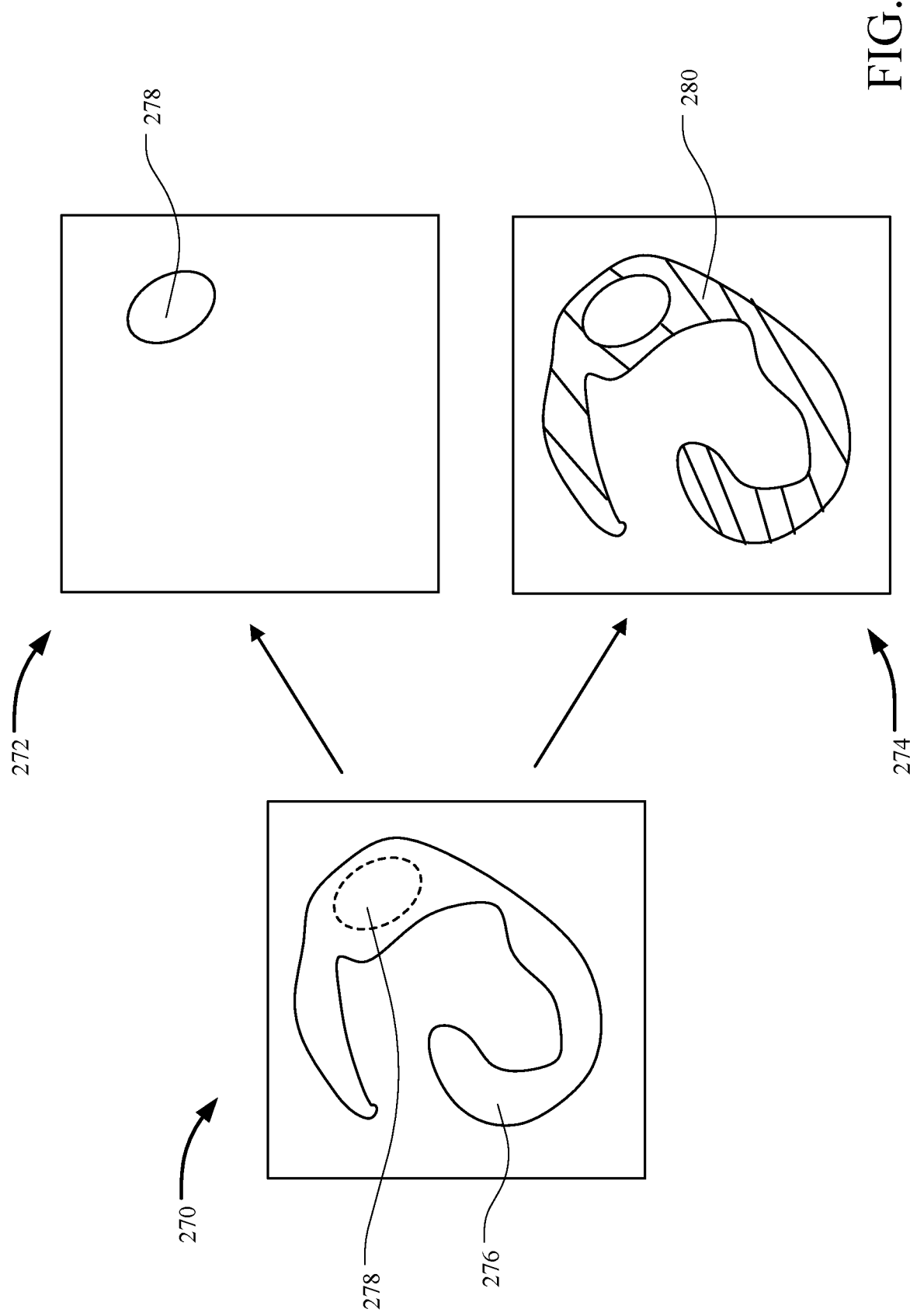
FIG. 7 shows a schematic illustration of images of an atheromatous plaque of a patient.

FIG. 7 shows a schematic illustration of images 270, 272, 274 of an atheromatous plaque of an artery of a patient to illustrate the image processing steps above. For example, image 270 includes atheromatous plaque 276 having a high-risk region 278. Although a cross-sectional view of the images 270, 727, 274 are shown largely for simplicity, images including of the interior wall of a blood vessel (e.g., an artery) are contemplated. Using the processes above, for example, the high-risk region 278 can be extracted from the image 270 to generate the image 272, which is only of the high-risk region 278 of the atheromatous plaque 276. Similarly, using the processes above, for example, the high-risk region 278 of the atheromatous plaque 276 can be removed to generate the image 274 of the atheromatous plaque 276 that only includes the remaining region 280 (e.g., the atheromatous plaque 276 minus the high-risk region 278).

Figure 5:
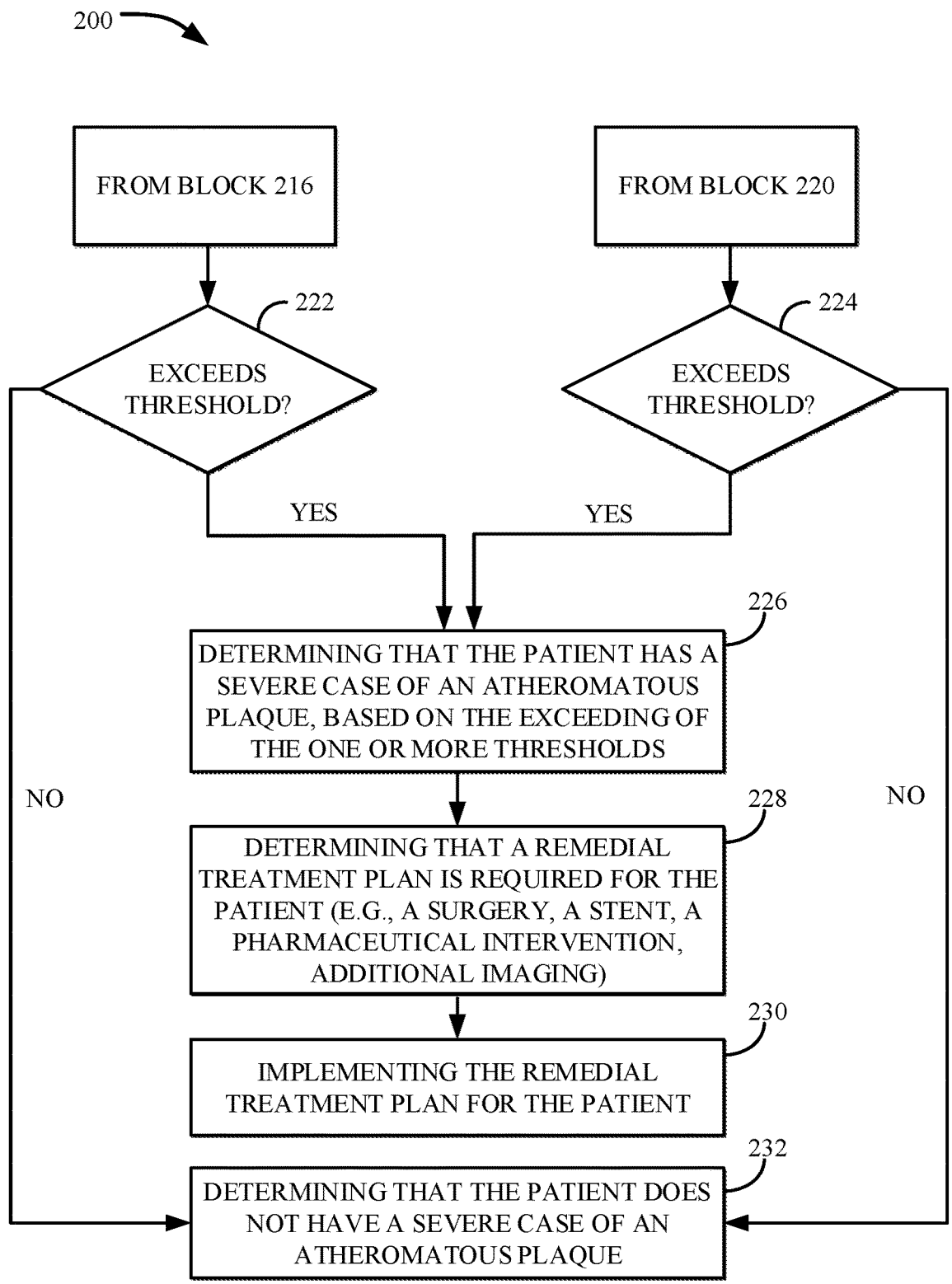
FIG. 5 shows another portion of the flowchart of the process of FIG. 4.

Referring back to FIG. 5, at 222, the process 200 can include a computing device determining whether or not the high-risk region of the atheromatous plaque (e.g., generated at the block 214) exceeds a threshold. For example, the threshold can include a size of the high-risk region of the atheromatous plaque, a shape of the high-risk region of the atheromatous plaque, or both. As a more specific example, a computing device can compare the size of the high-risk region of the atheromatous plaque (e.g., determined at the block 216) and determine whether or not the size exceeds a size threshold, which can facilitate the determination of an existence or extent of an atherosclerotic disease state. In some cases, the size threshold can be a value that is or is greater than 0.5 cm (e.g., 0.5 cm or substantially 0.5 cm), a value within a range that is between substantially 0.5 cm to substantially 2 cm. In some cases, the size threshold can be substantially 3.5 $mm^2$. In some configurations, the size threshold can be a radial thickness (e.g., substantially 75 mm), a volume value (e.g., 3.5 $mm^2$, 4 $mm^2$, and the like), and the like. In other cases, the size threshold can be a percentage of the remaining luminal cross-sectional area and the total cross-sectional area. For example, a computing device can divide the remaining luminal cross-sectional area for a location of the artery that does not include tissues (including atheromatous plaque) by the entire cross-sectional area at the location of the artery to generate a percentage (e.g., an obstruction percentage). In some cases, this percentage can be substantially or exactly 60%. In still other cases, the size threshold can be the circumferential extent of the atheromatous plaque. For example, in this case, the size threshold can be a circumferential extent of substantially or exactly 180 degrees around the artery at a location of the artery.

In some non-limiting examples, at the block 222, if the computing device determines that the size of the high-risk region of the atheromatous plaque exceeds (e.g., is greater than) the size threshold, then the process 200 can proceed to the block 226. Alternatively, however, if the computing device determines that the size of the high-risk region of the atheromatous plaque does not exceed (e.g., is less than) the size threshold, then the process can proceed to the block 232. In some cases, the size threshold can be a multiple of (or the same size) as the size of the high-risk region of the atheromatous plaque of the same patient that has been previously acquired as a baseline image. For example, this baseline image can be acquired previously from the process 200 (e.g., prior to the block 204 of the process 200). In this way, the size threshold can be tailored to the specific patient to serve as a patient specific reference point, so that, for example, the size threshold can be set, by the computing device, to be related to the size of the high-risk region that was previously determined (e.g., being 10 percent, 20 percent, 30 percent, 40 percent, 50 percent, and the like, greater than the previously determined size of the high-risk region). Thus, for example, the image(s) generated at the block 214 can be subtracted from a baseline image(s) of the high-risk region of the atheromatous plaque to generate a subtracted image (s). In this way, any positive intensity values indicate an increase in size of the high-risk region, while negative intensity values indicate a decrease in a size of the high-risk region. Correspondingly, the magnitude of the intensity values of the subtracted image can correspond to an increase in risk for the high-risk region.

In some non-limiting examples, the block 222 can include a computing device determining a shape of the high-risk region of the atheromatous plaque, and determining whether or not the shape of the high-risk region exceeds a shape threshold. In some cases, determining the shape of the high-risk region can include a computing device determining a uniformity, or deviations in uniformity of the high risk region. For example, this can include a computing device determining the extent the high-risk region of the plaque that corresponds to a uniform shape (e.g., an oval), which can include the amount of overlap of the areas between the uniform shape and the high-risk region. As another example, this can include a computing device determining a perimeter of the high-risk region, and determining each curve of the perimeter and the corresponding radius of curvature of the curve. As yet another example, the shape threshold can include a shape of the high-risk region of the atheromatous plaque that has been previously acquired as a baseline image. For example, the shape threshold can be the amount of overlap in area (or volume) between a previously acquired high-risk region of the atheromatous plaque that has been scaled to a different size (e.g., by increasing or decreasing the total size of the previously acquired high-risk region) and the current high-risk region. In this way, the shape of the high-risk region of the atheromatous plaque that is indicative of a disease state or shapes of the high-risk region of the atheromatous plaque that are relatively benign can be used to determine whether or not the change in shape is indicative of a atherosclerotic disease state. Accordingly, the shape threshold can be a percentage of overlap in area (or volume) between a shape (e.g., a uniform shape) and the high-risk region, a radius of curvature, and the like. In some cases, if a computing device determines that the shape of the high-risk region of the atheromatous plaque exceeds the shape threshold, then the process 200 can proceed to the block 226. If, however, the computing device determines that the shape of the atheromatous plaque exceeds the shape threshold, then the process 200 can proceed to the block 232.

In some non-limiting examples, at the block 222, the process 200 can proceed to the block 226 only if the size of the atheromatous plaque exceeds the size threshold, and the shape of the atheromatous plaque exceeds the shape threshold. Thus, if the size of the atheromatous plaque does not exceed the size threshold, or the shape of the atheromatous plaque does not exceed the shape threshold, the process 200 can proceed to the block 232. However, in other cases, the process 200 can proceed to the block 226 (or the block 232), if only one of the size of the atheromatous plaque exceeds the size threshold, or the shape of the atheromatous plaque exceeds the shape threshold.

At 224, the process 200 can include a computing device determining whether or not the oxidative stress value exceeds a threshold. In some cases, this threshold can be a multiple of (or the same as) a previously acquired oxidative stress value from the non-high-risk region of the atheromatous plaque for the same patient (e.g., the multiple being 1.1, 1.2, 1.3, 1.4, 1.5, and the like, times the previously acquired oxidative stress value). Thus, similarly to the size threshold, the oxidative stress threshold can be specifically tailored to the particular patient. In other cases, the oxidative stress value can be a default value that is indicative of a high oxidative state. If at the block 224, the computing device determines that the oxidative stress value exceeds (e.g., is greater than) the oxidative stress threshold, then the process 200 can proceed to the block 226. If, however, at the block 224, the computing device determines that the oxidative stress value does not exceed (e.g., is less than) the oxidative stress threshold, then the process 200 can proceed to the block 232. In some cases, the process 200 can proceed to the block 226, if one or both of the thresholds have been exceeded at the blocks 222, 224. In some cases, for example, the image(s) generated at the block 218 can be subtracted from a baseline image(s) of the remaining region of the atheromatous plaque to generate a subtracted image. In this way, any positive intensity values of the subtracted image(s) indicate an increase in the oxidative stress for that region, any negative intensity values of the subtracted image(s) indicate a decrease in the oxidative stress for that region, and any void regions (e.g., intensities not having changed) can indicate a maintaining of the oxidative stress value for that region Thus, correspondingly, the magnitude of the intensity values of the subtracted image can correspond to the amount of increase (or decrease) in the oxidative stress for the remaining region of the atheromatous plaque. While this has been described with reference to images, in some configurations, this can be implemented using the 3D volumes previously described. For example, the 3D volume of the remaining region of the atheromatous plaque can be subtracted from a baseline 3D volume of the remaining region of the atheromatous plaque to generate a resultant 3D volume.

At 226, the process 200 can include a computing device determining that the patient has a severe case of an atheromatous plaque, based on the exceeding of the one or more thresholds of the blocks 222, 224. For example, this can include a computing device determining that the patient has a severe case of an atheromatous plaque, based on the determined high-risk region of the atheromatous plaque, based on the determined non-high-risk region of the atheromatous plaque, or based on both. As an example, this can include determining that the atheromatous plaque of the patient has sufficient risk (e.g., the risk being over a particular amount), which can include determining that the one or more thresholds of the blocks 222, 224 have been exceeded.

At 232, the process 200 can include a computing device determining that the patient does not have a serve case of an atheromatous plaque, which can include a computing device determining that the one or more thresholds of the blocks 222, 224 have not been exceeded. Correspondingly, this can include determining that the atheromatous plaque of the patient does not have sufficient risk (e.g., the risk being below the particular amount) if, for example, the one or more thresholds of the blocks 222, 224 are not exceeded. In some cases, the block 232 can also include a computing device determining that the atheromatous plaque has stabilized. For example, if multiple iterations of the process 200 (e.g., two, three, and the like), over a period of time (e.g., weeks, months, years), each occurring at a different period of time separated by more than a day, and each resulting in a computing device determining that the patient does not have a severe case of an atheromatous plaque, then the computing device can determine that the atheromatous plaque has stabilized (e.g., and thus does not need a remedial treatment).

At 228, the process 200 can include an in input from the user that a remedial treatment plan is required for the patient, based on a computing device determining that the patient has a severe case of an atheromatous plaque. In some cases, the remedial treatment plan can include a pharmacological intervention, acquiring additional imaging data (e.g., additional autofluorescent imaging, OCT imaging, utilizing a different imaging modality, and the like), surgical intervention (e.g., resecting a portion or all of the atheromatous plaque, deploying a stent at the atheromatous plaque, and the like), and the like. In particular, the remedial treatment plan can include monitoring oxidized lipid-driven oxidative stress such by increasing patient monitoring and/or imaging frequency. Alternatively or additionally, the remedial treatment plan can include treatment of the oxidized lipid-driven oxidative stress such as with pharmacological treatments including, but not limited to hyperlipidemia drugs or anti-inflammatory drugs. In some cases, a pharmaceutical treatment can include a cholesterol reducing pharmaceutical, a beta-blocker pharmaceutical, a blood thinning pharmaceutical (e.g., heparin, warfarin, and the like), an angiotensin-converting enzyme ("ACE") inhibitor, a calcium channel blocker, an anti-platelet pharmaceutical, a diuretic, and the like. With the determination that the patient has a severe case of atheromatous plaque and that this plaque is indicative of oxidized lipid-driven oxidative stress, the treatment plan can be directed particularly to the needs of the patient.

At 230, the process can include implementing the remedial treatment plan for the patient. In some cases, this an include administering a pharmaceutical (e.g., a plaque stabilizing compound) to the patient, and acquiring additional imaging data (e.g., from a different imaging modality than the imaging system used at the block 204). In addition, this can include surgically removing a portion (or all) of the atheromatous plaque, or deploying a stent at the atheromatous plaque (e.g., prophylactically), and the like.

In some non-limiting examples, the process 200 can include a computing device generating a report that includes information regarding the atheromatous plaque, which can include the size of the high-risk region of the atheromatous plaque, shape of the high-risk region of the atheromatous plaque, the oxidation stress level of the atheromatous plaque (e.g., that does not include the high-risk region), whether or not each of the shape, size, or oxidation stress level exceeded a corresponding threshold, and if so, the amount of exceeding of the corresponding threshold. In addition, the report can include an image(s) (3D volume(s)) of the atheromatous plaque, the determination of whether or not the atheromatous plaque is severe, or not severe, and the like. In some cases, in addition or alternatively to generating a report, a computing device can also activate an alarm, present an alert on a display, or otherwise notifying a practitioner based on the computing device determining that one or more of the thresholds have been exceeded.

Figure 8:
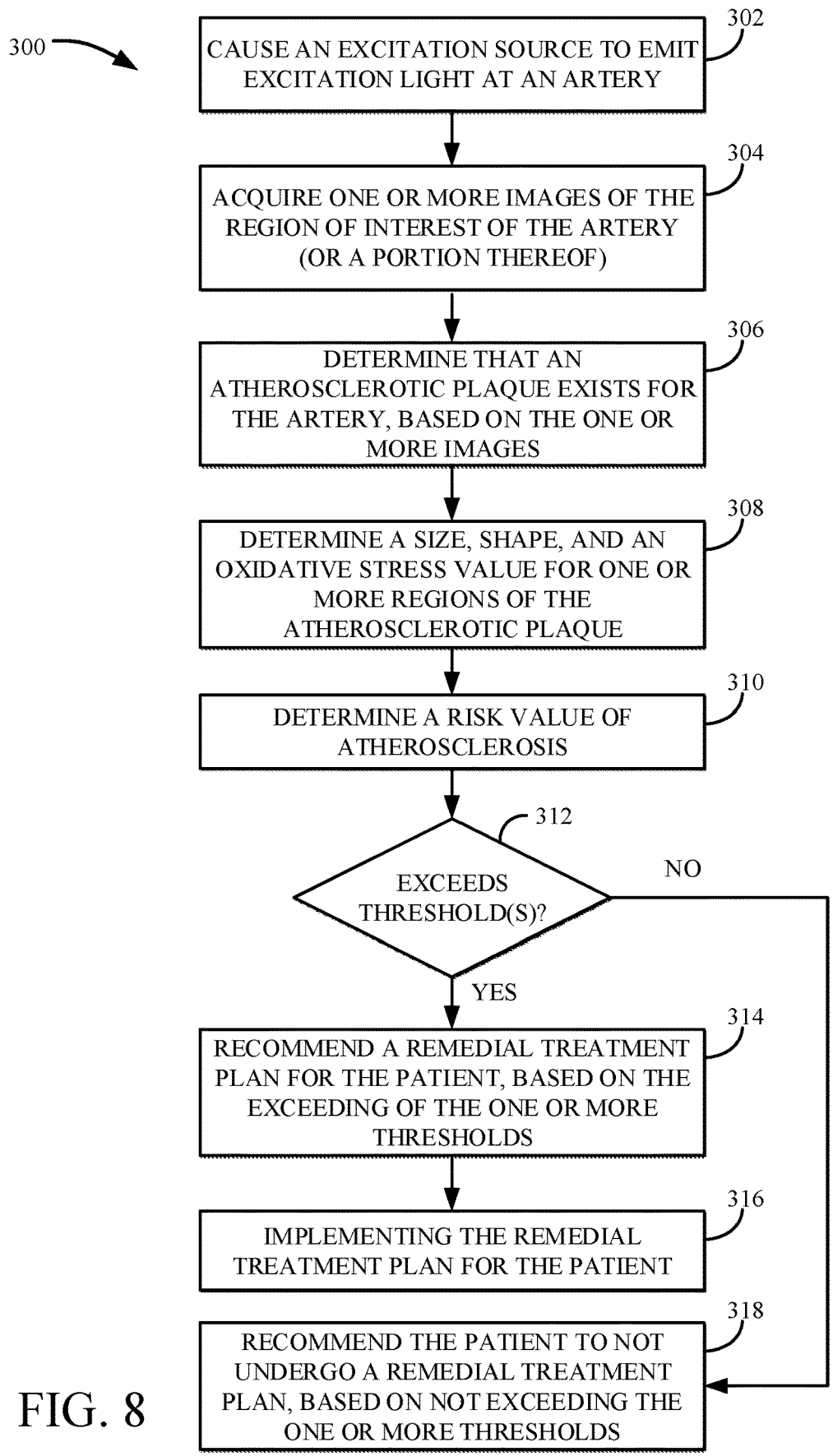
FIG. 8 shows a flowchart of a process for diagnosing atherosclerosis for a patient.

FIG. 8 shows a flowchart of a process 300 for diagnosing atherosclerosis for a patient (e.g., atherosclerosis indicative of a presence of ceroid in one or more arteries of a patient). All or parts of the portions of the process 300 can be implemented using one or more computing devices (e.g., one or more processor devices, including the processor device of the computing device 102), as appropriate. In addition, the process 300 is related to the process 200 described previously, and thus the content of the process 200 pertains (and is applicable to) the process 300 (and vice versa). Similarly to the process 200, the process 300 can be completed without the use of an imaging agent.

At 302, the process 300 can include a computing device causing an excitation source to emit excitation light at, at least a portion of a region of interest of an artery (e.g., the internal wall of the artery), which can be similar to the block 202 of the process 200.

At 304, the process 300 can include a computing device acquiring, using a detector, one or more images of the region of interest of the artery, which can similar to the blocks 204, 206 of the process 200. For example, this can include a computing device acquiring multiple images of different FOVs of different portions of the region of interest of the artery. As another example, this can include acquiring a single image of a single FOV of the region of interest of the artery. In some cases, acquiring the one or more images can include a computing device receiving the imaging data, and generating the one or more images from the imaging data. Alternatively, acquiring the one or more images can include a computing device receiving the one or more images. In some cases, the block 304 of the process 300 can include a computing device acquiring (or receiving) 3D imaging data.

At 306, the process 300 can include a computing device determining that an atherosclerotic plaque exists for the region of interest of the artery, based on the one or more images (or 3D imaging data) of the artery (or the imaging data that defines the one or more images). For example, this can include a computing device summing all the intensity values of the one or more images, averaging all the intensity values of the one or more images, and the like, to determine an intensity value. Then, a computing device can compare the intensity value to a threshold intensity value, and if the computing device determines that the intensity value exceeds (e.g., is greater than) an intensity value threshold that is indicative of a presence of atherosclerotic plaque, then the computing device determines a presence of atherosclerotic plaque for the artery of the patient and the process 300 can proceed to the block 308. Alternatively, if a computing device determines that the intensity value does not exceed an intensity value threshold, the computing device can determine that the artery of the patient does not have atherosclerotic plaque, and in some cases, the process 300 can proceed to the block 318. Correspondingly, if a computing device determines that the artery of the patient does not have atherosclerotic plaque, a computing device can present on a display (or other notification to a practitioner) an indication that the artery of the patient does not have atherosclerotic plaque.

At 308, the process 300 can include a computing device determining a size, shape, an oxidative stress, and the like, for one or more regions of the atherosclerotic plaque, which can be similar to the blocks 214, 216, 218, 220 of the process 200. For example, this can include determining a size of a high-risk region of the atherosclerotic plaque, determining a shape of the high-risk region of the atherosclerotic plaque, determining an oxidative stress value for the high-risk region of the atherosclerotic plaque (e.g., which can similar to the processes used to determine the oxidative stress value for the remaining portion of the atherosclerotic plaque). As another example, this can include determining a size of a remaining portion of the atherosclerotic plaque (e.g., that does not include the high-risk region), determining a shape of the remaining portion of the atherosclerotic plaque, determining an oxidative stress value for the remaining portion of the atherosclerotic plaque. As yet another example, this can include determining a size of the entire atherosclerotic plaque, determining a shape of the entire atherosclerotic plaque, and determining an oxidative stress value for the entire atherosclerotic plaque.

In some non-limiting examples, the block 308 of the process 300 can include a computing device determining one or more dimensions of the atherosclerotic plaque. As an example, determining one or more dimensions can include a computing device determining a length of the atherosclerotic plaque, based on imaging data (e.g., not the imaging data of the one or more images of the block 304). For example, a computing device can receive imaging data of the atherosclerotic plaque from an optical coherence tomography ("OCT") imaging system (e.g., which can be deployed in a similar manner as the imaging systems described herein). Then, a computing device can determine a length of the atherosclerotic plaque (e.g., the length being defined along a flow path of the artery), for example, by a computing device reconstructing the imaging data. As another example, determining one or more dimensions can include a computing determining a volume of the atherosclerotic plaque, based on imaging data (e.g., not the imaging data of the one or more images of the block 304). For example, a computing device can receive intravascular ultrasound ("IVUS") imaging data for the atherosclerotic plaque, and can generate a 3D volume of the atherosclerotic plaque. In some cases, a computing device can determine a ratio between the intensity value(s) from the one or more images and one or more dimensions of the atherosclerotic plaque (e.g., the determined length, determined volume, and the like). For example, a sum of all the intensity values of the one or more images for the atherosclerotic plaque can be the intensity value, which can then be divided by the length of the atherosclerotic plaque, or the volume of the atherosclerotic plaque. In this way, the ratio can provide for normalization of the intensity value to a reference dimension(s) for the atherosclerotic plaque. In some cases, this can include a computing device generating one or more 3D volumes of one or more portions of the region of interest of the artery, using the 3D imaging data, or the one or more images.

At 310, the process 300 can include a computing device determining a risk value of atherosclerosis, based on one or more of the size, shape, or oxidative stress for one or more regions of the atherosclerotic plaque. For example, a computing device can determine the risk value of atherosclerosis based on the size, shape, oxidative stress, or combinations thereof, for one or more regions of the atherosclerotic plaque to determine a risk. For example, the exceeding of and amount of a corresponding threshold can increase the risk value, while not exceeding of a corresponding threshold can decrease the risk value. As a more specific example, a computing device can compare each determined size of a region of the atherosclerotic plaque to a corresponding size threshold, to determine, if the size exceeds the threshold, and if so, to what extent (e.g., to be used to increase the risk value). This can also be completed for the shape and oxidative stress value. For example, a computing device can compare each determined shape of a region of the atherosclerotic plaque to a corresponding shape threshold, to determine, if the size exceeds the threshold, and if so, to what extent (e.g., to increase the risk value). As another example, a computing device can compare each determined oxidative stress value of a region of the atherosclerotic plaque to a corresponding oxidative stress threshold, to determine, if the oxidative stress value exceeds the oxidative stress threshold, and if so, to what extent (e.g., to increase the risk value).

In some non-limiting examples, including when a ratio is determined between an intensity value(s) and one or more dimensions of the atherosclerotic plaque, a computing device can determine a risk value for atherosclerosis, based on the ratio. In some non-limiting examples, the blocks 302-310 can be implemented for multiple atherosclerotic plaques that are located in the same artery or different arteries. In this case, for example, a computing device can combine each risk value for each atherosclerotic plaque (e.g., by summing the risk values together). Thus, a determined risk value can include a combination of risk values, with each risk value of the combination of risk value being from a different atherosclerotic plaque (e.g., within the same artery or a different artery).

At 312, the process 300 can include a computing device determining whether or not one or more of the size, shape, and oxidative stress for one or more regions exceeds (e.g., is greater than) a corresponding threshold. For example, a computing device can determine whether or not each determined size of a region of the atherosclerotic plaque, each determined shape of a region of the atherosclerotic plaque, and each determined oxidative stress value of a region of the atherosclerotic plaque exceeds (e.g., is greater than) a corresponding threshold. As another example, the determined risk value of atherosclerosis can be compared to a threshold risk value to determine whether or not the determined risk value exceeds (e.g., is greater than) the threshold risk value. Then, if a computing device determines that the one or more thresholds have been exceeded, then the process 300 can proceed to the block 314. However, if a computing device determines that the one or more thresholds have not been exceeded, then the process 300 can proceed to the block 318.

At 314, the process 300 can include a computing device recommending a remedial treatment plan for the patient, based on the exceeding of the one or more thresholds. This block 314 can be similar to the block 228 of the process 200. For example, this can include recommending a pharmaceutical intervention, a surgical intervention, a medical device intervention, an imaging intervention, and the like. In some cases, the pharmaceutical intervention can include prescribing (or indicating a prescribing of) a heart-attack mitigating pharmaceutical (e.g., a beta blocker), an oxidizing-reducing compound (e.g., an inflammation reducing compound, a plaque stabilizing compound), and the like. In some non-limiting examples, this can include a computing device presenting the remedial treatment plan on a display, notifying the remedial treatment plan to a practitioner, and the like.

At 316, the process 300 can include implementing the remedial treatment plan for the patient, which can be similar to the block 230 of the process 300.

At 318, the process 300 can include a computing device recommending the patient to not undergo a remedial treatment plan, based on not exceeding the one or more thresholds. For example, this can also include a computing device presenting the recommendation on a display, notifying the recommendation to a practitioner, and the like.

Figure 9:
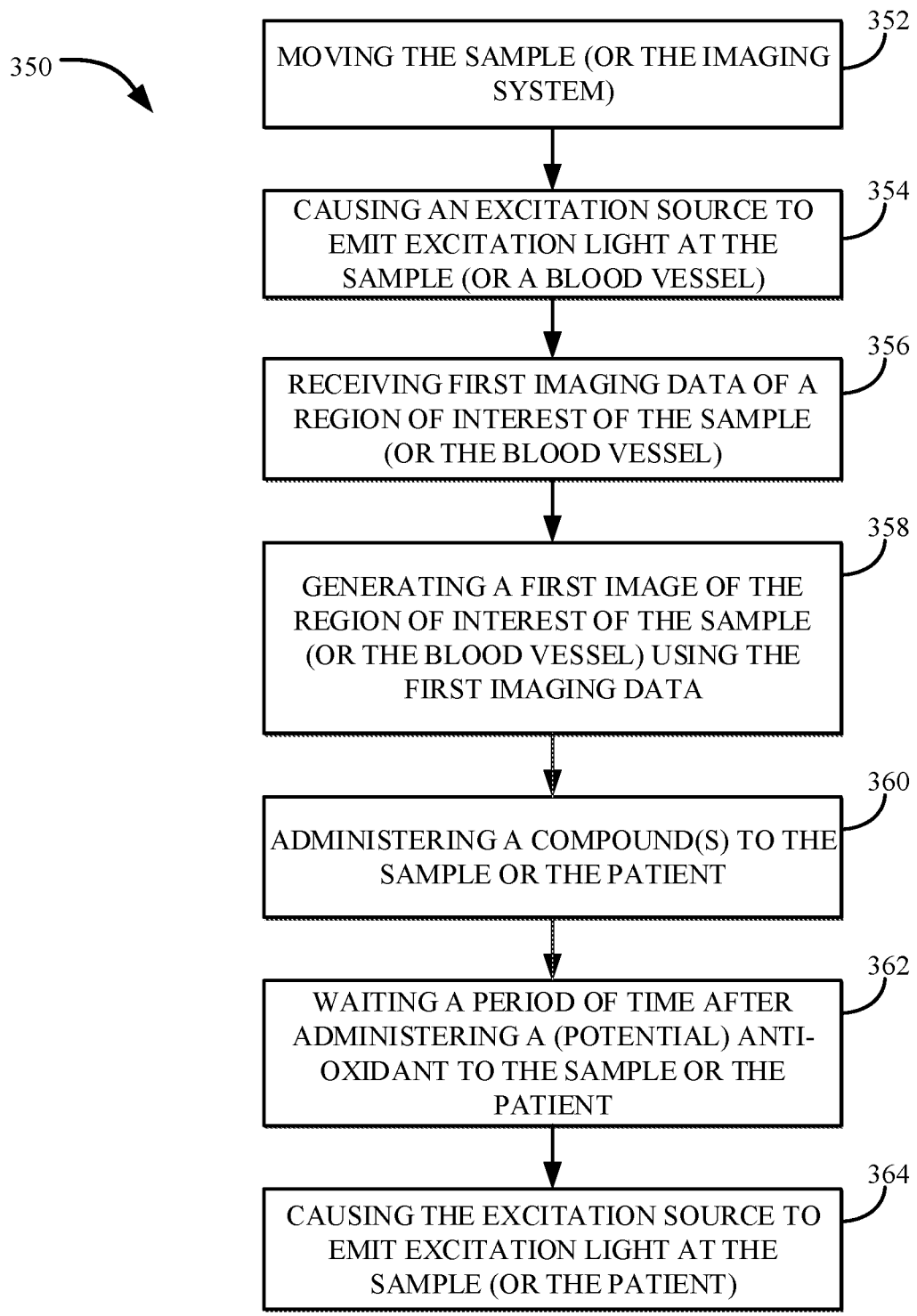
FIG. 9 shows a portion of a flowchart of a process for diagnosing (or treating) a medical condition of a patient (e.g., an atherosclerotic disease), or for screening atheromatous plaque stabilizing or anti-inflammatory compounds.
Figure 10:
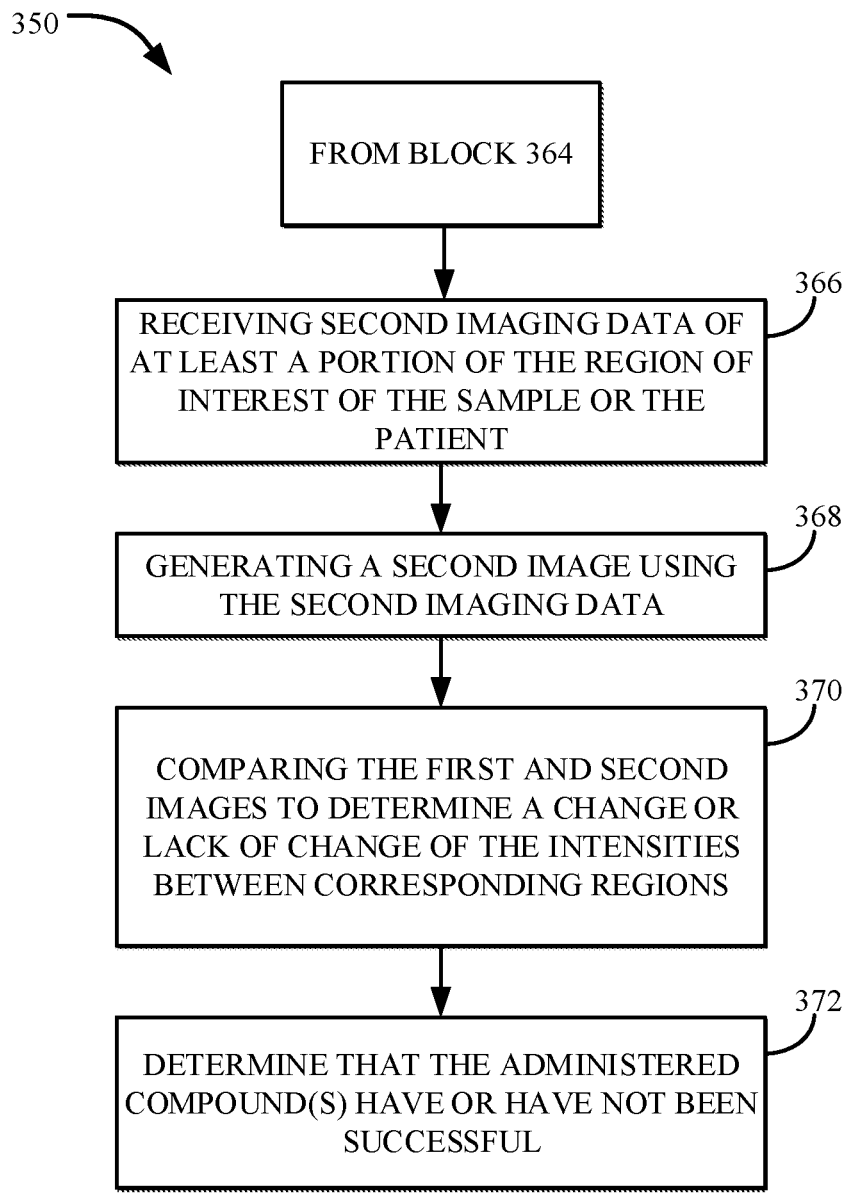
FIG. 10 shows another portion of the flowchart of the process of FIG. 9.

FIG. 9 shows a flowchart of a process 350 for diagnosing (or treating) a medical condition of a patient (e.g., an atherosclerotic disease), or for screening atheromatous plaque stabilizing or anti-inflammatory compounds. All or parts of the process 350 can be implemented using one or more computing devices (e.g., one or more processor devices including the processor device of the computing device 102), as appropriate.

At 352, the process 350 can include a computing device moving a sample (e.g., a biological sample) into alignment with an imaging system (e.g., the imaging system 122). For example, this can include a computing device causing a sample handling device of a compound screening system to move the sample (e.g., via extending an actuator) into alignment with the imaging system (e.g., of the compound screening system). In other cases, the block 352 of the process 350 can include moving an imaging system (e.g., the imaging system 150) into a blood vessel of the patient (e.g., an artery), which can be suspected (or previously identified) as having an atheromatous plaque.

At 354, the process 350 can include a computing device causing an excitation source to emit excitation light at the sample, or the blood vessel, which can be the same as the block 202 of the process 200. For example, including once the sample is aligned with the imaging system, the computing device can cause the excitation source to emit light at the sample. As another example, the imaging system can be advanced along the blood vessel to a desired location, and a computing device can cause the excitation source to emit light at the blood vessel.

At 356, the process 350 can include a computing device receiving first imaging data of a region of interest of the sample, or the blood vessel, which can be similar to the block 204 of the process 300. In some cases, the first imaging data can be 3D imaging data.

At 358, the process 350 can include a computing device generating a first image of the region of interest of the sample, or the blood vessel, using the first imaging data. This can be similar to the block 206 of the process 200. In some cases, the blocks 352-358 can function as a process to generate a baseline image prior to treatment (or testing of a compound). In some cases, this can include generating a first 3D volume of the region of interest using the first imaging data that is 3D imaging data.

At 360, the process 350 can include a computing device administering a compound (or multiple compounds, including a cocktail of compounds) to the sample. In some cases, this can include a computing device causing a dispensing system of the compound screening system to dispense an amount of the compound(s) into contact with the sample. In other cases, the block 360 can include administering a compound(s) to the patient. In some cases, this can include administering the compound(s) at the location of the atherosclerotic plaque (e.g., by using a catheter). The compound (or multiple compounds) can be compound(s) that are suspected of (or that have been previously determined) to have an anti-inflammatory property, an oxidative reducing property, an atherosclerotic plaque stabilizing property, and the like. In some cases, the can include administering an anti-inflammatory compound(s) (e.g., canakinumab, colchicine, and the like), administering an antioxidant (e.g., icosapent ethyl), and the like, to the patient or the sample.

At 362, the process 350 can include a computing device waiting a period of time after the compound(s) has been administered to the sample (or the patient). In some cases, the period of time can be minutes, hours, days, weeks, and the like.

At 364, the process 350 can include a computing device causing the excitation source (e.g., the excitation source 104) to emit excitation light at the same (or substantially the same) location of the sample (or blood vessel), as the location the block 354 of the process 300 occurred. Thus, the block 366 can be the same as the block 354, but can occur at a different point of time. For example, the excitation light at blocks 354, 364 can occur at the same location (or substantially the same location).

At 366, the process 350 can include a computing device receiving second imaging data of a least a portion of the region of interest of sample (or the blood vessel). Similarly to the block 354, the block 366 can be the same as the block 356, but can occur at a different point in time. In some cases, the second imaging data can be second 3D imaging data.

At 368, the process 350 can include a computing device generating a second using the second imaging data. This can be the same process used to generate the first image at the block 358. In some cases, this can include generating a second 3D volume using the first imaging data that is 3D imaging data.

At 370, the process 350 can include a computing device comparing the first and second images (or 3D volumes) to determine a change (e.g., a decrease, or an increase), or a maintaining in intensities between corresponding regions. For example, a computing device can subtract the second image (or second volume) from the first image (or first volume), or vice versa, to determine whether or not changes exist and if they are increases or decreases. For example, some non-limiting examples of the disclosure show that higher intensity values are indicative of higher levels of oxidative stress (and vice versa). Thus, when the second image (or second volume) is subtracted from the first image (or first volume) to generate a subtracted image (or subtracted 3D volume) then positive value regions of the subtracted image (or volume) imply increases in oxidative stress, negative value regions of the subtracted image (or volume) imply decreases in oxidative stress, and zero value regions imply no changes in oxidative stress.

Figure 11:
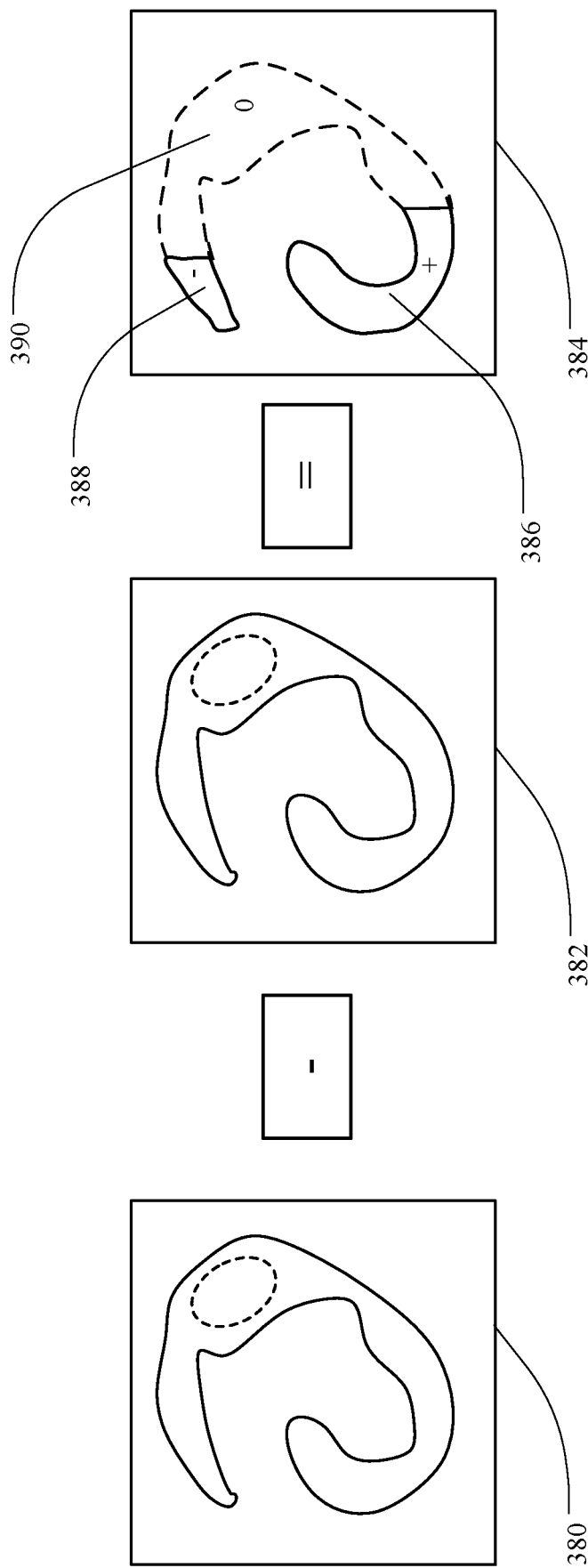
FIG. 11 shows schematic illustrations of two images and a resulting subtracted image.

FIG. 11 shows schematic illustrations of two images 380, 382 acquired at different times of an atherosclerotic plaque of a patient. In particular, the image 380 corresponds to the first image (e.g., prior to administration of a compound(s)), while the image 382 corresponds to the second image (e.g., after to administration of the compound(s), and after waiting the period of time). As shown in FIG. 11, the image 382 is subtracted from the image 380 to generate a subtracted image 384. The subtracted image includes a region 386 having positive intensity values indicative of an increase in intensity (and thus an increase in oxidative stress), a region 388 having negative intensity values indicative of a decrease in intensity (and thus a decrease increase in oxidative stress), and a region 390 having no intensity values indicative of no change in intensity (and thus no change in oxidative stress).

Referring back to FIG. 9, in some cases, rather than comparing the images, a computing device can determine a first oxidative stress value from the first image (or first 3D volume), and a second oxidative stress value from the second image (or second 3D volume). This can be similar to determining an oxidative stress value in the block 220 of the process 200. For example, a sum of all the pixel intensity values, or an average of all the pixel intensity values, can be an oxidative stress value. Then, a computing device can compare the first oxidative stress value to the second oxidative stress value to determine a change in the oxidative stress value.

At 372, the process 300 can include a computing device determining that the administered compound(s) have (or have not been) successful at decreasing the oxidative stress, decreasing the inflammation, or increasing the atheromatous plaque stability (e.g., based on the comparison at the block 370). If a computing device determines an increase in the oxidative stress value, then a computing device can determine that the administered compound(s) have not decreased the oxidative level (and thus do not have an anti-inflammatory property, an oxidative reducing property, or an atheromatous plaque stabilizing property). If the computing device determines no change in the oxidative stress value, then a computing device can determine that the administered compound(s) have not decreased the oxidative level (and thus do not have an anti-inflammatory property, an oxidative reducing property, or an atheromatous plaque stabilizing property). In some cases, if the computing device determines no change in the oxidative stress value, then the computing device can determine that the atheromatous plaque has stabilized, if, for example, the first image and second image (or volumes) have been separated by a sufficient time. If the computing device determines that the oxidative stress value has decreased, then the computing device can determine that the compound is successful at decreasing the oxidative stress, decreasing the inflammation, or increasing the atheromatous plaque stability.

In some non-limiting examples, the first image and the second image (or first and second 3D volumes) can be filtered to identify a high-risk region of the atheromatous plaque, and remove the high-risk region of the atheromatous plaque from the first and second images. In this way, the high-risk region can be removed from the oxidative stress analysis. In addition, including when the images are subtracted, increases in oxidative stress (e.g., by positive intensity values) surrounding the high-risk region can imply that the high-risk region is in risk of expanding. Thus, in some cases, a computing device can determine whether or not increases in oxidative stress surround a high-risk region of the atheromatous plaque, and if so, the extent of the increase (e.g., the total area of the positive values that surround the high-risk region, the arc length of a continuous region that has positive values that surround the high-risk region, and the like).

In some non-limiting examples, the process 350 can be completed for multiple samples, each having different compound(s), concentrations of the same compound (e.g., each sample having a different amount of the same compound), and different combinations of multiple compounds. Thus, the process 350 can be used to screen compounds to not only determine if the compound has a property (e.g., a property that stabilizes atheromatous plaques, decreases inflammation, or decreases oxidation levels), but also the extent of property in relation to the amount. Thus, in some cases, a computing device can determine an optimum amount of a compound(s), based on the amount of the compound(s) administered to each sample, and the corresponding resulting decrease in the oxidative stress level.

In some cases, such as when the process 350 uses a blood vessel, if a computing device determines that the administered compound(s) have not been successful, then the process 300 can proceed to administering a different compound (e.g., the process proceeding back to the block 360). Alternatively, the process 350 can proceed to implementing a remedial treatment plan for the patient, which can be similar to the block 230 of the process 200.

Examples

The following examples have been presented in order to further illustrate aspects of the disclosure, and are not meant to limit the scope of the disclosure in any way. The examples below are intended to be examples of the present disclosure and these (and other aspects of the disclosure) are not to be bounded by theory.

The relationship between plaque lipid, ceroid, and NIRAF signals in human carotid atherosclerosis specimens was examined. Additionally, whether or not oxidized low density lipoprotein ("oxLDL") could induce oxidative stress and whether this was related to NIRAF signals for cultured human monocyte-derived macrophages ("MDMs") was also investigated.

Resected carotid atherosclerosis specimens were obtained from 15 patients undergoing carotid endarterectomy for a severe carotid stenosis diagnosed by duplex ultrasound or computed tomography angiography (>70% stenosis). Patients were excluded if they were undergoing carotid endarterectomy for in-stent restenosis. After surgical resection, the carotid specimens were placed on ice prior to fluorescence reflectance imaging and histopathological assessment.

Prior to histopathologic processing, fresh carotid specimens underwent fluorescence reflectance imaging ("FRI", Kodak Image-Station 4000, Carestream Health, Rochester, New York) using exposure times of 4 to 64 seconds in the fluorescein isothiocyanate-channel autofluorescence (excitation/emission 470/535 nm) channel and two NIRAF channels (excitation/emission 630/700 nm and excitation/emission 740/790 nm). Mean fluorescence intensity of FRI-detected epifluorescence was measured using Fiji/Image J at the carotid bifurcation then at 1 and 2 mm distances proximal and distal to the carotid bifurcation (see, e.g., FIG. 12).

Figure 12:
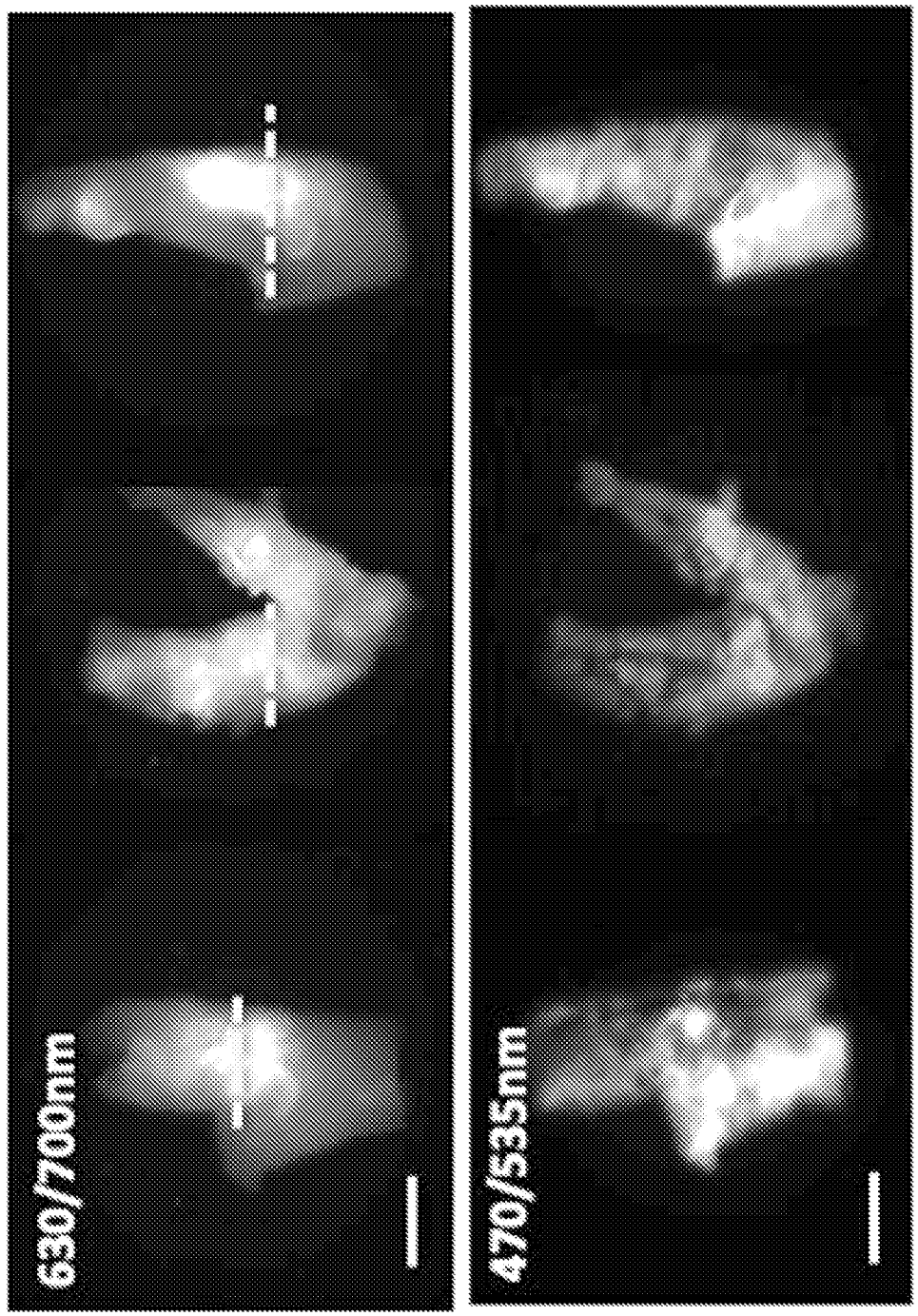
FIG. 12 shows NIRAF images on the first row, and fluorescein isothiocyanate-channel autofluorescence images on the second row.

FIG. 12 shows NIRAF images of three representative freshly resected human carotid endarterectomy specimens (total n=7) detected by epifluorescence imaging, demonstrating increased signal NIRAF (630 nm) intensity at the origin of the internal carotid artery (dashed yellow line) at the common carotid artery bifurcation. Scale bar=1 mm.

After ex vivo imaging, carotid specimens were cut into 5 mm rings (~4-5 per specimen) from the most proximal to distal aspect of specimen. Carotid specimens were either placed directly into an optical cutting temperature compound (n=7 carotid specimens) or placed in decalcifying solution (Cal-Ex™ Decalcifier, Fisher Chemical, CS510-1D) for 2 hours then 4% PFA for 18 hours (n=8 carotid specimens) followed by paraffin embedding. Optical cutting temperature compound and paraffin-embedded tissues were then cut at 10-μm thickness, 6 to 8 serial sections for staining were collected on glass slides.

Fluorescence and bright field microscopy were performed with an epifluorescence microscope (Nikon Eclipse 90i, Tokyo, Japan) on unstained carotid plaque sections. Three-channel auto fluorescence was detected with the following excitation/emission filters (exposure times): 480/535 nm (50 msec), 650/710 nm (1 sec), and 775/810 nm (3 sec), with the latter two auto fluorescence channels depicting NIRAF. Stitched images at 10× magnification were obtained for all culprit and flanking plaques, and selected high-power fields (20× and 40×) were obtained for each plaque.

Using available imaging processing software (Fiji/Image J, NIH), 10× stitched images of fresh frozen carotid plaque sections obtained using epifluorescence microscopy (ex/em 650/710 nm) were outlined to define the entire plaque region-of-interest ("ROI"). Using the entire plaque ROI, the mean fluorescence intensity ("MFI") of NIRAF signal was measured. Next, a histogram of the average MFI was plotted for the 23 sections. NIRAF-positive pixels were defined as pixels with a NIRAF signal intensity above the $90^{th}$ percentile (≥235 arbitrary fluorescence units, denoted as $NIRAF^{90\%}$ see FIG. 13).

Figure 13:
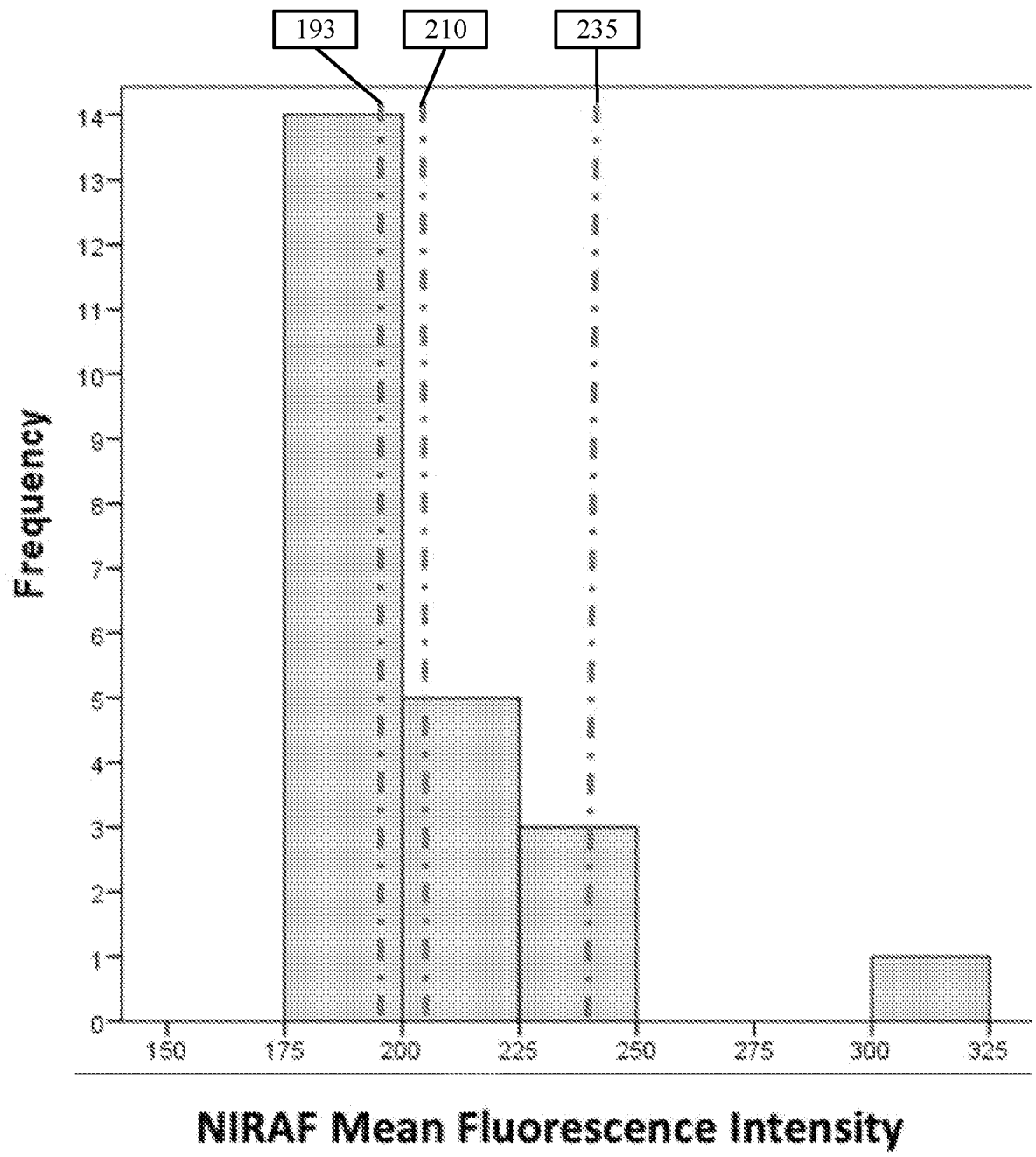
FIG. 13 shows a histogram that shows the frequency of the NIRAF mean fluorescence intensity values for the acquired NIRAF images.

FIG. 13 shows the cut-off point for defining NIRAF-positive pixels. In particular, FIG. 13 shows a histogram of NIRAF mean fluorescence intensity ("MFI") from 23 fresh-frozen plaque sections obtained from 7 carotid endarterectomy specimens. NIRAF-positive pixels were defined as those having a fluorescence intensity above the 90th percentile on the histogram ($NIRAF^{90\%}$, in the case >=235 arbitrary fluorescence units). The NIRAF-positive pixel area was then compared with the Sudan Black-positive pixel area or Glycophorin A-positive pixel area on adjacent sections. The mean was 201.9439, the standard deviation was 29.17563, and the N (samples) were 23.

Matched histological sections for hematoxylin and eosin ("H&E"), Masson's trichrome, Sudan Black B ("SB"), and glycophorin A ("GPA") corresponding to the NIRAF sections were analyzed. Fresh frozen (n=23 sections from n=7 plaques) and 4% PFA and paraffin-embedded plaques (n=65 sections from n=8 plaques) were analyzed using FM and light microscopy for evaluation of NIRAF and plaque composition. Slides stained with Sudan black B were imaged immediately after drying to avoid bleaching. Glycophorin A (GPA) immunohistochemical staining was performed (primary antibody: Abcam, ab129024, 1:200 concentration for 4 minutes; secondary antibody: Biocare, MACH2™ Rabbit AP-Polymer, RALPH525; chromogen: Biocare, Warp Red Chromogen, WR806). SB stained aggregates of triglycerides and complex lipids, and the antibody to GPA demarcated intraplaque hemorrhage (IPH). To specifically assess the relationship of insoluble lipid to NIRAF in human atheroma, a group of adjacent sections underwent ethanol fixation (100% for 1 hour) prior to SB staining. A subset of carotid plaques (n=5) underwent immunohistochemical staining for macrophages (CD68; Abcam, ab955), bilirubin (LSBio, LS-C664051), and for the presence of iron using Perl's Prussian blue stain (potassium hexacyanoferrate(II), Sigma, P3289) with 3,3'-diaminobenzidine tetrahydrochloride (DAB; Vector Laboratories, SK-4105).

THP-1 human monocytes ("ATCC") were seeded at a density of $5 \times 10^5$ cells on 35 mm glass bottom dishes (MatTek) and cultured in Gibco RPMI1640 medium including glutamine with 10% fetal bovine serum and 100 U/ml penicillin/streptomycin. Cells were next differentiated to macrophage-like cells ("MDMs") by treatment with phorbol-12-myristate 13-acetate ("PMA", Sigma Aldrich, P1585) 100 nM for 72 hours. After differentiation, MDMs were incubated with medium alone, human hemoglobin (0.5 mg/mL, Sigma Aldrich, H7379), native low-density lipoproteins ("LDL") (50 ug/ml, KalenBiomedical, 770200) or oxidized LDL ("oxLDL") (50 ug/ml, KalenBiomedical 770202). For each condition, the medium was changed every 2 days. For NIRAF observation, unstained cells or nucleus-stained cells via Hoechst (Life Technologies, 62249) were observed on a Leica SP8 confocal microscopy with excitation 638 nm and emission range in 643-713 nm. The cells were stained with BODIPY493/503 (2 uM for 30 minutes, Life Technologies, D3922) to visualize intracellular lipids. To assess insoluble lipid specifically, a subset of MDMs were treated with 100% ethanol for 15 minutes to remove soluble lipid, fixed with 4% PFA, and then stained with the fluorescent lipid marker BODIPY493/503. Cytosolic reactive oxygen species ("ROS") production was assessed by CellROX-Green staining (2 uM for 30 minutes, Life Technologies, C10444). Lipid peroxidation within MDM cells was imaged with confocal microscopy following incubation with BODIPY581/591 (2 uM for 60 minutes, Life Technologies, D3861) and excitation with a 488 nm excitation laser. In an antioxidant treatment study, treatment with N-Acetyl-L-Cysteine (5 mM, NAC, Sigma Aldrich, A7250) or α-Tocopherol (1 mM, Sigma Aldrich, 258024) was started at the same time as oxLDL incubation.

After incubation of MDMs with medium alone, native LDL or oxLDL for 5 days, or hemoglobin for 24 hours, MDMs were washed with cold PBS and harvested by gentle scraping. The cells were re-suspended in cold PBS and subjected to flow cytometry. For CellROX-based ROS detection, cells were incubated with CellROX-Green (Life Technologies, C10444, 2 uM, 30 min), washed with cold PBS 2 times, then harvested. The samples were analyzed with BD SORP8 laser LSRII (BD Biosciences) and software (Flowjo). The 640 nm wavelength laser and 690/40 bandpass filter were used for NIRAF detection and the 488 nm wavelength laser and 515/20 bandpass filter were used for CellROX detection.

The unpaired Student's t-test or Mann-Whitney U test was used to compare parameters between two groups for parametric and non-parametric data, respectively. The normality of data was assessed using the Shapiro-Wilk test. For carotid specimens, the fluorescence intensity measured by FRI was compared across bifurcation location using the Kruskal-Wallis one-way analysis of variance test followed by Dunn's multiple comparisons test (SPSS, v26; IBM®). Data are presented as mean±standard error of the mean ("SEM") or median and interquartile range ("IQR"). For cell culture studies, quantitative data analyzed by Fiji/image J software are shown as the mean±SEM of at least 3 independent experiments. Differences between groups were examined by a one-way ANOVA followed by the post-hoc Tukey-Kramer test or Games-Howell test. For all analyses, $p<0.5$ was considered statistically significant.

The culprit lesion necessitating carotid endarterectomy is bulky, lipid-rich, and typically located at the origin of the internal carotid artery, but the relationship between NIRAF signal intensity and carotid plaque topography is unknown. FRI was performed on N=7 freshly resected carotid plaques (4 asymptomatic patients; 3 patients had a transient ischemic attack or stroke, see FIG. 12). Analysis of the normalized mean FRI signal intensity across the carotid specimen demonstrated that the highest NIRAF signal occurred at the common carotid artery bifurcation, as compared to the flanking regions proximally and distally (p=0.16, see FIG. 14). These results demonstrate that the relative NIRAF signal peaks at the origin of the internal carotid artery, the most common culprit site for patients requiring carotid revascularization.

Figure 14:
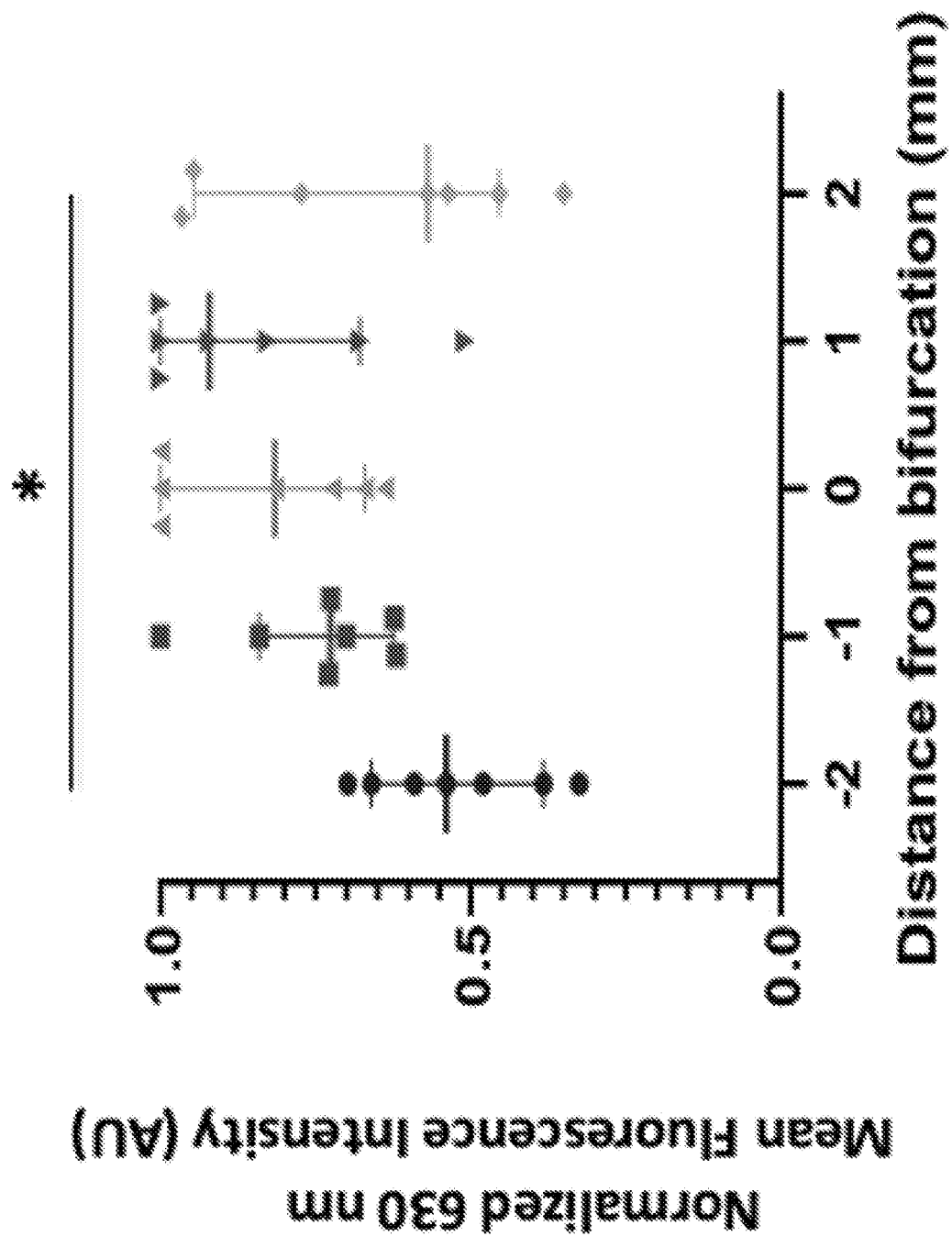
FIG. 14 shows a graph of the normalized NIRAF mean fluorescence intensity ("AU") signal verses the distance from the bifurcation of the carotid arteries.

FIG. 14 shows a graph of the normalized NIRAF mean fluorescence intensity ("AU") signal verses the distance from the bifurcation of the carotid arteries. In particular, FIG. 14 shows that the human plaque NIRAF signal is elevated at the carotid artery bifurcation. Quantification of normalized NIRAF epifluorescence demonstrates a significant increase in NIRAF signal intensity within 1 mm of the bifurcation. Data shown are median and interquartile range. *P=0.16 by Kruskal-Wallis. NIRAF images processed and windowed identically.

Previously the comparative relationship between plaque NIRAF, lipid content, and IPH had not been determined. Examination of the NIR mean fluorescence intensity ("MFI") was used to define $90^{th}$ percentile as the cutpoint for NIRAF-positive pixels, or the NIRAF$^{90\%}$ (see FIG. 13). The cut point was determined to be ≥235 arbitrary fluorescence units to define NIRAF-positive pixels. Carotid plaque sections exhibited NIRAF-positive areas ranging from 1.3% to 20.0% of the total area (N=23 sections from 7 patients, see FIG. 15). On a per section basis, the NIRAF-positive area significantly corresponded with both the SB-positive lipid area (r=0.53, P=0.43) and the GPA-demarcated IPH area (r=0.57, P=0.23; see FIGS. 12 and 13, N=15 sections) to a similar extent.

Figure 15:
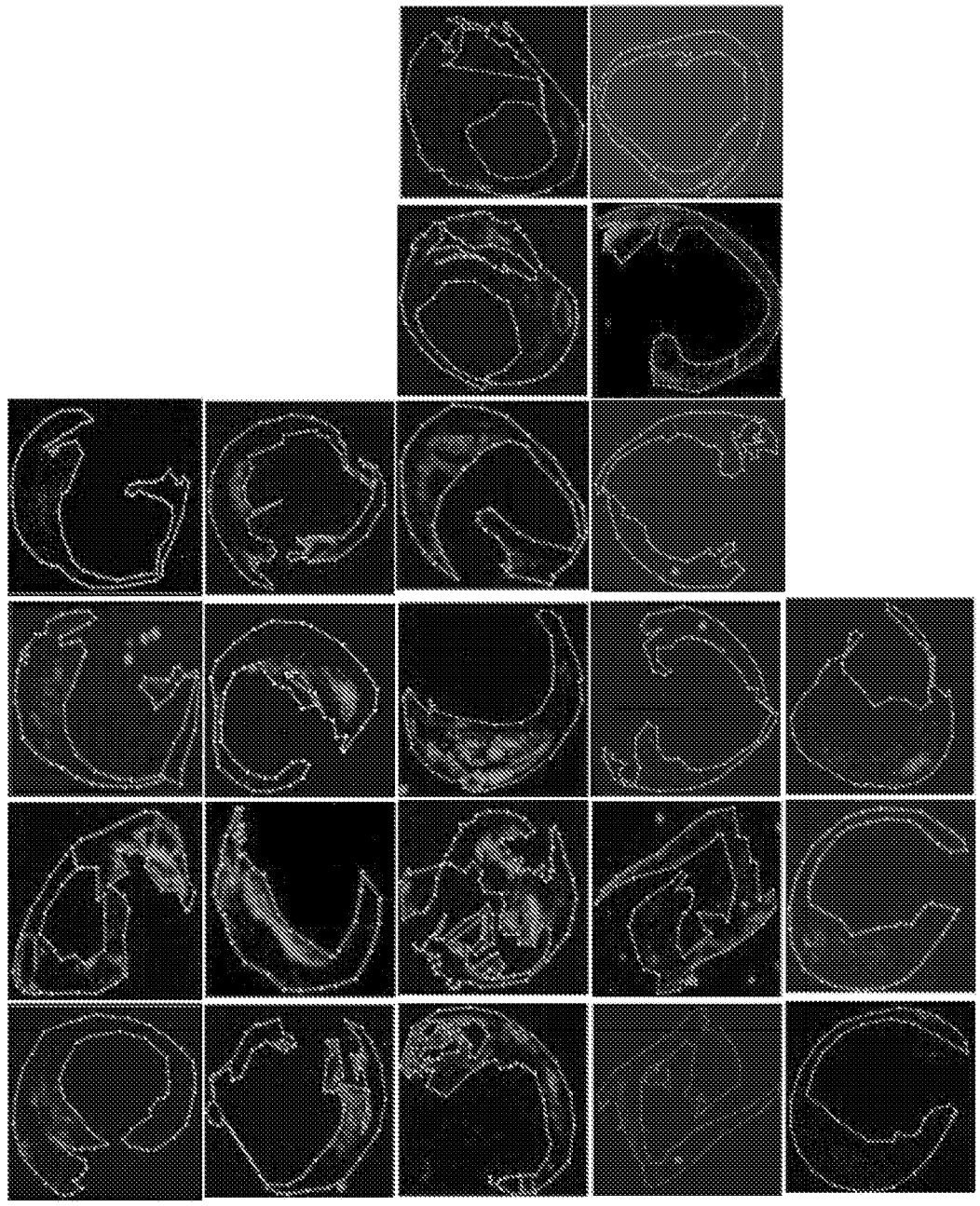
FIG. 15 shows various images of the carotid plaque $NIRAF^{90\%}$ area.

FIG. 15 shows various images of the carotid plaque NIRAF$^{90\%}$ area. In particular, FIG. 15 shows carotid sections (n=23 sections from 7 plaques) that were used to derive the NIRAF$^{90\%}$ cut-off value (>=235 arbitrary fluorescence units) to define NIRAF-positive pixels. Grouped sections from each plaque are identified by a colored rectangular outline.

Figure 16:
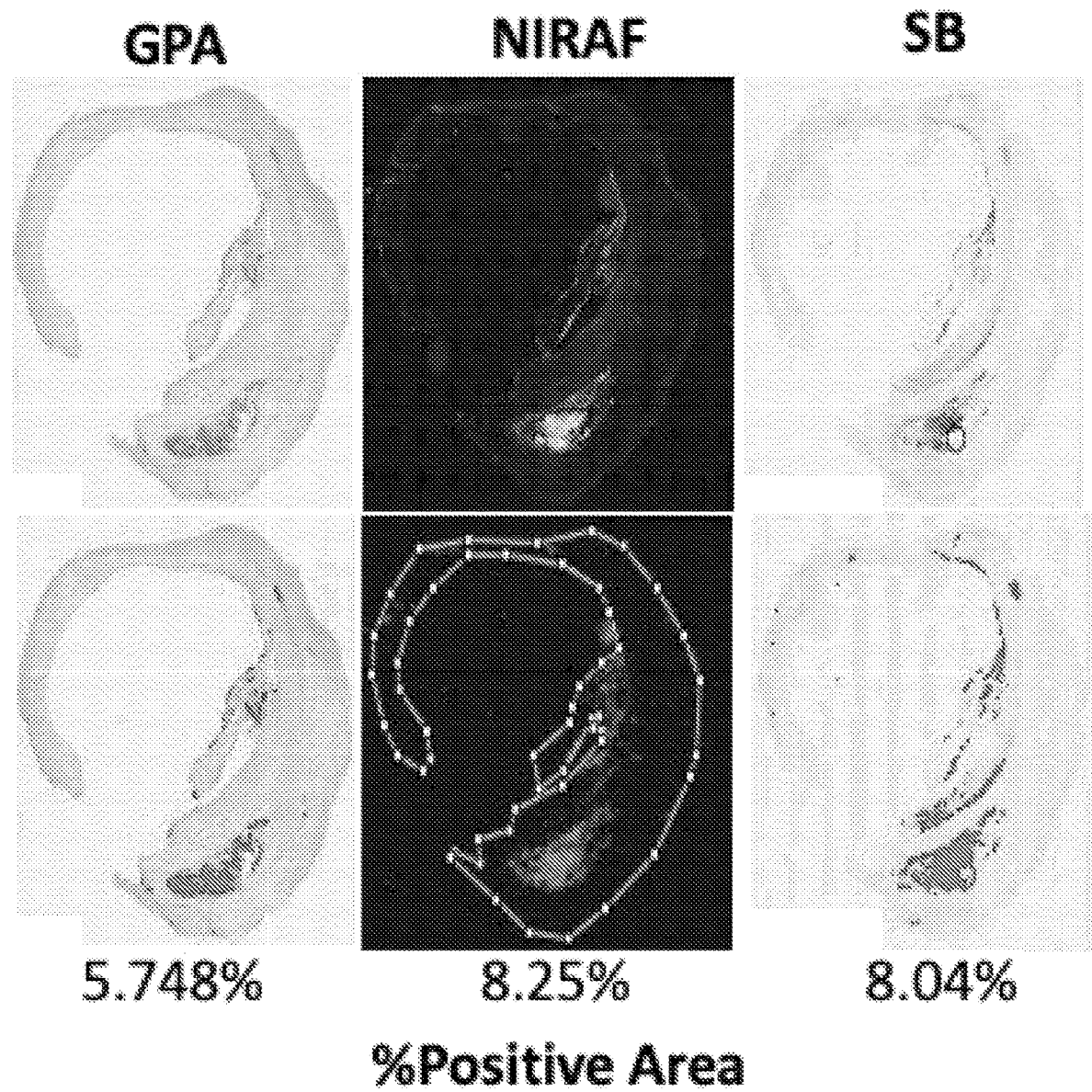
FIG. 16 shows various images of the carotid plaque sections showing $NIRAF^{90\%}$, SB, and GPA % positive area.

FIG. 16 shows various images of the carotid plaque sections showing NIRAF$^{90\%}$, SB, and GPA % positive area.

Figure 17:
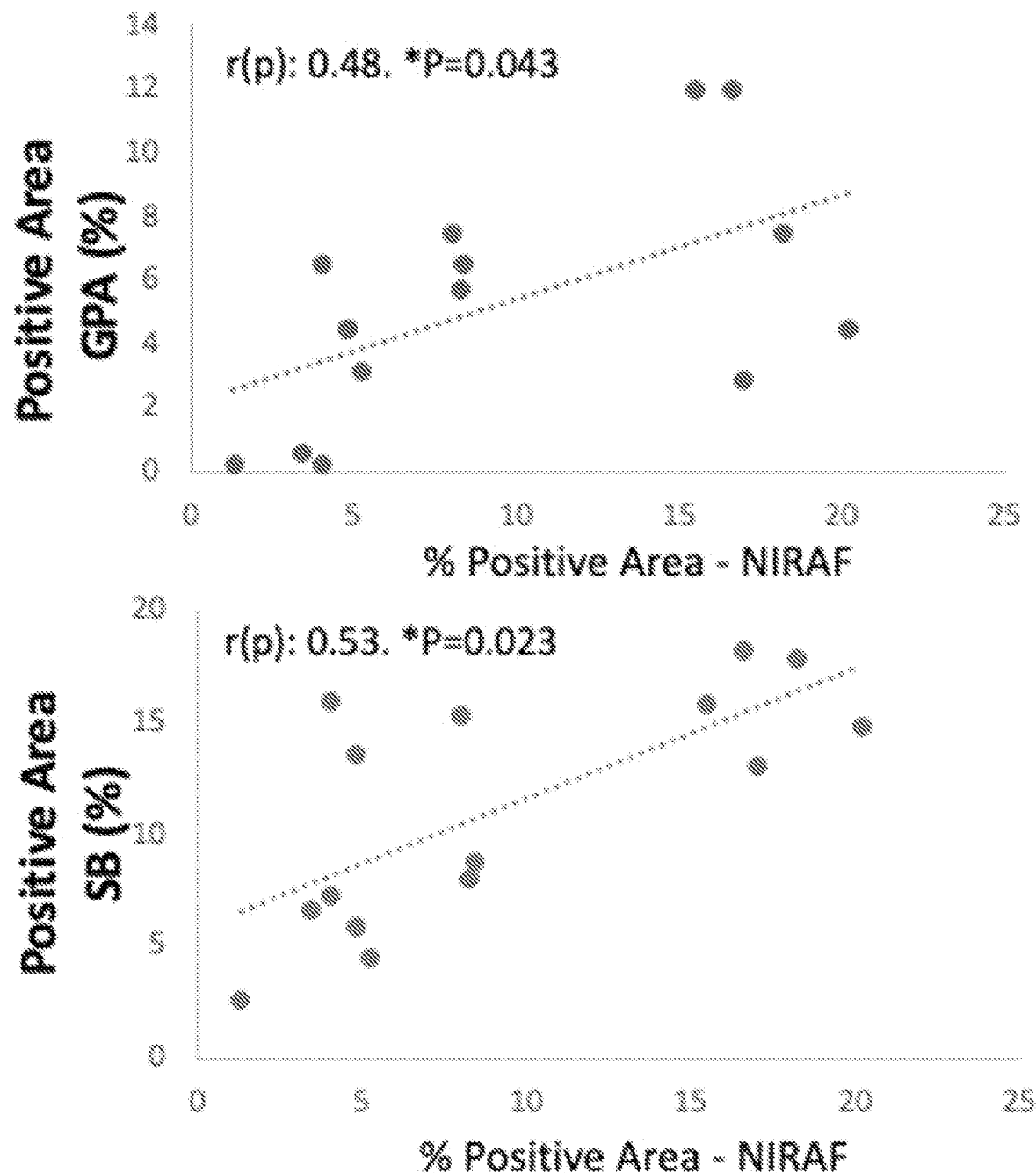
FIG. 17 shows two graphs of the correspondence between (1) $NIRAF^{90\%}$ and GPA (intraplaque hemorrhage), and (2) $NIRAF^{90\%}$ and SB area (lipid), derived from n=15 carotid sections from 7 plaques with adjacent sections stained.

FIG. 17 shows two graphs of the correspondence between (1) NIRAF$^{90\%}$ and GPA (intraplaque hemorrhage), and (2) NIRAF$^{90\%}$ and SB area (lipid), derived from n=15 carotid sections from 7 plaques with adjacent sections stained (*P<0.5). NIRAF images processed and windowed identically.

Figure 18A:
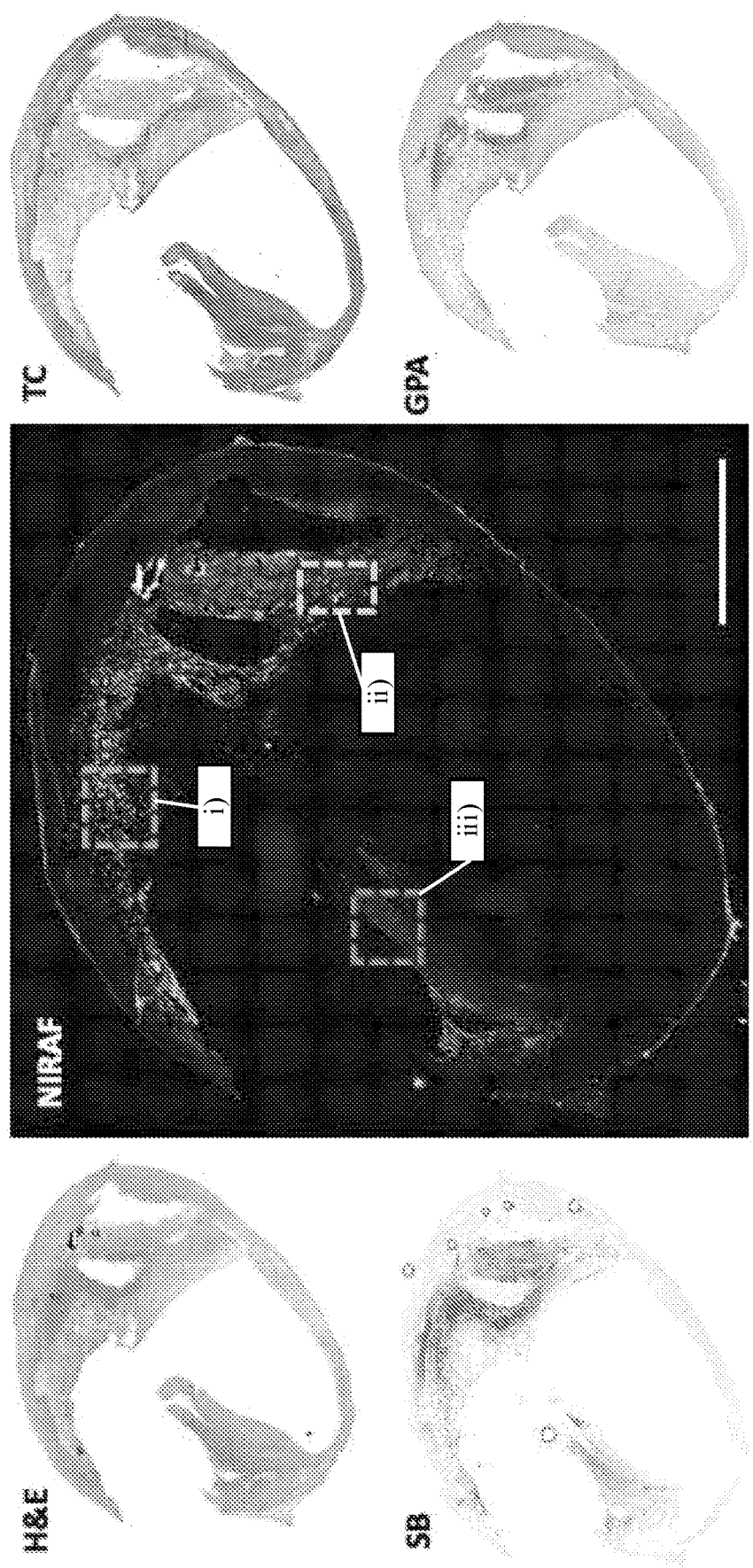
FIG. 18A shows representative human carotid atheroma images. The center panels contain a fluorescence microscopy image of the same carotid specimen showing the 650 nm NIRAF signal (greyscale) and high-power magnification views of NIRAF and corresponding SB, NIRAF, and GPA stains from adjacent sections.
Figure 18B:
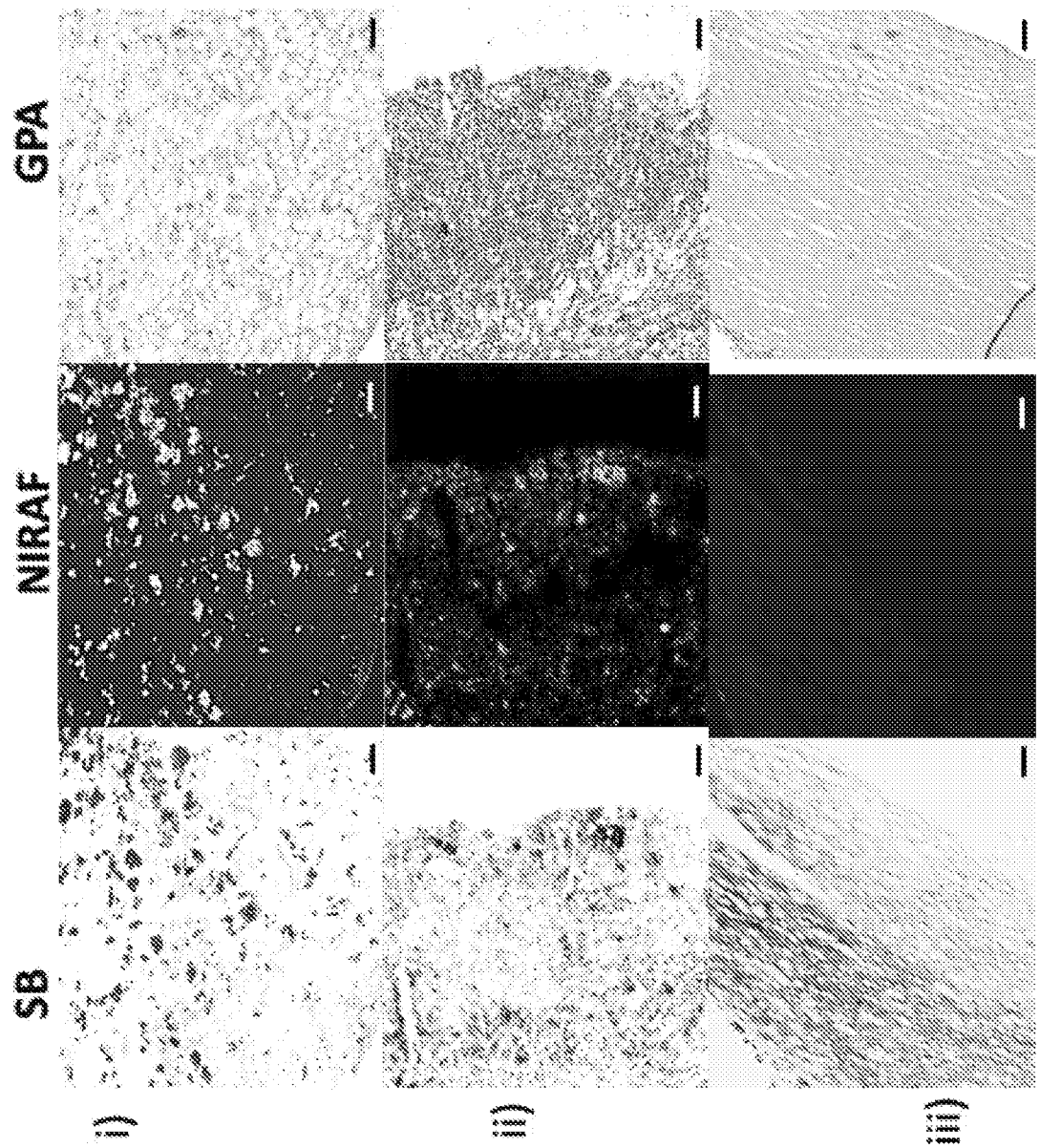
FIG. 18B shows NIRAF/SB/GPA patterns from the green (i.e., i)), orange (i.e., ii)), and red (i.e., iii)) dotted boxes from FIG. 17A being shown at high-power magnification.

On additional examination of plaque sections, it was found that that SB-detected lipid corresponded with focal, high-intensity NIRAF in some plaque areas, as well as with a diffuse, low intensity signal pattern in other plaque areas (see FIG. 18). High-power magnification examination of plaque sections demonstrated more prominent co-localization of NIRAF with a punctate pattern of SB-positive areas (see also FIG. 18). Immunohistochemical staining for bilirubin, a heme-degradation product formed after IPH and a source of NIRAF, also showed modest colocalization with NIRAF (see FIG. 19). Notably, some areas of NIRAF-positive and SB-positive zones did not show evidence of IPH as defined by GPA or bilirubin stains (see FIG. 18B, top row, and FIG. 19, bottom row).

FIGS. 18A and 18B show that human atheroma NIRAF signal can associate differently with lipid-protein aggregates and intraplaque hemorrhage. In particular, FIG. 18A shows representative human carotid atheroma images. The center panels contain a fluorescence microscopy image of the same carotid specimen showing the 650 nm NIRAF signal (greyscale) and high-power magnification views of NIRAF and corresponding SB, NIRAF, and GPA stains from adjacent sections. Scale bar, 1 mm (center panel). FIG. 18B shows NIRAF/SB/GPA patterns from the green, orange, and red dotted boxes from FIG. 18A being shown at high-power magnification including (i) a punctate pattern of SB (lipid) spatially overlaps with NIRAF in the absence of GPA (IPH); (ii) Evidence of SB and GPA with overlapping punctate NIRAF; and (iii) diffuse SB staining but lack of both NIRAF and GPA signal. Scale bar, 250 micrometers. NIRAF images processed and windowed identically.

Figure 19:
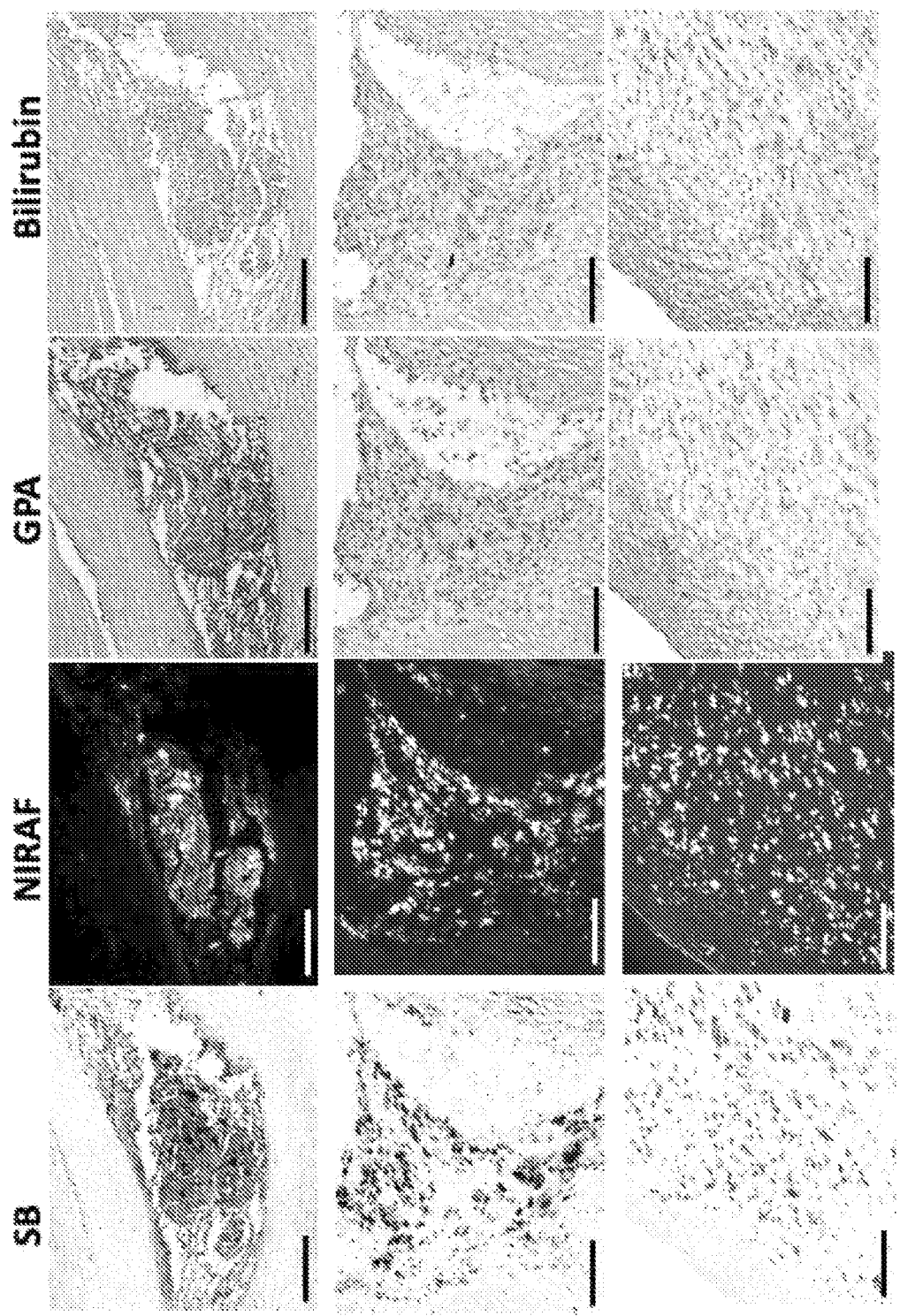
FIG. 19 shows high-power fields of SB, NIRAF, GPA, and bilirubin demonstrating consistent co-localization of SB and NIRAF, modest co-localization of $NIRAF^{90\%}$ and GPA, and infrequent co-localization of NIRAF with bilirubin.

FIG. 19 shows partial overlap with bilirubin, a marker of IPH. In particular, FIG. 19 shows high-power fields of SB, NIRAF, GPA, and bilirubin demonstrating consistent co-localization of SB and NIRAF, modest co-localization of NIRAF$^{90\%}$ and GPA, and infrequent co-localization of NIRAF with bilirubin. NIRAF images processed and windowed identically. Scale bar, 250 micrometers.

This new relationship between NIRAF and plaque lipid prompted the consideration that ceroid might contribute to the NIRAF. To assess the relative contributions of insoluble versus soluble lipids to the NIRAF signal, we examined fresh frozen sections with fluorescence microscopy for NIRAF, and then the same section underwent SB staining. An adjacent section then underwent ethanol treatment for 1 hour to remove soluble lipid components, followed by SB staining of this section. After ethanol treatment, the SB stained section demonstrated loss of the diffuse, low-intensity NIRAF and SB signal but preservation of the focal, high-intensity signal pattern (see FIG. 20).

Figure 20:
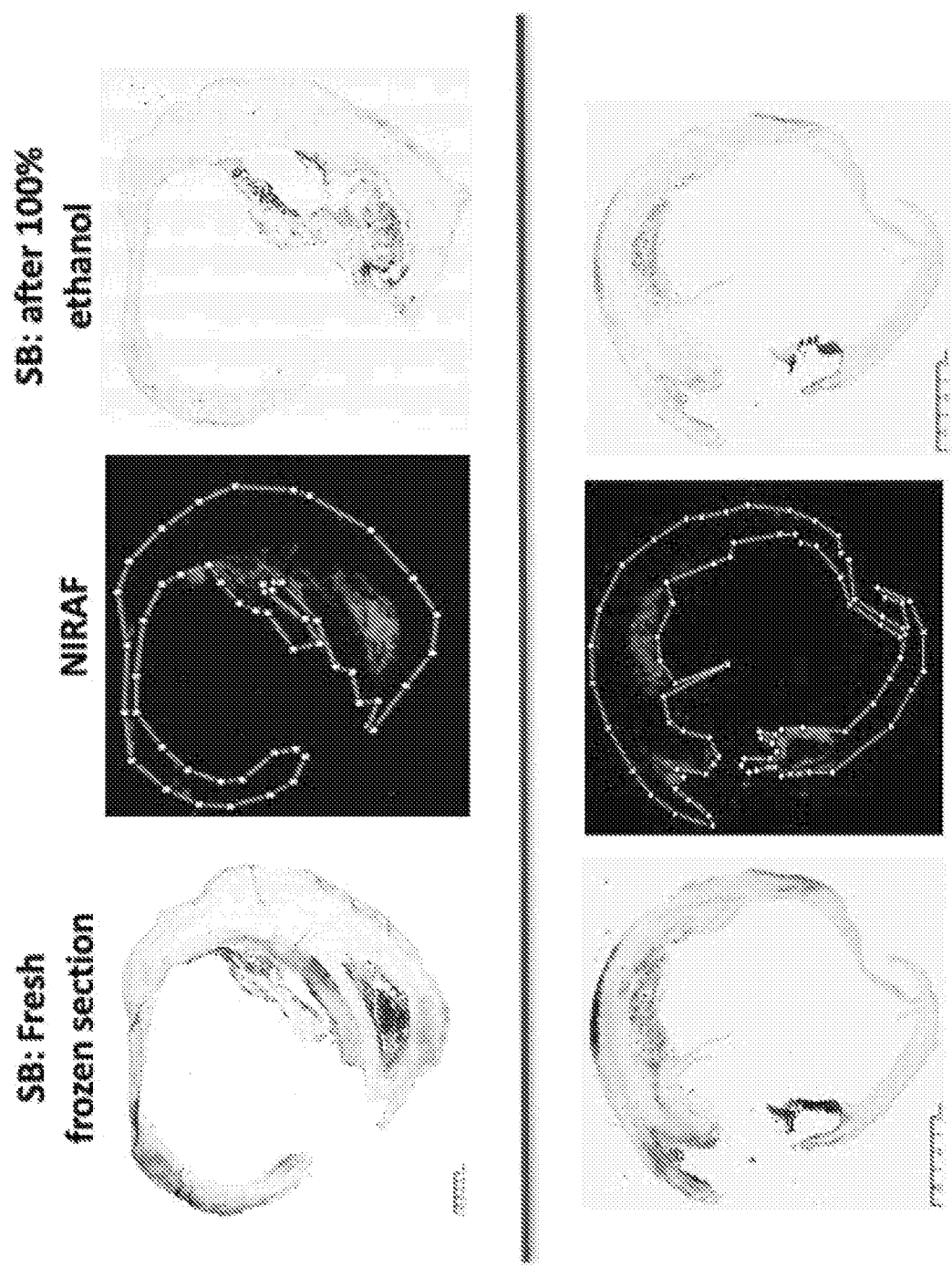
FIG. 20 shows both diffuse and punctate SB and NIRAF signals are evident (left column) in two fresh frozen adjacent carotid sections (separated by a line).

FIG. 20 shows that SB and NIRAF signals remain localized after ethanol fixation, revealing that ceroid is a source of plaque NIRAF. In particular, FIG. 20 shows both diffuse and punctate SB and NIRAF signals are evident (left column) in two fresh frozen adjacent carotid sections (separated by blue line). After 100% ethanol fixation of each of the two sections for 1 hour (right column), both SB sections demonstrate loss of diffuse SB signal (soluble lipids). The residual insoluble lipid, or ceroid, demonstrates localization with NIRAF.

Plaque ceroid is a product of lipid oxidation and can be formed under conditions of iron-catalyzed oxidative stress in lysosomes. Iron was assessed in NIRAF+ areas on carotid atheroma sections using Perl's stain with DAB enhancement. It was observed that positive NIRAF/SB/GPA areas localized with Perl's/DAB-detected ferric and ferrous iron, and also with CD68+ plaque macrophages (see FIGS. 20 and 21). These findings established an association of NIRAF with lipid, iron, and cellular mediators of oxidative stress in atheroma, features underlying ceroid generation in atherosclerosis.

Figure 21:
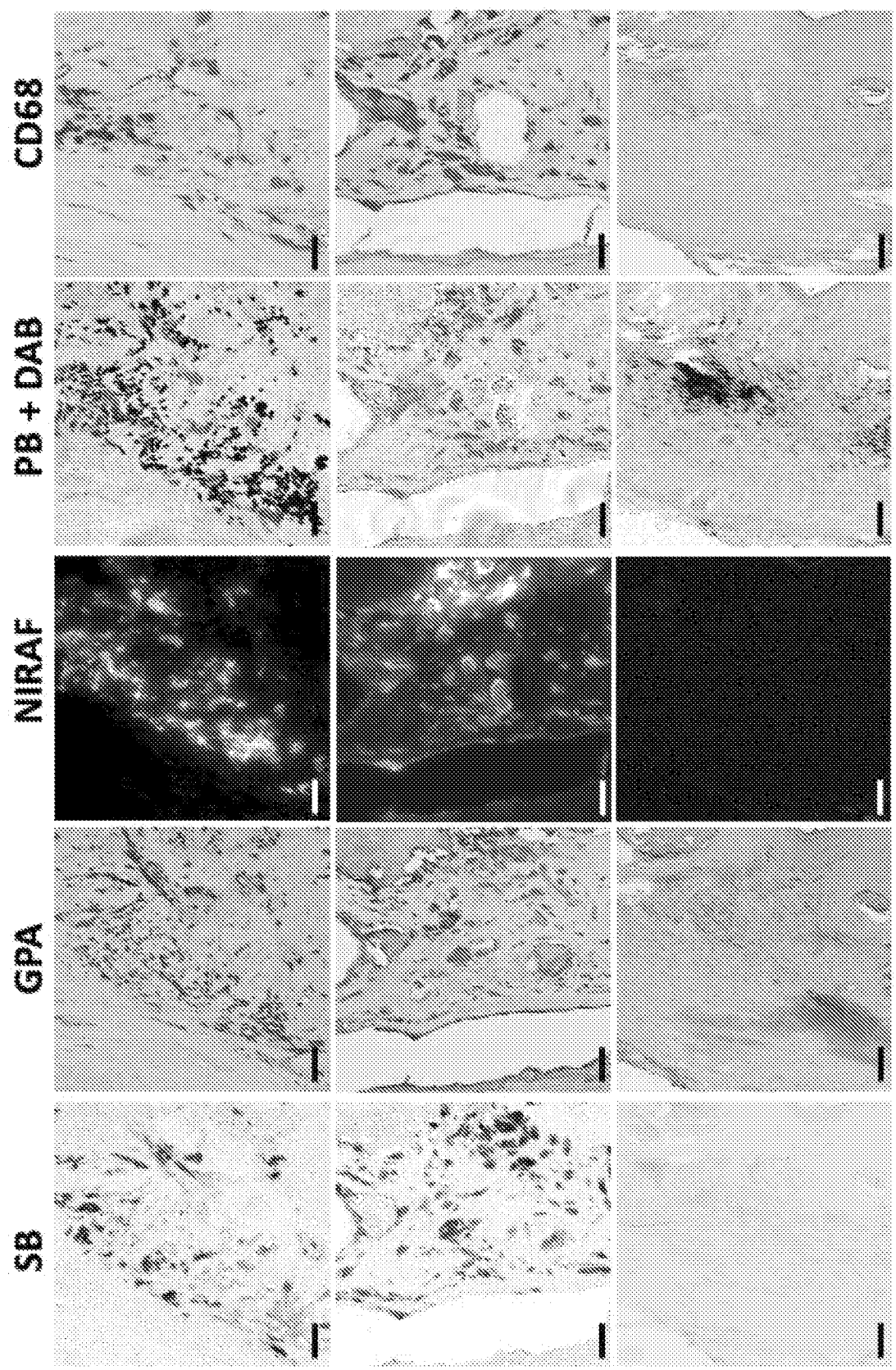
FIG. 21 shows high-power fields depicting frequent localization of NIRAF-positive areas with plaque iron and CD68-positive plaque macrophages.

FIG. 21 shows that plaque NIRAF associates with iron and macrophages. In particular, FIG. 21 shows high-power fields depicting frequent localization of NIRAF-positive areas with plaque iron and CD68-positive plaque macrophages. PB+DAB: Prussian blue with diaminobenzidine. NIRAF images processed and windowed identically. Scale bar, 250 micrometers.

Figure 22:
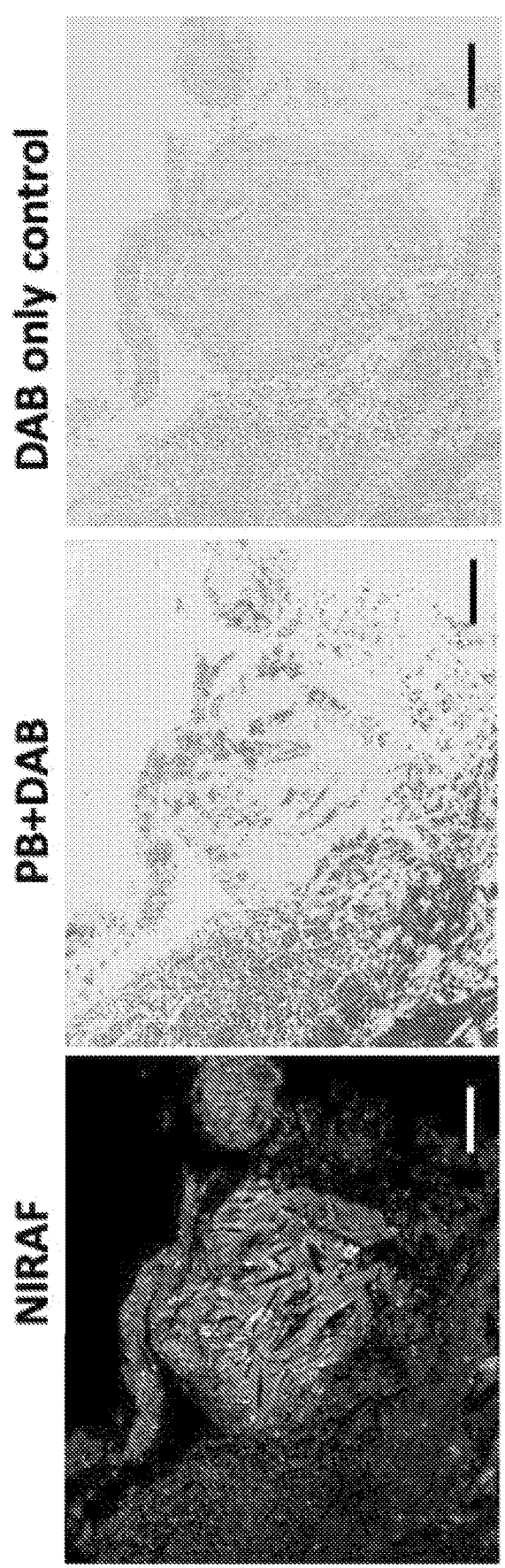
FIG. 22 shows histochemical detection of plaque iron using PB and DAB enhancement in adjacent sections.

FIG. 22 shows iron localization in NIRAF-positive plaque areas. In particular, FIG. 22 shows histochemical detection of plaque iron using PB and DAB enhancement in adjacent sections. Representative PB+DAB staining shows the presence of iron in the NIRAF positive plaque region. Scale bar=250 micrometers.

Based on the findings that NIRAF-positive plaque areas co-localized with insoluble and soluble lipid and areas of iron, a generator of oxidative stress, it was hypothesized that NIRAF might be inducible in vitro in human monocyte-derived macrophages ("MDMs") under conditions of oxidative stress. In differentiated THP-1 cells, or MDMs, incubated with oxidized LDL ("oxLDL") for 5 days or with hemoglobin ("Hb") for 24 hours, substantial NIRAF was detected following NIR light excitation at 638 nm (see FIGS. 22 and 23).

In contrast, MDMs incubated with LDL did not generate NIRAF, whereas MDMs incubated with oxLDL induced NIRAF in a time- and concentration-dependent manner (see FIG. 23A). NIRAF detection in oxLDL- or Hb-treated cells was next quantified by flow cytometry and demonstrated greater numbers of NIRAF+ cells compared to controls (see FIG. 23B).

Figure 23B:
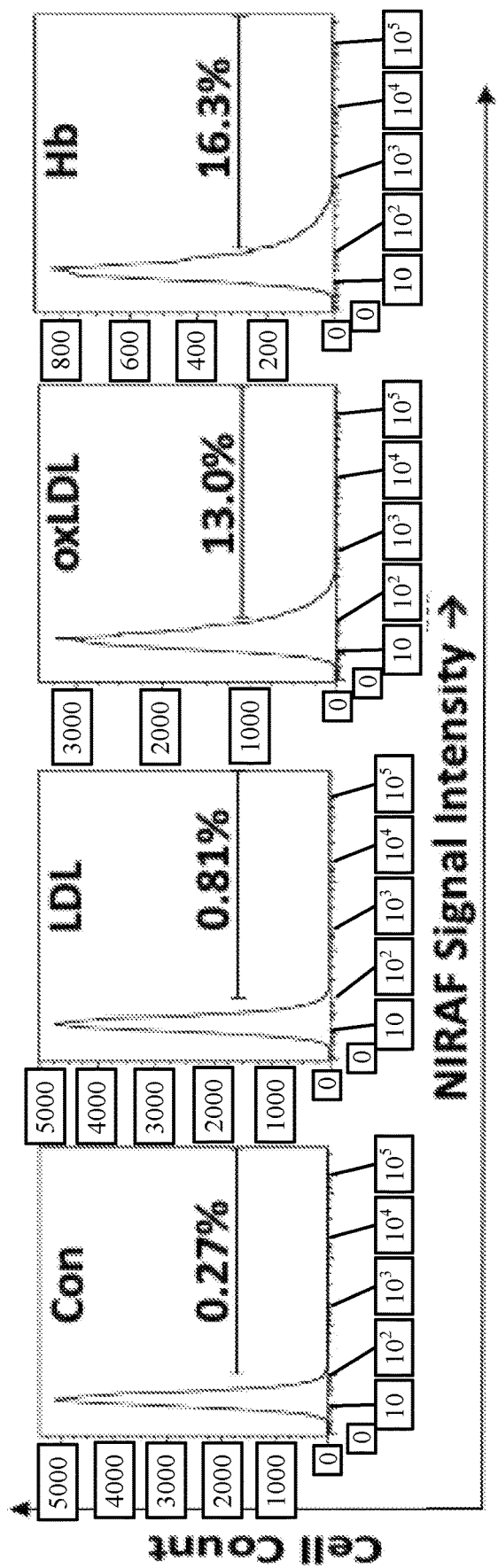
FIG. 23B shows flow cytometry graphs that correspond to the images of FIG. 22A.

FIG. 23 shows oxidized LDL-driven NIRAF Generation in THP-1 human macrophages. In particular, FIG. 23 shows that NIRAF excited by 638 nm light in THP-1 MDMs was assessed by confocal microscopy (FIG. 23A) and flow cytometry (FIG. 23B). THP-1 cells after differentiation into were incubated with medium alone (control), native LDL 50 ug/ml, oxLDL 50 ug/ml for 5 days or human hemoglobin 0.5 mg/ml for 24 hr. NIRAF detection with using confocal microscopy (FIG. 23A) and flow cytometry (FIG. 23B) are shown.

FIG. 24 shows NIRAF detection in THP-1 MDMs incubated with oxLDL. FIG. 24A shows high magnification images of NIRAF with nucleus staining in THP-1 macrophages incubated with medium alone (control), native LDL 50 ug/ml, oxLDL 50 ug/ml for 5 days or human hemoglobin 0.5 mg/ml for 24 hr. FIG. 24B shows representative time course of NIRAF signal evolution at day 1, 3, and 5 in LDL- and oxLDL-treated MDMs. FIG. 24C shows NIRAF signal at day 5 was compared between MDMs incubated with oxLDL 20 ug/ml vs. oxLDL 50 ug/ml. FIG. 24D shows quantitative data for FIG. 24C presented as mean±SE of 3 independent experiments.

To confirm that lipid-mediated NIRAF generation was possible in MDMs, intracellular lipids were visualized using BODIPY493/503 while concomitantly assessing NIRAF generation. OxLDL-treated cells showed robust intracellular lipid presence (BODIPY493-positive) that co-localized with NIRAF, in contrast to LDL-treated cells that were also BODIPY493-positive but did not exhibit NIRAF signal (see FIG. 25). In addition Hb-treated cells exhibited NIRAF but did not show evidence of lipid accumulation, demonstrating that NIRAF generation can occur through an oxLDL-specific and hemoglobin-independent pathway. Corroborating the histopathological findings, oxLDL-treated MDMs following ethanol treatment to remove soluble lipid still demonstrated persistent NIRAF that colocalized with BODIPY493, compared with control cells (see FIG. 25).

FIG. 25 shows that in the oxLDL group, intracellular lipids accessed by BODIPY493/503 staining co-localized with NIRAF on confocal microscopy.

FIG. 26 shows two graphs that quantify BODIPY-positive area and the co-localization area of BODIPY with NIRAF adjusted by cell number are presented as mean±standard error of 6 independent experiments. Quantitation of BODIPY was analyzed by the one-way ANOVA followed by Tukey-Kramer test and BODIPY/NIRAF was followed by Games-Howell test. *p <0.5, **p<0.01. Scale bar, 50 micrometers. NIRAF images processed and windowed identically.

FIG. 27 shows that NIRAF co-localizes with insoluble lipid, or ceroid, in human macrophages. In particular, FIG. 27 shows MDMs that were incubated with oxLDL 50 ug/ml for 5 days, then treated with ethanol for 20 minutes or control (no ethanol), and then incubated with BOPIDY 493 to stain intracellular lipids. Hoescht stain visualized cell nuclei. After EtOH fixation to remove soluble lipid, the remaining insoluble BODIPY+ lipid was observed to colocalize with the NIRAF signal (yellow color, right column).

The role of oxidative stress was evaluated in the generation of NIRAF following oxLDL exposure, because oxidized LDL is a potent generator of oxidative stress, and oxidative stress promotes ceroid formation. Intracellular reactive oxygen species ("ROS") assessed by the CellROX reagent colocalized well with oxLDL-induced NIRAF in human MDMs (see FIG. 28A). Quantitative analysis by flow cytometry confirmed that CellROX-positive and NIRAF-positive populations increased in oxLDL-treated cells as compared with LDL-treated and control cells (see FIG. 28A). The presence of an oxidizing environment was further analyzed to reflect non-enzymatic lipid oxidation mediated by ROS. Using the C11-BODIPY lipid peroxidation sensor, it was observed that oxLDL-treated cells showed higher levels of lipid peroxidation compared to LDL-treated and control cells (see FIG. 28).

FIG. 28 shows oxidized LDL-driven oxidative stress contributes to NIRAF generation. NIRAF and intracellular reactive oxygen species ("ROS") was assessed by CellROX-Green staining in THP-1 MDMs were assessed by FIG. 28A—confocal microscopy following incubation with medium alone (Con), native LDL 50 ug/ml, oxLDL 50 ug/ml for 5 days. Representative images from 4 independent experiments demonstrate increased NIRAF signal under conditions of oxLDL-generated oxidative stress. FIG. 28B-28D show flow cytometric analysis that both NIRAF- and CellROX-positive cells increase following incubation with oxLDL. The representative result of 3 independent experiments are shown.

FIG. 29A shows representative images of C11-BODIPY staining demonstrating increased lipid peroxidative stress following incubation of MDMs with oxLDL. FIG. 29B shows a graph that illustrates the quantitation of the C11-BODIPY lipid peroxidation signal obtained from confocal microscopy demonstrating a significant increase in lipid peroxidation following incubation with oxLDL, compared to LDL or Con. Data are presented as mean±SE of 3 independent experiments.

To specifically assess the role of oxidative stress in oxLDL-generated NIRAF, the impact of antioxidant treatment on NIRAF generation using two distinct antioxidants, N-acetylcysteine ("NAC") and α-tocopherol was examined. It was found that concomitant NAC or α-tocopherol treatment along with oxLDL substantially reduced NIRAF generation and ROS levels in MDMs at day 5 compared to oxLDL treatment alone.

FIG. 30A shows THP-1 MDMs co-incubated with oxLDL and NAC 5 mM, or α-Toc 1 mM, for 5 days demonstrate a reduced NIRAF signal (magenta) compared to cells incubated with oxLDL alone. FIG. 30B shows flow cytometric analysis graphs that demonstrate a reduction in the percentage of NIRAF+ cells following incubation with either NAC or α-Toc. The representative results of 3 independent experiments are shown. Quantitative data were analyzed by one-way ANOVA followed by Tukey-Kramer test. *$p<0.5$, ***$p<0.001$. Scale bar; 50 micrometers.

FIG. 31 shows that antioxidant treatment decreases oxLDL generated NIRAF signal in human macrophages. In particular, FIG. 31 shows intracellular ROS production detected by CellROX-Green in day 5 THP-1 MDMs incubated with oxLDL alone, or co-incubated with oxLDL and NAC 5 mM or α-Tocopherol 1 mM. Representative confocal microscopy images from 3 independent observations. NIRAF images processed and windowed identically.

FIGS. 32A-32C show flow cytometry graphs that demonstrate reduced numbers of CellROX-positive and NIRAF-positive cells.

In this disclosure, new insights are provided into NIRAF generation by showing that (1) Human carotid plaques exhibit NIRAF in lipid-rich zones with or without the presence of intraplaque hemorrhage; (2) Plaque NIRAF co-localizes with insoluble lipid and with iron, a catalyst for the formation of oxidative lipoproteins that comprise ceroid; (3) In human monocyte-derived macrophages ("MDMs"), oxidized LDL, but not LDL, generates NIRAF, lipid peroxidation products and oxidative stress, independent of hemoglobin; (4) Antioxidant treatment can suppress oxidized LDL-generated oxidative stress and NIRAF in vitro. The overall results demonstrate a new pathway for NIRAF generation through oxidized lipid-induced oxidative stress, and support the hypothesis that ceroid may be an additional source of NIRAF in human atherosclerosis. These findings thus have the potential to further inform future clinical NIRAF imaging studies of human atherosclerosis.

It was hypothesized that ceroid, a long-established insoluble lipid complex may be a potential source NIRAF source generated under conditions of oxidative stress. In addition, it was hypothesized that ceroid might possess a NIRAF signal. Early studies of human atherosclerosis detected ceroid in aortic and coronary plaques across a broad age range of necropsy patients (age 5 to 88 years), leading to the conjecture that ceroid was a marker of previous oxidative events and could play a role in plaque progression. Human coronary and aortic plaques were previously examined using fluorescence (476 nm excitation) and Raman (830 nm excitation) spectral microscopy further showed that lipid within ceroid exists primarily in the form of peroxidation products derived from the myeloperoxidase (MPO)-hypochlorite pathway and the Fenton reaction, highlighting the importance of inflammation- and iron-mediated LDL oxidation mechanisms.

In this disclosure that studied freshly resected carotid endarterectomy specimens, the observations support the concept that ceroid may contribute to the NIRAF signal based on the relationship of NIRAF to lipid and specifically insoluble lipid, as well as iron, a driver of oxidative stress. Free iron released by hemoglobin following IPH can promote the formation of reactive oxygen species and lipid peroxides, features underlying ceroid formation. However while we confirmed a partial association of IPH with NIRAF, it was also found that NIRAF+ and SB+ areas without evidence of IPH. This finding suggested the potential for lipid-based mechanism to generate NIRAF via oxidative stress, independent of hemoglobin-based iron delivery. Further experiments on plaque sections and human MDMs in vitro using organic solvents to remove soluble lipid indeed demonstrated that the stronger, punctate NIRAF signal colocalized with insoluble lipid, or ceroid.

While the mechanisms underlying ceroid formation are complex and have been extensively studied, the precise mechanisms of NIRAF generation from plaque-based ceroid have been previously unknown Ceroid is observed in various cell types and disease-states and its formation has been linked to oxidative stress and pathological cellular senescence, commonly described as the aggregation of incomplete digestion products resulting from lysosomal and autophagosomal dysfunction.

Importantly, it is well established that excessive accumulation of oxLDL triggers oxidative stress via dysfunction of cellular degradation machinery including the lysosome and endoplasmic reticulum that can be quenched with N-acetyl cysteine ("NAC"). In this disclosure it is demounted that in vitro oxidized lipid can generate ceroid formation and autofluorescence in the NIR. In addition, oxLDL further generated reactive oxygen species ("ROS") and lipid peroxidation products. Moreover, NIRAF and ROS generation in this study was inhibited by antioxidant treatment with NAC or α-tocopherol in human MDMs. While atherosclerosis prevention trials of α-tocopherol supplementation have been neutral, it is possible that more potent antioxidants such as recently approved icosapent ethyl[43] might be more effective in suppressing ceroid formation, NIRAF, and atheroma progression. Given the relationship of NIRAF to oxidative stress, this work further supports investigating whether ceroid is directly pro-atherogenic, an area of controversy.

Detection of NIRAF in patients with CAD was recently reported using a clinically approved dual-modality NIRAF-optical coherence tomography ("OCT") intravascular catheter. The present findings showed that the highest NIRAF signal occurred at origin of the internal carotid artery, the typical culprit site demonstrating advanced atheroma with evidence of IPH or plaque rupture. The current findings may thus inform future intracoronary NIRAF studies of human CAD, as NIRAF can report on ceroid as well intraplaque hemorrhage. Intracoronary catheter-based detection of ceroid in the NIRAF range has important advantages over detecting ceroid in the visible light range, including greater penetration of NIR light into plaque, and avoidance of confounding visible light autofluorescence from other entities such as elastin and collagen. Future studies are planned to determine whether intravascular NIRAF signal intensity will predict plaque progression in coronary-sized arteries. In addition, the current findings support the potential value of intravascular NIRAF-OCT to detect plaque stabilizing effects of anti-oxidant or anti-inflammatory therapies by tracking ceroid/IPH signals over time.

Ceroid is insoluble in aqueous or organic solvents, rendering it difficult to extract from human atheroma for analytical NIRAF studies. Nonetheless, the persistence of NIRAF co-localization with insoluble lipid after ethanol fixation both in plaque sections and oxLDL-treated human MDMs provides evidence that ceroid contributes to the NIRAF signal within human atheroma. Additional mechanistic studies beyond the scope of this study are needed to understand the specific molecular constituents of ceroid that generate NIRAF. Finally, while ceroid now appears to be another source of NIRAF beyond products of heme degradation (e.g. bilirubin and protoporphyrin IX), additional moieties that exhibit NIRAF may exist in atheroma. Discovery of these molecules will likely require broader screening approaches utilizing lipidomic, metabolomic, and proteomic approaches.

In summary, this integrated human atherosclerosis and in vitro human MDM study demonstrates that NIRAF occurs in areas of insoluble plaque lipid, or ceroid, and that NIRAF generation can occur through an oxidized LDL-pathway that generates oxidative stress and lipid peroxidation products in vitro. The overall results demonstrate a new pathway for NIRAF generation through oxidized lipid-driven oxidative stress, and support ceroid as a source of NIRAF in human atherosclerosis. These findings may inform future clinical intracoronary imaging studies of NIRAF in patients with CAD.

Mechanisms underlying NIRAF generation have not been fully characterized. Here, we investigated the role of lipids and oxidative stress in NIRAF generation in atherosclerosis and in vitro in human monocyte-derived macrophages (MDMs). In N=15 human carotid endarterectomy specimens, we investigated the spatial distribution of lipid, IPH, and NIRAF (ex/em 630/650 nm). Plaque NIRAF associated with both Sudan black (SB)+ lipids ($r=0.53$, $P=0.43$) and glycophorin A (GPA)-positive IPH ($r=0.57$, $P=0.23$). Plaque NIRAF also localized with lipid and specifically insoluble lipid (ceroid), and iron. Intriguingly, some NIRAF-positive areas were SB-positive but GPA-negative. To further investigate the role of lipids in NIRAF generation, human MDMs were studied. Oxidized low-density lipoprotein (oxLDL) and hemoglobin, but not LDL, generated NIRAF in MDMs. In oxLDL-treated MDMs, NIRAF co-localized with lipid peroxidation products and intracellular oxidative stress markers. The anti-oxidants α-tocopherol and N-acetylcysteine suppressed NIRAF generation and oxidative stress in oxLDL-treated MDMs. In human atherosclerosis and human MDMs in vitro, NIRAF co-localizes with lipid and specifically insoluble lipid, or ceroid. In vitro studies further show that oxidized LDL generates NIRAF, oxidative stress and lipid peroxidation products. The overall results demonstrate a new pathway for NIRAF generation through oxidized lipid-driven oxidative stress, and support ceroid as a source of NIRAF in human atherosclerosis. These findings may inform further clinical intracoronary imaging studies of NIRAF in patients with CAD.

Near-infrared autofluorescence (NIRAF) is detectable in patients with coronary artery disease (CAD) and may demarcate plaques at risk for future ischemic events. NIRAF associates with insoluble lipid (ceroid) in human carotid atherosclerosis and in vitro in human macrophages, independent of intraplaque hemorrhage or hemoglobin. Oxidized LDL generates NIRAF, oxidative stress, and lipid peroxidation products in vitro. Antioxidant treatment can suppress NIRAF generation in human macrophages. These findings may inform future clinical intracoronary imaging studies of NIRAF in patients with CAD.

Although these systems and methods has been described and illustrated in the foregoing illustrative non-limiting examples, it is understood that the present disclosure has been made only by way of example, and that numerous changes in the details of implementation of these systems and methods can be made without departing from the spirit and scope of these systems and methods, which is limited only by the claims that follow. Features of the disclosed non-limiting examples can be combined and rearranged in various ways.

Furthermore, the non-limiting examples of the disclosure provided herein are not limited in application to the details of construction and the arrangement of components set forth in the following description or illustrated in the following drawings. These systems and methods is capable of other non-limiting examples and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, the use the phraseology and terminology used herein is for the purpose of description and should not be regarded as limiting. The use of "right", "left", "front", "back", "upper", "lower", "above", "below", "top", or "bottom" and variations thereof herein is for the purpose of description and should not be regarded as limiting. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, phrases similar to "at least one of A, B, and C," "one or more of A, B, and C," and the like, are meant to indicate A, or B, or C, or any combination of A, B, and/or C, including combinations with multiple or single instances of A, B, and/or C.

In some non-limiting examples, aspects of the present disclosure, including computerized implementations of methods, can be implemented as a system, method, apparatus, or article of manufacture using standard programming or engineering techniques to produce software, firmware, hardware, or any combination thereof to control a processor device, a computer (e.g., a processor device operatively coupled to a memory), or another electronically operated controller to implement aspects detailed herein. Accordingly, for example, non-limiting examples of these systems and methods can be implemented as a set of instructions, tangibly embodied on a non-transitory computer-readable media, such that a processor device can implement the instructions based upon reading the instructions from the computer-readable media. Some non-limiting examples of these systems and methods can include (or utilize) a device such as an automation device, a special purpose or general purpose computer including various computer hardware, software, firmware, and so on, consistent with the discussion below.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally, it should be appreciated that a carrier wave can be employed to carry computer-readable electronic data such as those used in transmitting and receiving electronic mail or in accessing a network such as the Internet or a local area network (LAN). Those skilled in the art will recognize many modifications may be made to these configurations without departing from the scope or spirit of the claimed subject matter.

Certain operations of methods according to these systems and methods, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular non-limiting examples of these systems and methods. Further, in some non-limiting examples, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

As used herein, the term, "controller" and "processor" and "computer" include any device capable of executing a computer program, or any device that includes logic gates configured to execute the described functionality. For example, this may include a processor, a microcontroller, a field-programmable gate array, a programmable logic controller, and the like. As another example, these terms may include one or more processors and memories and/or one or more programmable hardware elements, such as any of types of processors, CPUs, microcontrollers, digital signal processors, or other devices capable of executing software instructions.

Although the description above, with regard to the processes above, has been framed with respect to specific computing devices implementing these processes (as appropriate), it is also understood that a non-transitory computer-readable medium (e.g., such as the article of manufacture described above) can store computer-executable code for the processes described above. For example, processes 200, 300 (or others) can be effectively stored on the non-transitory computer-readable medium.

As used herein, the term "imaging agent" refers to imaging contrast agents that absorb or alter external electromagnetism or ultrasound, radiopharmaceuticals that emit radiation detected by an imaging system, and the like. In some cases, an "imaging agent" can be a diagnostic imaging agent that enhances contrast in images inside the body.

The invention claimed is:

1. A computer-implemented method for diagnosing a medical condition of a patient, the method comprising:
    causing, using one or more processors, an excitation source to emit an excitation light towards a region of interest of an artery;
    receiving, using the one or more processors and a detector, imaging data of the region of interest of the artery;
    generating, using the one or more processors and the imaging data, at least one image of the region of interest;
    separating, using the one or more processors, imaging data that comprises a risk region of an atheromatous plaque from imaging data that does not comprise a risk region for atheromatous plaque, based on an intensity threshold; and
    determining a size, a shape, or an oxidative stress value for the risk region of an atheromatous plaque;
    determining, using the one or more processors, that the size, shape, or oxidative stress value of the risk region of an atheromatous plaque is greater than a threshold size, a threshold shape, or a threshold oxidative stress; and
    generating a report that includes information regarding the atheromatous plaque and that a threshold was exceeded.

2. The method of claim 1, further comprising:
    determining, using the one or more processors, a maximum intensity value of the imaging data; and
    determining, using the one or more processors, a threshold, based on the maximum intensity value, and
    wherein a pixel with the maximum intensity value is defined within the risk region of the atheromatous plaque.

3. The method of claim 1, wherein the risk region of the atheromatous plaque has a higher amount of insoluble lipids than the region of the atheromatous plaque that does not include the risk region, and
    wherein the risk region of the atheromatous plaque has a higher amount of insoluble iron than the region of the atheromatous plaque that does not include the risk region.

4. The method of claim 1, further comprising filtering, using the one or more processors, the image to generate an image of the risk region of the atheromatous plaque.

5. The method of claim 4, further comprising:
    determining, using the one or more processors, a size of the risk region of the atheromatous plaque, based on the image of the risk region of the atheromatous plaque;

determining, using the one or more processors, that the size of the risk region is greater than a size threshold; and determining, using the one or more processors, that the patient has a severe case of an atheromatous plaque, based on the size of the risk region being greater than the size threshold.

6. The method of claim 4, wherein filtering, using the one or more processors, the image to generate an image of the risk region of the atheromatous plaque includes:
thresholding, using the one or more processors, the image of the region of interest according to a pixel intensity threshold to generate the image of the risk region of the atheromatous plaque.

7. The method of claim 6, wherein the pixel intensity threshold rejects pixels having an intensity that exceeds the pixel intensity threshold, and
wherein the pixel intensity threshold is at least one of:
a first range defined between a peak signal intensity value in the imaging data and a first pixel value that is 0.25 times the peak intensity value;
a second range defined between the peak signal intensity value and a second pixel value that is 0.5 times the peak signal intensity value; or
a third range defined between the peak signal intensity value and a first pixel value that is 0.75 times the peak signal intensity value.

8. The method of claim 7, wherein the signal intensity peak value is a global peak signal intensity value.

9. The method of claim 1, wherein the image is a first image, and further comprising:
filtering, using the one or more processors, the first image to generate a second image of the atheromatous plaque that excludes the risk region; and
subtracting, using the one or more processors, the second image from the first image to generate a subtracted image that is an image of the risk region of the plaque.

10. The method of claim 9, wherein a portion of the risk region of the atheromatous plaque includes a ceroid of the atheromatous plaque.

11. The method of claim 9, wherein filtering, using the one or more processors, the first image to generate the second image of the atheromatous plaque that excludes the risk region includes thresholding the first image according to a threshold to generate the second image.

12. The method of claim 1, wherein no imaging agent is administered to the patient prior to exciting the region of interest with the excitation source, and prior to receiving the imaging data from the detector.

13. The method of claim 1, wherein the artery is a carotid artery.

14. The method of claim 1, further comprising:
determining, using the one or more processors, a shape of the atheromatous plaque; and
determining, using the one or more processors, that the shape of the atheromatous plaque exceeds a shape threshold; and
notifying, using the one or more processors, a user based on the shape of the risk region of the atheromatous plaque exceeding the shape threshold.

15. The method of claim 1, wherein the excitation light has a wavelength between 600 nm and 800 nm and the imaging data has been acquired from light having a wavelength of between 680 nm to 880 nm.

16. The method of claim 1, wherein the excitation light has a wavelength between substantially 600 nm and substantially 1000 nm.

17. The method of claim 1, wherein the excitation light has a wavelength of substantially 633 nm.

18. An imaging system for imaging a blood vessel of a patient, the imaging system comprising:
an excitation source configured to emit excitation light towards the blood vessel of the patient;
a detector configured to sense light emitted from the blood vessel of the patient; and
a computing device in communication the excitation source and the detector, the computing device being configured to:
cause the excitation source to emit excitation light towards at least a portion of a region of interest of the blood vessel;
receive, using the detector, imaging data of the region of interest of the blood vessel;
generate, using the imaging data, at least one image of the region of interest;
separate imaging data that comprises a risk region of an atheromatous plaque from imaging data that does not comprise a risk region for atheromatous plaque based on an intensity threshold;
determine a size, a shape, or an oxidative stress value for the risk region of an atheromatous plaque;
determine that the size, shape, or oxidative stress value of the risk region of an atheromatous plaque is greater than a threshold size, a threshold shape, or a threshold oxidative stress; and
generate a report that includes information regarding the atheromatous plaque and that a threshold was exceeded.

19. The imaging system of claim 18, wherein the computing device is further configured to generate, using the imaging data, an image of the region of interest.

20. The imaging system of claim 19, wherein the computing device is further configured to:
threshold the image according to a pixel threshold to generate an image of a risk region of the atheromatous plaque;
determine at least one of a size or a shape of the risk region of the atheromatous plaque;
determine that at least one of the size of the atheromatous plaque exceeds a size threshold, or the shape of the atheromatous plaque exceeds a shape threshold; and
determine that the patient has a severe case of an atheromatous plaque, based on the determination that at least one of the size, or the shape of the atheromatous plaque exceeds the corresponding threshold.

21. The imaging system of claim 19, wherein the computing device is further configured to:
generate, an image of a non-risk region of the plaque; and
determine an oxidative stress value, based on the non-risk region of the plaque; and
determine that the patient has a severe case of the atheromatous plaque, based on the oxidative stress value.

22. The imaging system of claim 21, wherein the computing device is further configured to:
determine that the oxidative stress value exceeds an oxidative stress threshold; and
determine that the patient has a severe case of an atheromatous plaque, based on the determination that the oxidative stress value exceeds the oxidative stress threshold.

23. The system of claim 18, wherein the excitation light has a wavelength between substantially 600 nm and substantially 1000 nm.

24. The system of claim 23, wherein the excitation light has a wavelength of substantially 633 nm.

\* \* \* \* \*